United States Patent
Abe et al.

(10) Patent No.: US 11,638,012 B2
(45) Date of Patent: *Apr. 25, 2023

(54) ENCODER, DECODER, ENCODING METHOD, AND DECODING METHOD

(71) Applicant: Panasonic Intellectual Property Corporation of America, Torrance, CA (US)

(72) Inventors: Kiyofumi Abe, Osaka (JP); Takahiro Nishi, Nara (JP); Tadamasa Toma, Osaka (JP); Ryuichi Kanoh, Osaka (JP); Chong Soon Lim, Singapore (SG); Ru Ling Liao, Singapore (SG); Hai Wei Sun, Singapore (SG); Sughosh Pavan Shashidhar, Singapore (SG); Han Boon Teo, Singapore (SG); Jing Ya Li, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/405,244

(22) Filed: Aug. 18, 2021

(65) Prior Publication Data

US 2021/0385465 A1 Dec. 9, 2021

Related U.S. Application Data

(63) Continuation of application No. 16/394,225, filed on Apr. 25, 2019, now Pat. No. 11,128,871.
(Continued)

(51) Int. Cl.
*H04N 19/159* (2014.01)
*H04N 19/139* (2014.01)
(Continued)

(52) U.S. Cl.
CPC ......... *H04N 19/159* (2014.11); *H04N 19/119* (2014.11); *H04N 19/139* (2014.11); *H04N 19/521* (2014.11)

(58) Field of Classification Search
CPC .......................... H04N 19/119; H04N 19/139
See application file for complete search history.

(56) References Cited

U.S. PATENT DOCUMENTS 10,645,398 B2 * 5/2020 Zhou ...................... H04N 19/59
2013/0039423 A1 2/2013 Helle
(Continued)

OTHER PUBLICATIONS

H.265 (ISO/IEC 23008-2 High efficiency video coding (HEVC)), Dec. 1, 2013.

*Primary Examiner* — Jayanti K Patel
*Assistant Examiner* — Christopher Kingsbury Glover
(74) *Attorney, Agent, or Firm* — Wenderoth, Lind & Ponack, L.L.P.

(57) ABSTRACT

An encoder encodes a video, and includes: circuitry; and memory coupled to the circuitry. Using the memory, the circuitry: obtains at least two items of prediction information for a first partition included in the video; derives at least one template from neighboring samples which neighbor the first partition; calculates at least two costs, using the at least one template and the at least two items of prediction information; using the at least two costs, (i) determines at least one splitting direction for the first partition or (ii) assigns one of the at least two items of prediction information to a second partition split from the first partition according to the splitting direction, and another thereof to a third partition split from the first partition according to the splitting direction; and encodes the first partition according to the splitting direction and the at least two items of prediction information.

1 Claim, 53 Drawing Sheets

Related U.S. Application Data

(60) Provisional application No. 62/662,500, filed on Apr. 25, 2018.

(51) Int. Cl.
*H04N 19/119* (2014.01)
*H04N 19/513* (2014.01)

(56) References Cited

U.S. PATENT DOCUMENTS

| | | |
|---|---|---|
| 2016/0261886 A1* | 9/2016 | Chon .................. H04N 19/147 |
| 2017/0347102 A1 | 11/2017 | Panusopone |
| 2018/0176582 A1 | 6/2018 | Zhao |
| 2019/0222842 A1 | 7/2019 | Zhang |
| 2020/0145698 A1 | 5/2020 | Gao |

* cited by examiner

FIG. 3

| TRANSFORM TYPE | BASIS FUNCTION $T_i(j)$, $i,j = 0, 1, ..., N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$<br>WHERE $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$<br>WHERE $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

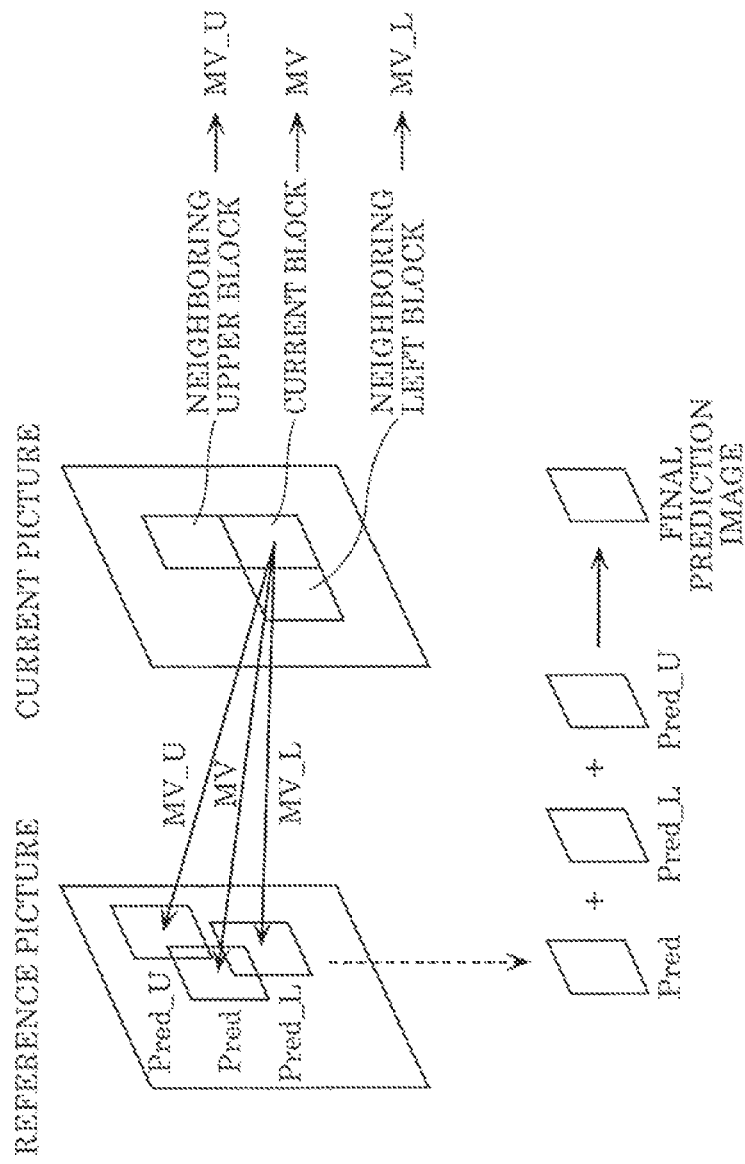

FIG. 14
(a)
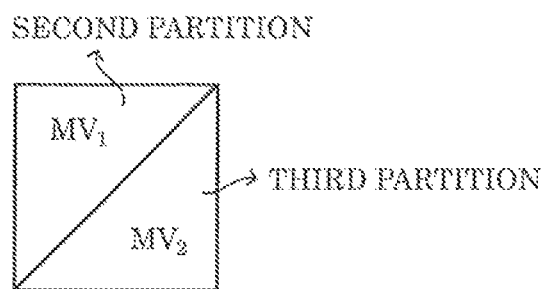
IF FIRST COST + THIRD COST ≤ SECOND COST + FOURTH COST, SPLITTING DIRECTION IS FROM TOP-RIGHT CORNER TO BOTTOM-LEFT CORNER
(b)
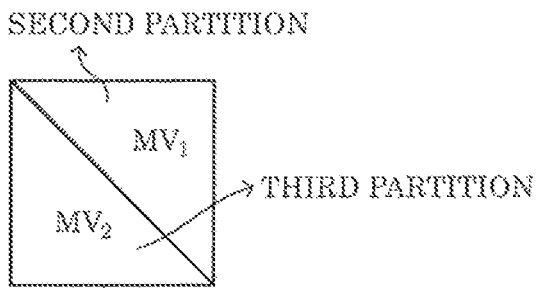
IF FIRST COST + THIRD COST > SECOND COST + FOURTH COST, SPLITTING DIRECTION IS FROM TOP-LEFT CORNER TO BOTTOM-RIGHT CORNER

FIG. 16

| PARAMETER VALUE | SHIFTING DIRECTION FOR FIRST PARTITION | MOTION VECTOR OF SECOND PARTITION (IN FIRST MOTION VECTOR CANDIDATE LIST) | MOTION VECTOR OF THIRD PARTITION (IN SECOND MOTION VECTOR CANDIDATE LIST) |
|---|---|---|---|
| 0 | FROM TOP-LEFT CORNER TO BOTTOM-RIGHT CORNER | SECOND MOTION VECTOR | FIRST MOTION VECTOR |
| ~~1~~ | ~~FROM TOP-RIGHT CORNER TO BOTTOM-LEFT CORNER~~ | ~~SECOND MOTION VECTOR~~ | ~~FIRST MOTION VECTOR~~ |
| ~~1~~ 2 | ~~FROM TOP-LEFT CORNER TO BOTTOM-RIGHT CORNER~~ | FIRST MOTION VECTOR | SECOND MOTION VECTOR |
| ~~2~~ 4 | ~~FROM TOP-RIGHT CORNER TO BOTTOM-LEFT CORNER~~ | SECOND MOTION VECTOR | FORTH MOTION VECTOR |
| ~~3~~ 4 | ~~FROM TOP-RIGHT CORNER TO BOTTOM-LEFT CORNER~~ | THIRD MOTION VECTOR | THIRD MOTION VECTOR |
| ~~4~~ 5 | ~~FROM TOP-RIGHT CORNER TO BOTTOM-LEFT CORNER~~ | FORTH MOTION VECTOR | FIRST MOTION VECTOR |
| ~~5~~ 6 | ~~FROM TOP-RIGHT CORNER TO BOTTOM-LEFT CORNER~~ | ... | FIRST MOTION VECTOR |

(Note on row with parameter value 1: THIS CONDITION IS THE SAME AS THE CONDITION WHEN THE PARAMETER VALUE IS EQUAL TO 0.)

FIG. 21

| PARAMETER VALUE | SPLITTING DIRECTION FOR FIRST PARTITION | TWO MOTION VECTORS (IN MOTION VECTOR CANDIDATE LIST) |
|---|---|---|
| 0 | DIRECTION FROM TOP-LEFT CORNER TO BOTTOM-RIGHT CORNER | SECOND AND FIRST MOTION VECTORS |
| 1 | DIRECTION FROM TOP-RIGHT CORNER TO BOTTOM-LEFT CORNER | SECOND AND FIRST MOTION VECTORS |
| ~~2~~ | ~~DIRECTION FROM TOP-RIGHT CORNER TO BOTTOM-LEFT CORNER~~ | ~~FIRST AND SECOND MOTION VECTORS~~ |
| ~~2~~ 3 | DIRECTION FROM TOP-LEFT CORNER TO BOTTOM-RIGHT CORNER | SECOND AND FOURTH MOTION VECTORS |
| ~~3~~ 4 | DIRECTION FROM TOP-RIGHT CORNER TO BOTTOM-LEFT CORNER | SECOND AND THIRD MOTION VECTORS |
| ~~4~~ 5 | DIRECTION FROM TOP-LEFT CORNER TO BOTTOM-RIGHT CORNER | THIRD AND FIRST MOTION VECTORS |
| ~~5~~ 6 | DIRECTION FROM TOP-LEFT CORNER TO BOTTOM-RIGHT CORNER | FOURTH AND FIRST MOTION VECTORS |
| ... | | |

THE CONDITION IS THE SAME AS THE CONDITION WHEN THE PARAMETER VALUE IS EQUAL TO 1.

FIG. 26

| PARAMETER VALUE | SPLITTING DIRECTION FOR FIRST PARTITION | TWO MOTION VECTORS (IN MOTION VECTOR CANDIDATE LIST) |
|---|---|---|
| 0 | DIRECTION FROM TOP-LEFT CORNER TO BOTTOM-RIGHT CORNER | SECOND AND FIRST MOTION VECTORS |
| 1 | DIRECTION FROM TOP-RIGHT CORNER TO BOTTOM-LEFT CORNER | SECOND AND FIRST MOTION VECTORS |
| 2 | DIRECTION FROM TOP-RIGHT CORNER TO BOTTOM-LEFT CORNER | FIRST AND SECOND MOTION VECTORS |
| 13 | DIRECTION FROM TOP-LEFT CORNER TO BOTTOM-RIGHT CORNER | SECOND AND FOURTH MOTION VECTORS |
| 24 | DIRECTION FROM TOP-RIGHT CORNER TO BOTTOM-LEFT CORNER | SECOND AND THIRD MOTION VECTORS |
| 35 | DIRECTION FROM TOP-LEFT CORNER TO BOTTOM-RIGHT CORNER | THIRD AND FIRST MOTION VECTORS |
| 46 | DIRECTION FROM TOP-LEFT CORNER TO BOTTOM-RIGHT CORNER | FOURTH AND FIRST MOTION VECTORS |
| ... | | |

Callouts:
- THIS CONDITION IS THE SAME AS THE CONDITION WHEN THE PARAMETER VALUE IS EQUAL TO 0. (pointing to row with parameter value 1)
- THIS CONDITION IS THE SAME AS THE CONDITION WHEN THE PARAMETER VALUE IS EQUAL TO 0. (pointing to row with parameter value 2)

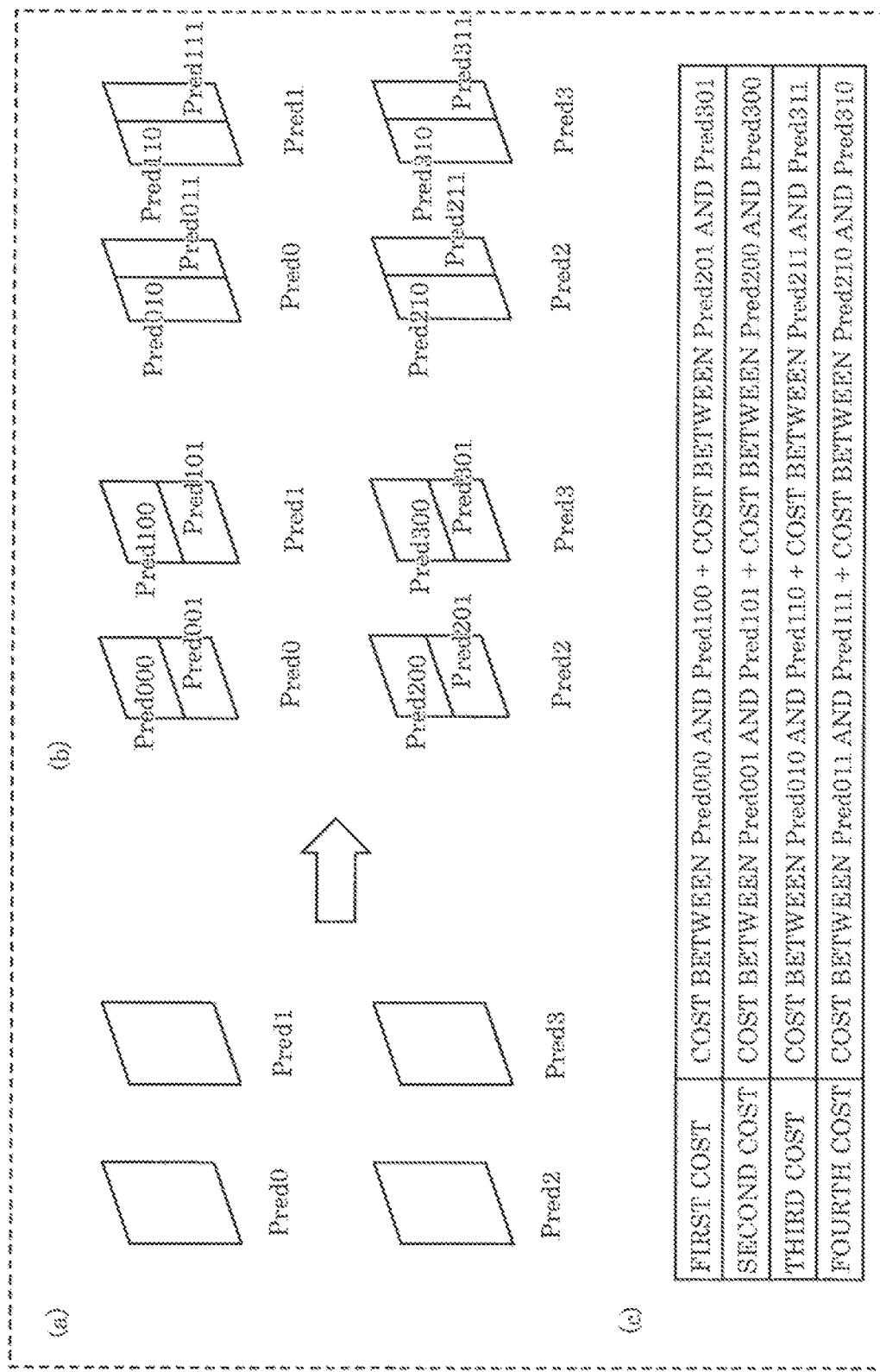

ENCODER, DECODER, ENCODING METHOD, AND DECODING METHOD

FIELD

The present disclosure relates to, for instance, an encoder which encodes videos.

BACKGROUND

H.265 also referred to as high efficiency video coding (HEVC) is present (Non-patent Literature (NPL) 1) as a conventional video encoding standard.

CITATION LIST

Non-Patent Literature

[NPL 1] H.265 (ISO/IEC 23008-2 HEVC)/HEVC (High Efficiency Video Coding)

SUMMARY

Technical Problem

However, it is not easy to adaptively determine information related to splitting based on characteristics of neighboring samples in, for instance, video encoding, while inhibiting an increase in the amount of processing.

In view of this, non-limiting and exemplary embodiments provide an encoder which can adaptively determine information related to splitting, based on characteristics of neighboring samples, while inhibiting an increase in the amount of processing.

Solution to Problem

An encoder according to an aspect of the present disclosure is an encoder which encodes a video, the encoder including: circuitry; and memory coupled to the circuitry. Using the memory, the circuitry: obtains at least two items of prediction information for a first partition included in the video; derives at least one template from a plurality of neighboring samples which neighbor the first partition; calculates at least two costs, using the at least one template and the at least two items of prediction information; using the at least two costs, (i) determines at least one splitting direction for the first partition or (ii) assigns one of the at least two items of prediction information to a second partition split from the first partition according to the at least one splitting direction, and another of the at least two items of prediction information to a third partition split from the first partition according to the at least one splitting direction; and encodes the first partition according to the at least one splitting direction and the at least two items of prediction information.

Note that these general and specific aspects may be implemented using a system, a device, a method, an integrated circuit, a computer program, or a non-transitory computer-readable recording medium such as a CD-ROM, or any combination of systems, devices, methods, integrated circuits, computer programs, or computer-readable recording media.

Additional benefits and advantages of the disclosed embodiments will be apparent from the specification and the drawings. The benefits and/or advantages may be individually obtained by various embodiments and features of the specification and the drawings which need not be all provided in order to obtain one or more of the benefits and/or advantages.

Advantageous Effects

An encoder according to an aspect of the present disclosure can adaptively determine information related to splitting based on characteristics of neighboring samples, while inhibiting an increase in the amount of processing.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type.

FIG. 5C is a conceptual diagram for illustrating an outline of a prediction image correction process performed via OBMC processing.

FIG. 14 illustrates examples of processing in step S1003 in FIG. 11.

FIG. 16 illustrates examples of parameters in the first aspect.

FIG. 21 illustrates examples of parameters in the second aspect.

FIG. 26 illustrates examples of parameters when the first aspect and the second aspect are combined.

FIG. 38B illustrates other examples of cost calculation in the fourth aspect.

Figure 1:
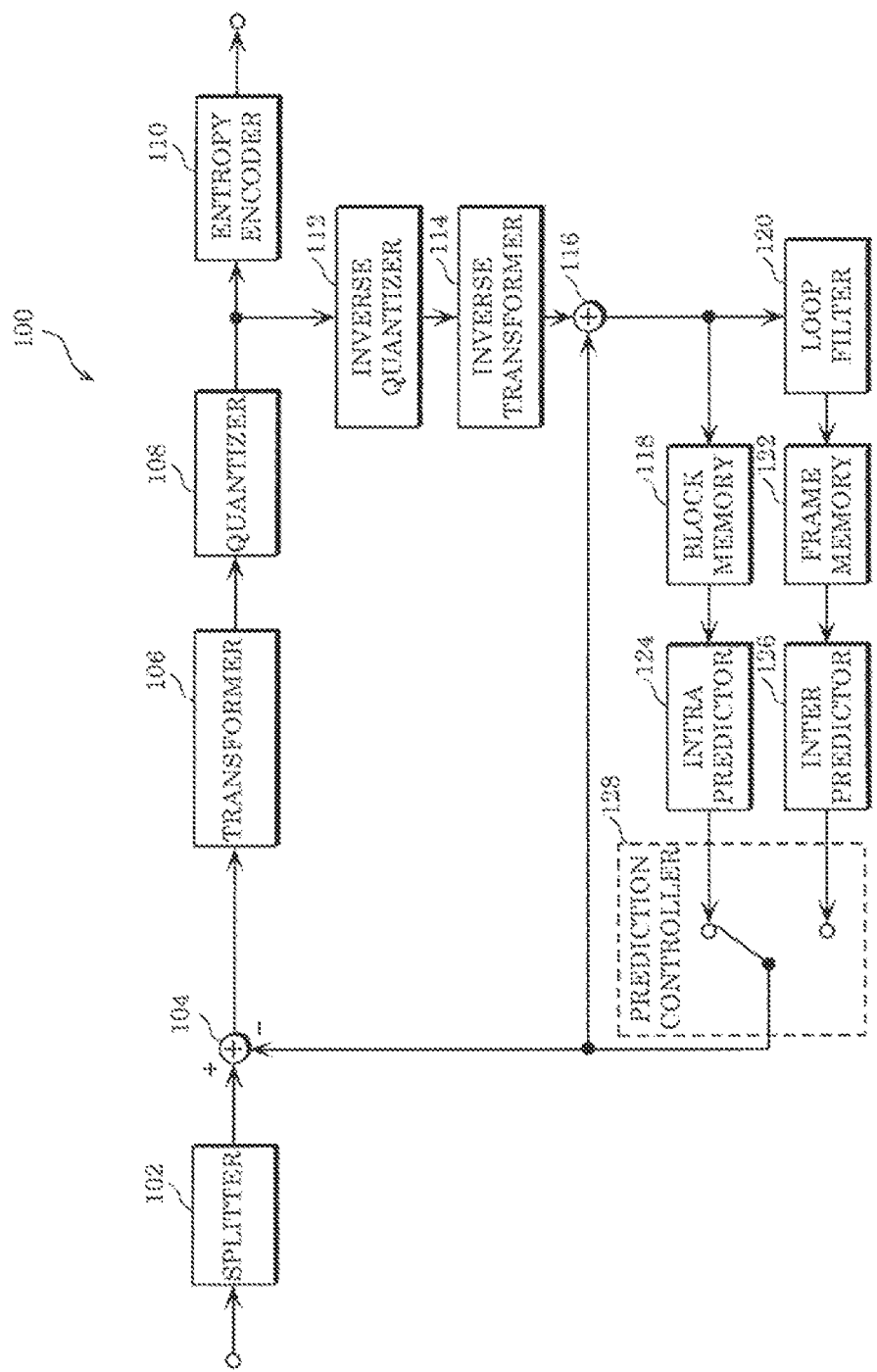
FIG. 1 is a block diagram illustrating a functional configuration of an encoder according to Embodiment 1.

DESCRIPTION OF EMBODIMENTS (Outline of Aspects of the Present Disclosure)

For example, an encoder according to an aspect of the present disclosure is an encoder which encodes a video, the encoder including: circuitry; and memory coupled to the circuitry. Using the memory, the circuitry: obtains at least two items of prediction information for a first partition included in the video; derives at least one template from a plurality of neighboring samples which neighbor the first partition; calculates at least two costs, using the at least one template and the at least two items of prediction information; using the at least two costs, (i) determines at least one splitting direction for the first partition or (ii) assigns one of the at least two items of prediction information to a second partition split from the first partition according to the at least one splitting direction, and another of the at least two items of prediction information to a third partition split from the first partition according to the at least one splitting direction; and encodes the first partition according to the at least one splitting direction and the at least two items of prediction information.

Accordingly, based on characteristics of neighboring samples, the encoder can adaptively determine a splitting direction or assign prediction information to the split partitions. Thus, the encoder can adaptively determine information related to splitting, based on characteristics of neighboring samples. In addition, neighboring samples can be used by the same method in video encoding processing and video decoding processing. Accordingly, the encoder does not need to encode information adaptively determined. Thus, the encoding amount can be reduced.

For example, the at least two items of prediction information are motion vectors.

Accordingly, the encoder can appropriately calculate costs for use in determining information related to splitting, using the motion vectors.

For example, the at least two items of prediction information are merge candidates.

Accordingly, the encoder can appropriately calculate costs for use in determining information related to splitting, using the merge candidates.

For example, the at least two items of prediction information are intra prediction modes.

Accordingly, the encoder can appropriately calculate costs for use in determining information related to splitting, using the intra prediction modes.

For example, the at least one template includes a template derived from an upper neighboring sample located above the first partition, among the plurality of neighboring samples.

Accordingly, the encoder can adaptively determine information related to splitting, based on characteristics of the upper neighboring sample.

For example, the at least one template includes a template derived from a left neighboring sample located on a left of the first partition, among the plurality of neighboring samples.

Accordingly, the encoder can adaptively determine information related to splitting, based on characteristics of the left neighboring sample.

For example, the at least one template includes a template derived from an upper neighboring sample located above the first partition, and a template derived from a left neighboring sample located on a left of the first partition, among the plurality of neighboring samples.

Accordingly, the encoder can adaptively determine information related to splitting, based on characteristics of the upper neighboring sample and characteristics of the left neighboring sample.

For example, calculation of the at least two costs includes at least a minus operation.

Accordingly, the encoder can appropriately calculate costs, based on the minus operation.

For example, the second partition and the third partition are triangular partitions.

Accordingly, the encoder can adaptively determine information associated with splitting a partition into two triangular partitions, based on characteristics of neighboring samples.

For example, the second partition and the third partition are rectangular partitions.

Accordingly, the encoder can adaptively determine information associated with splitting a partition into two rectangular partitions, based on characteristics of neighboring samples.

For example, the at least one splitting direction is a direction from a top-left corner to a bottom-right corner of the first partition or a direction from a top-right corner to a bottom-left corner of the first partition.

Accordingly, the encoder can adaptively determine information related to splitting in an oblique direction, based on characteristics of neighboring samples.

For example, the at least one splitting direction is horizontal or vertical.

Accordingly, the encoder can adaptively determine information related to splitting in the horizontal direction or the vertical direction, based on characteristics of neighboring samples.

For example, the at least two items of prediction information include first prediction information and second prediction information different from the first prediction information, and the first prediction information and the second prediction information are obtained for the second partition and the third partition in the first partition, respectively.

Accordingly, the encoder can appropriately determine information related to splitting, using the first prediction information for the second partition and the second prediction information for the third partition.

For example, using the at least two costs, the circuitry (i) determines at least one splitting direction for the first partition, and (ii) assigns one of the at least two items of prediction information to the second partition, and another of the at least two items of prediction information to the third partition.

Accordingly, the encoder can adaptively perform both determination of a splitting direction and assignment of prediction information, based on characteristics of neighboring samples.

For example, the at least two costs are calculated using at least two prediction partitions predicted from at least two reference frames of the first partition using the at least two items of prediction information.

Accordingly, the encoder can appropriately calculate costs using the prediction partitions.

For example, a decoder according to an aspect of the present disclosure is a decoder which decodes a video, the decoder including: circuitry; and memory coupled to the circuitry. Using the memory, the circuitry: obtains at least two items of prediction information for a first partition included in the video; derives at least one template from a plurality of neighboring samples which neighbor the first partition; calculates at least two costs, using the at least one template and the at least two items of prediction information; using the at least two costs, (i) determines at least one splitting direction for the first partition or (ii) assigns one of the at least two items of prediction information to a second partition split from the first partition according to the at least one splitting direction, and another of the at least two items of prediction information to a third partition split from the first partition according to the at least one splitting direction; and decodes the first partition according to the at least one splitting direction and the at least two items of prediction information.

Accordingly, the decoder can adaptively determine a splitting direction or assign prediction information to the split partitions, based on characteristics of neighboring samples. Thus, the decoder can adaptively determine information related to splitting, based on characteristics of neighboring samples. The neighboring samples can be used by the same method in video encoding processing and video decoding processing. Accordingly, the decoder does not need to decode information determined adaptively. Accordingly, the encoding amount can be reduced.

For example, the at least two items of prediction information are motion vectors.

Accordingly, the decoder can appropriately calculate costs for use in determining information related to splitting, using the motion vectors.

For example, the at least two items of prediction information are merge candidates.

Accordingly, the decoder can appropriately calculate costs for use in determining information related to splitting, using the merge candidates.

For example, the at least two items of prediction information are intra prediction modes.

Accordingly, the encoder can appropriately calculate costs for use in determining information related to splitting, using the intra prediction modes.

For example, the at least one template includes a template derived from an upper neighboring sample located above the first partition, among the plurality of neighboring samples.

Accordingly, the encoder can adaptively determine information related to splitting, based on characteristics of the upper neighboring sample.

For example, the at least one template includes a template derived from a left neighboring sample located on a left of the first partition, among the plurality of neighboring samples.

Accordingly, the encoder can adaptively determine information related to splitting, based on characteristics of the left neighboring sample.

For example, the at least one template includes a template derived from an upper neighboring sample located above the first partition, and a template derived from a left neighboring sample located on a left of the first partition, among the plurality of neighboring samples.

Accordingly, the encoder can adaptively determine information related to splitting, based on characteristics of the upper neighboring sample and characteristics of the left neighboring sample.

For example, calculation of the at least two costs includes at least a minus operation.

Accordingly, the encoder can appropriately calculate costs, based on the minus operation.

For example, the second partition and the third partition are triangular partitions.

Accordingly, the encoder can adaptively determine information associated with splitting a partition into two triangular partitions, based on characteristics of neighboring samples.

For example, the second partition and the third partition are rectangular partitions.

Accordingly, the encoder can adaptively determine information associated with splitting a partition into two rectangular partitions, based on characteristics of neighboring samples.

For example, the at least one splitting direction is a direction from a top-left corner to a bottom-right corner of the first partition or a direction from a top-right corner to a bottom-left corner of the first partition.

Accordingly, the encoder can adaptively determine information related to splitting in an oblique direction, based on characteristics of neighboring samples.

For example, the at least one splitting direction is horizontal or vertical.

Accordingly, the encoder can adaptively determine information related to splitting in the horizontal direction or the vertical direction, based on characteristics of neighboring samples.

For example, the at least two items of prediction information include first prediction information and second prediction information different from the first prediction information, and the first prediction information and the second prediction information are obtained for the second partition and the third partition in the first partition, respectively.

Accordingly, the encoder can appropriately determine information related to splitting, using the first prediction information for the second partition and the second prediction information for the third partition.

For example, using the at least two costs, the circuitry (i) determines at least one splitting direction for the first partition, and (ii) assigns one of the at least two items of prediction information to the second partition, and another of the at least two items of prediction information to the third partition.

Accordingly, the encoder can adaptively perform both determination of a splitting direction and assignment of prediction information, based on characteristics of neighboring samples.

For example, the at least two costs are calculated using at least two prediction partitions predicted from at least two reference frames of the first partition using the at least two items of prediction information.

Accordingly, the encoder can appropriately calculate costs, using the prediction partitions.

For example, an encoding method according to an aspect of the present disclosure is an encoding method for encoding a video, the encoding method including: obtaining at least two items of prediction information for a first partition included in the video; deriving at least one template from a plurality of neighboring samples which neighbor the first partition; calculating at least two costs, using the at least one template and the at least two items of prediction information; (i) determining at least one splitting direction for the first partition, using the at least two costs or (ii) assigning, using the at least two costs, one of the at least two items of prediction information to a second partition split from the first partition according to the at least one splitting direction, and another of the at least two items of prediction information to a third partition split from the first partition according to the at least one splitting direction; and encoding the first partition according to the at least one splitting direction and the at least two items of prediction information.

Accordingly, based on characteristics of neighboring samples, the splitting direction can be adaptively determined or prediction information can be adaptively assigned to the split partitions. Accordingly, information related to splitting can be adaptively determined, based on characteristics of neighboring samples. In addition, neighboring samples can be used by the same method in video encoding processing and video decoding processing. Accordingly, information adaptively determined does not need to be encoded. Thus, the encoding amount can be reduced.

For example, a decoding method according to an aspect of the present disclosure is a decoding method for decoding a video, the decoding method including: obtaining at least two items of prediction information for a first partition included in the video; deriving at least one template from a plurality of neighboring samples which neighbor the first partition; calculating at least two costs, using the at least one template and the at least two items of prediction information; (i) determining at least one splitting direction for the first partition, using the at least two costs or (ii) assigning, using the at least two costs, one of the at least two items of prediction information to a second partition split from the first partition according to the at least one splitting direction, and another of the at least two items of prediction information to a third partition split from the first partition according to the at least one splitting direction; and decoding the first partition according to the at least one splitting direction and the at least two items of prediction information.

Accordingly, based on characteristics of neighboring samples, the splitting direction can be adaptively determined or prediction information can be adaptively assigned to the split partitions. Accordingly, information related to splitting can be adaptively determined, based on characteristics of neighboring samples. In addition, neighboring samples can be used by the same method in video encoding processing and video decoding processing. Accordingly, information adaptively determined does not need to be decoded. Thus, the encoding amount can be reduced.

Furthermore, these general and specific aspects may be implemented using a system, a device, a method, an integrated circuit, a computer program, a computer-readable non-transitory recording medium such as a CD-ROM, or any combination of systems, devices, methods, integrated circuits, computer programs, or recording media.

Hereinafter, embodiments will be described with reference to the drawings.

Note that the embodiments described below each show a general or specific example. The numerical values, shapes, materials, components, the arrangement and connection of the components, steps, order of the steps, etc., indicated in the following embodiments are mere examples, and therefore are not intended to limit the scope of the claims. Therefore, among the components in the following embodiments, those not recited in any of the independent claims defining the broadest inventive concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
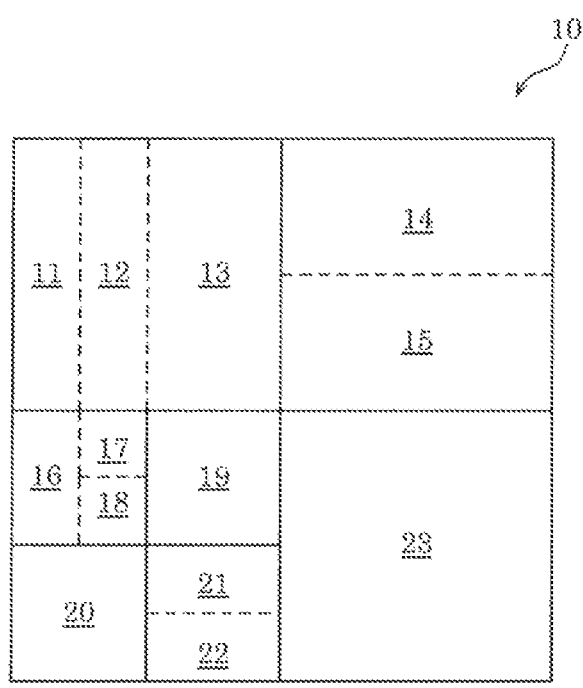
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
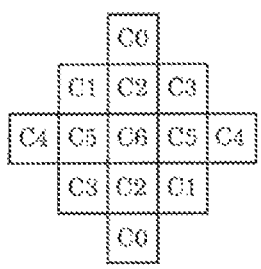
FIG. 4A illustrates one example of a filter shape used in ALF.
Figure 4B:
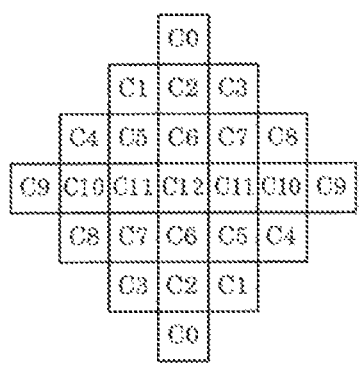
FIG. 4B illustrates another example of a filter shape used in ALF.
Figure 4C:
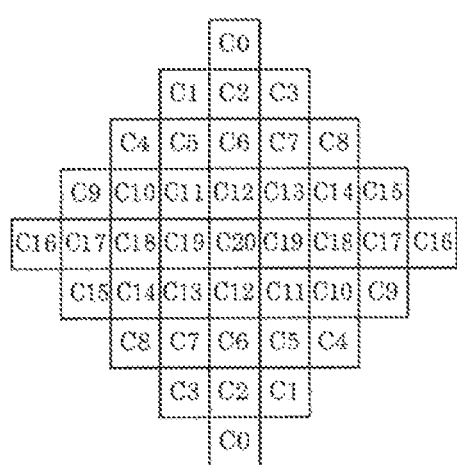
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPL 1).

Figure 5A:
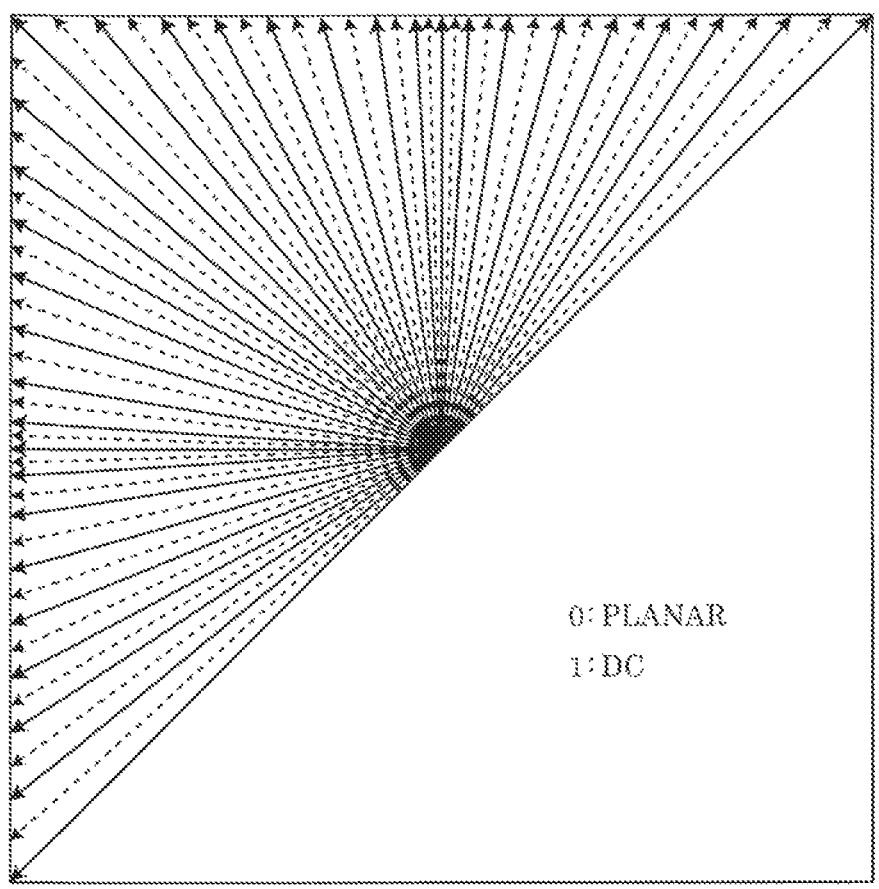
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients.

Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
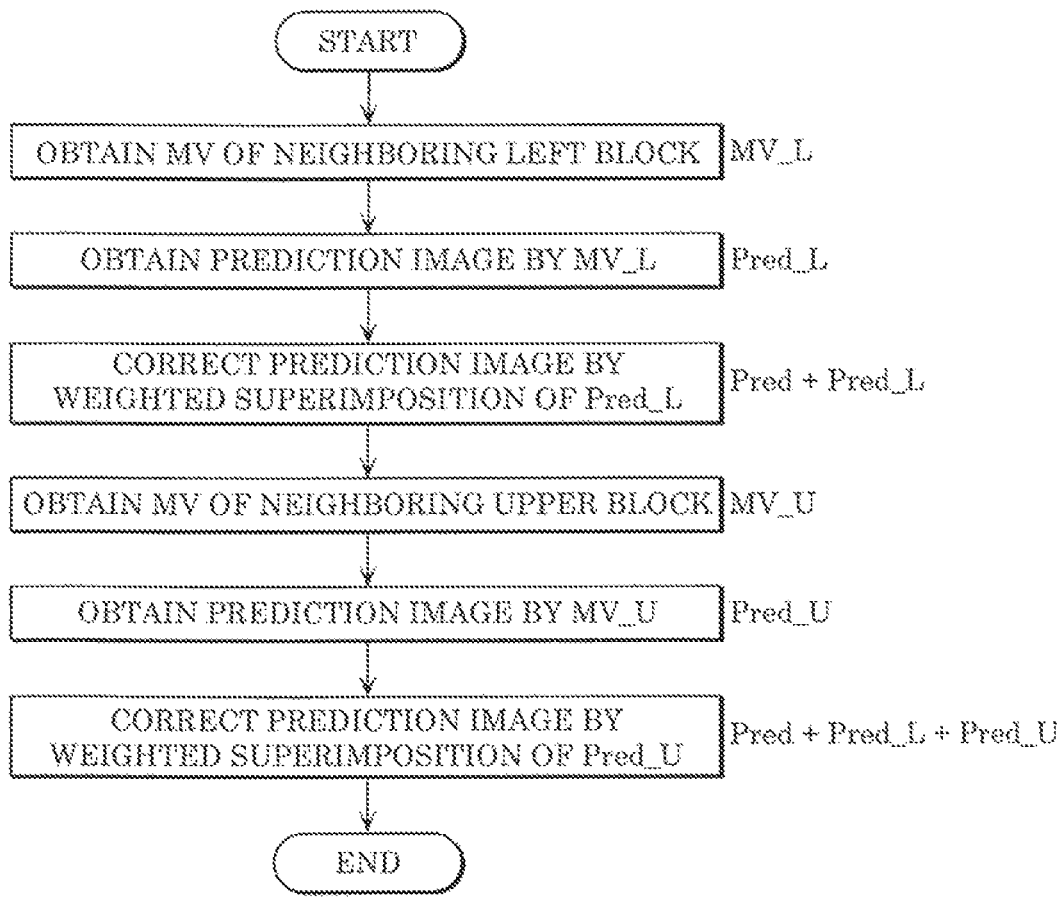
FIG. 5B is a flow chart for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
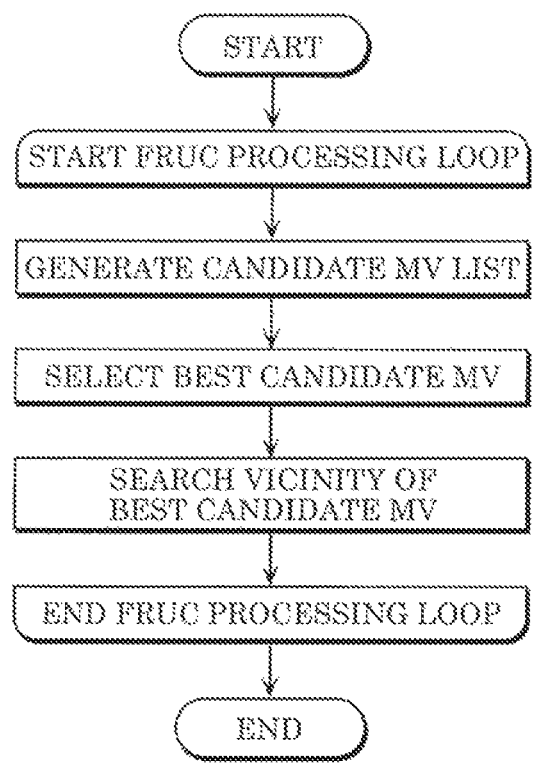
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
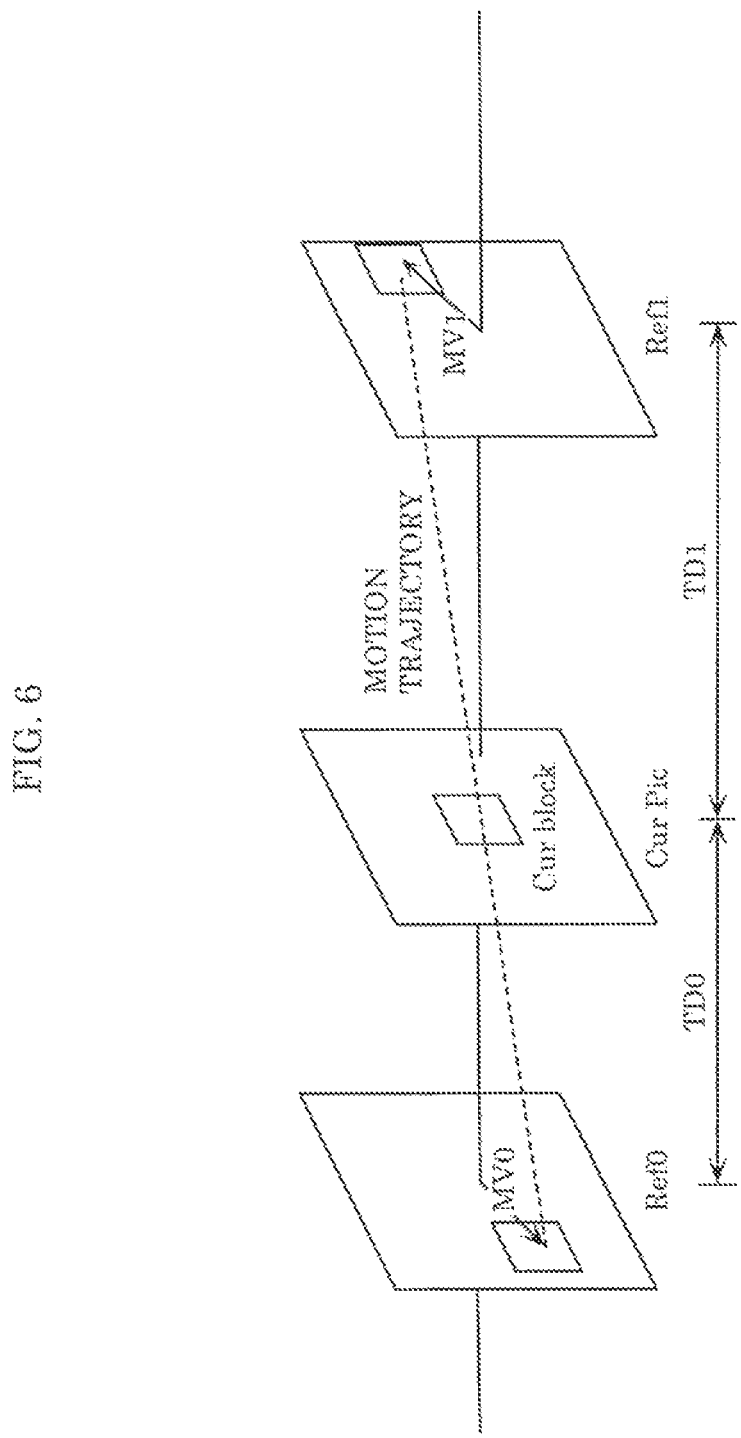
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
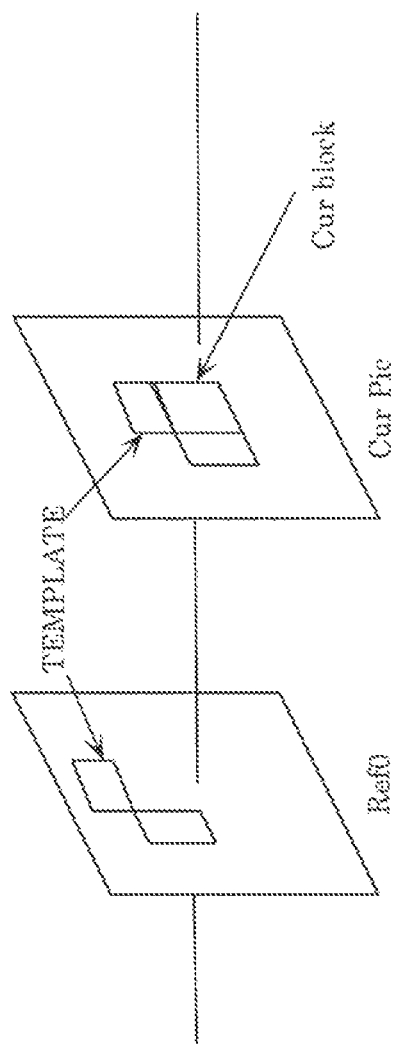
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
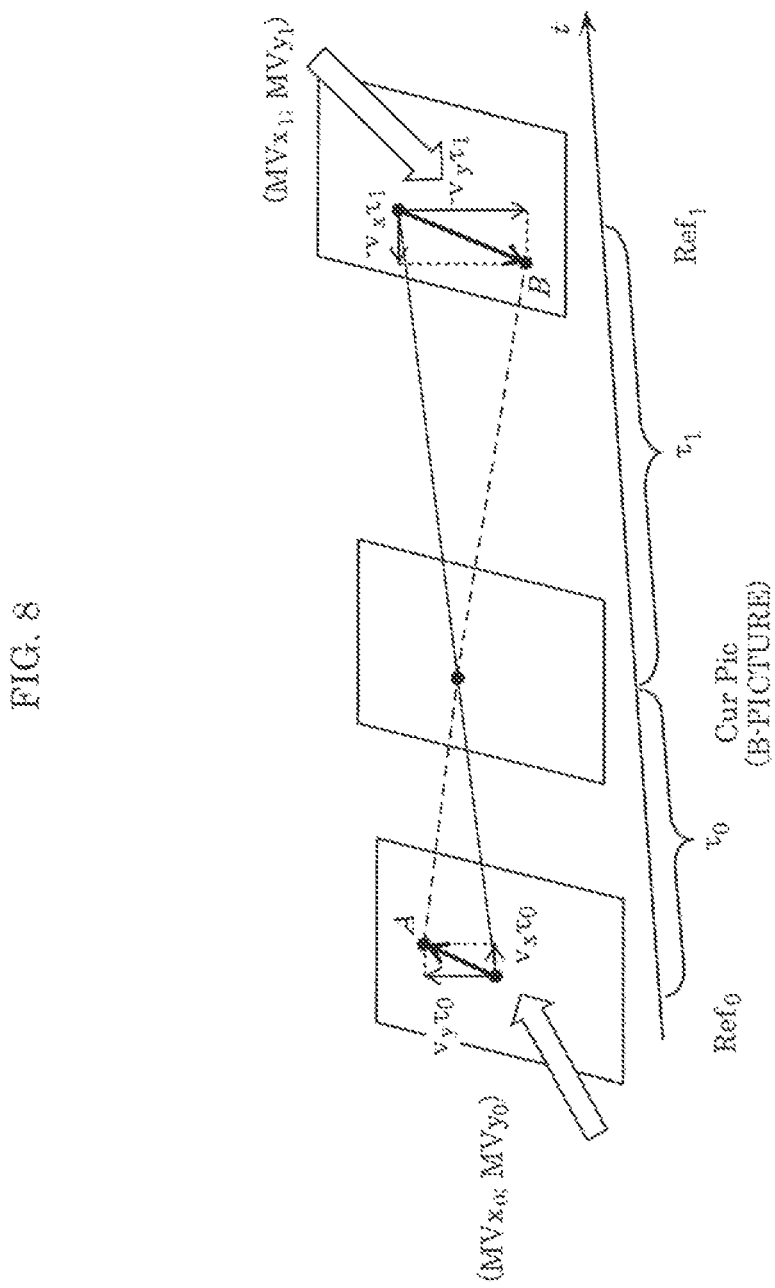
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref1.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
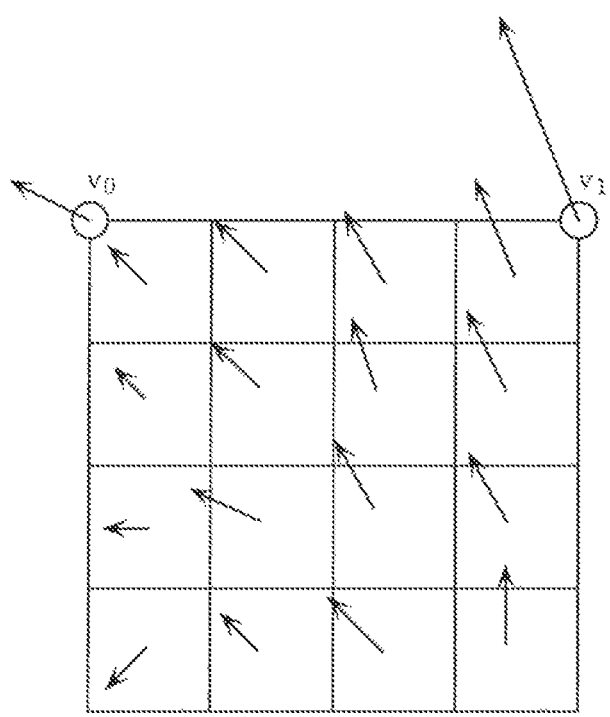
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Figure 9B:
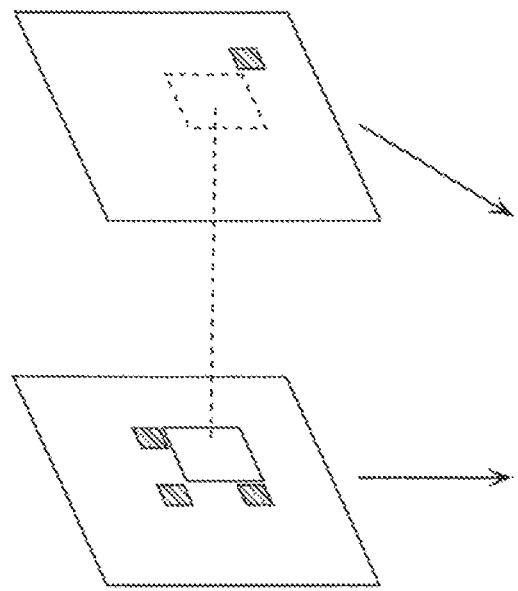
FIG. 9B is for illustrating an outline of a process for deriving a motion vector via merge mode.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
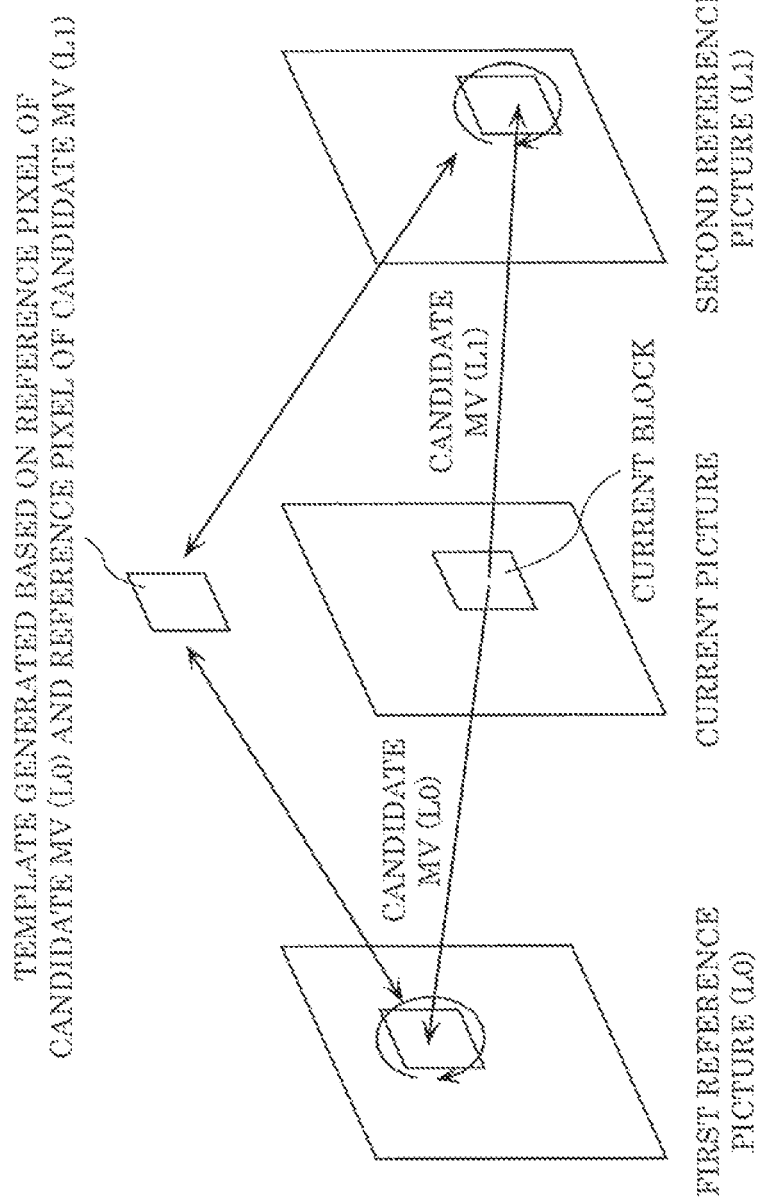
FIG. 9C is a conceptual diagram for illustrating an outline of DMVR processing.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
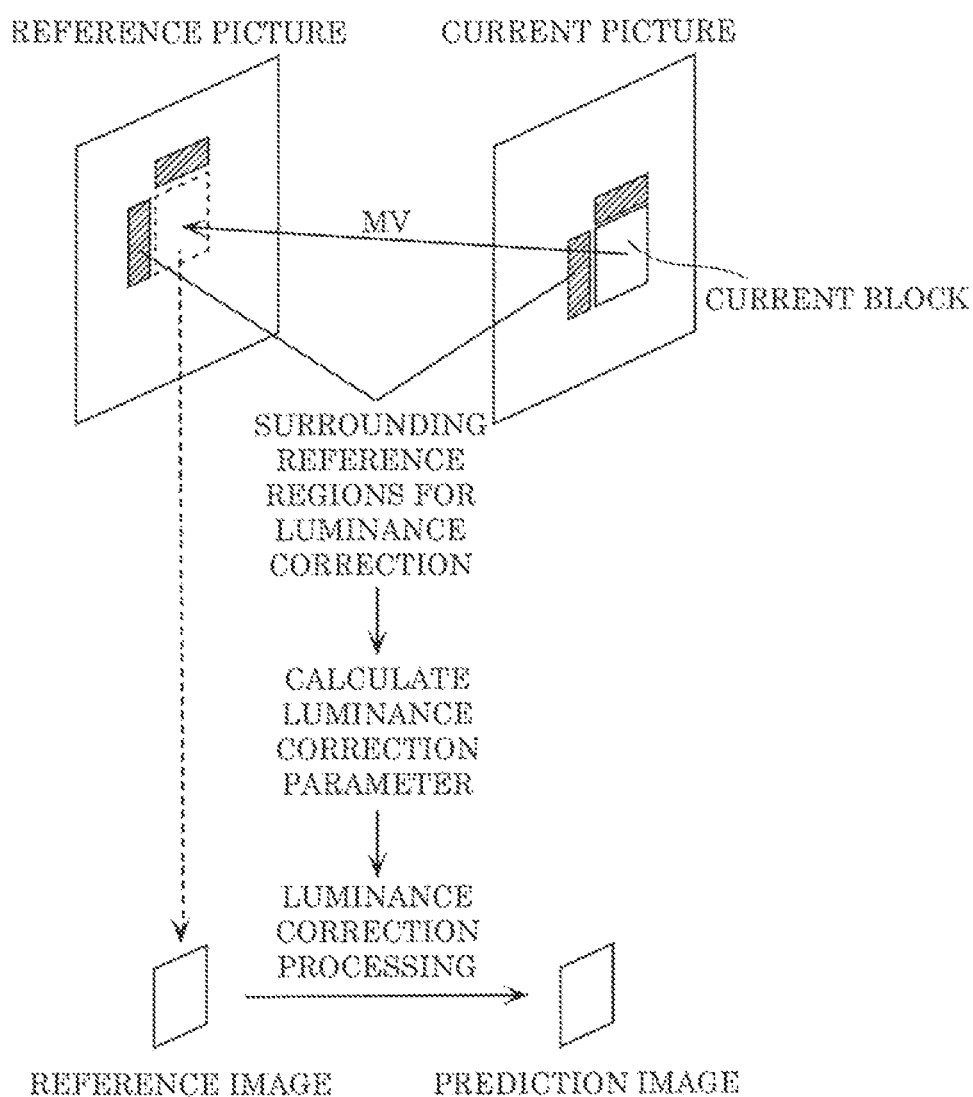
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
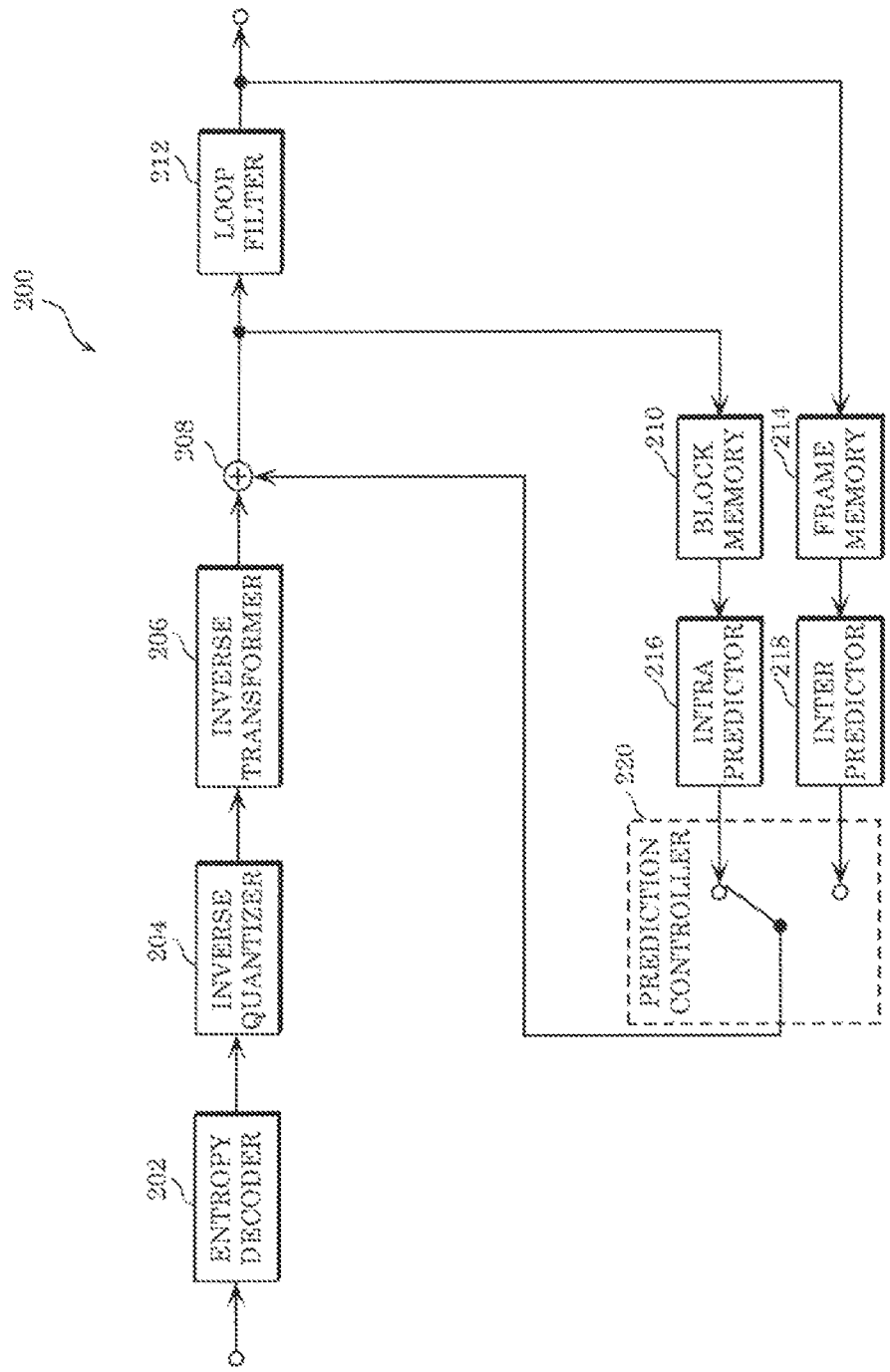
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

[First Aspect]

A first aspect describes an example of inter prediction processing performed by inter predictor 126. Inter predictor 126 obtains at least two items of prediction information for a first partition included in a video. For example, the prediction information may be a motion vector. Inter predictor 126 derives at least one template from a plurality of neighboring samples which neighbor the first partition. For example, a neighboring sample may be a plurality of pixels which neighbor the first partition. Note that a partition is a region included in a video. More specifically, a partition may be a block which is a region in a picture included in a video. Further, a template may be a reference block, for example.

Inter predictor 126 calculates at least two template costs, using at least one template and at least two items of prediction information. In this aspect, a template cost (hereafter, simply referred to as a cost) is used to determine a splitting direction for the first partition. In other words, inter predictor 126 determines the splitting direction for the first partition using at least two costs. Accordingly, a second partition and a third partition are split from the first partition according to the splitting direction. Stated differently, the second and third partitions are obtained by splitting the first partition. The following specifically describes inter prediction processing according to this aspect with reference to the drawings.

Figure 11:
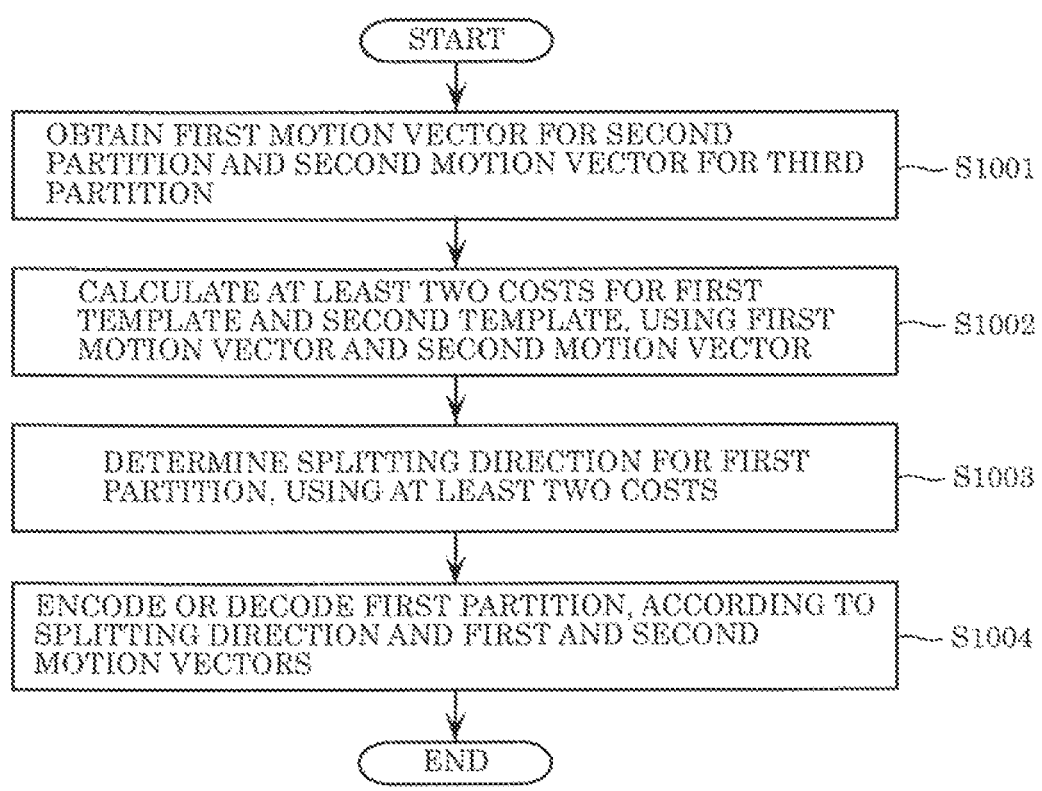
FIG. 11 is a flowchart illustrating an example of inter prediction processing according to a first aspect.

FIG. 11 is a flowchart illustrating an example of inter prediction processing in the first aspect. Here, an example of processing of performing inter prediction on the second partition and the third partition is to be described.

As illustrated in FIG. 11, in step S1001, a first motion vector is obtained for the second partition. Similarly, a second motion vector is obtained for the third partition. For example, the first motion vector and the second motion vector may be derived from blocks spatially or temporally near the first partition. Here, the first motion vector and the second motion vector are derived from blocks spatially neighboring the first partition.

Figure 12:
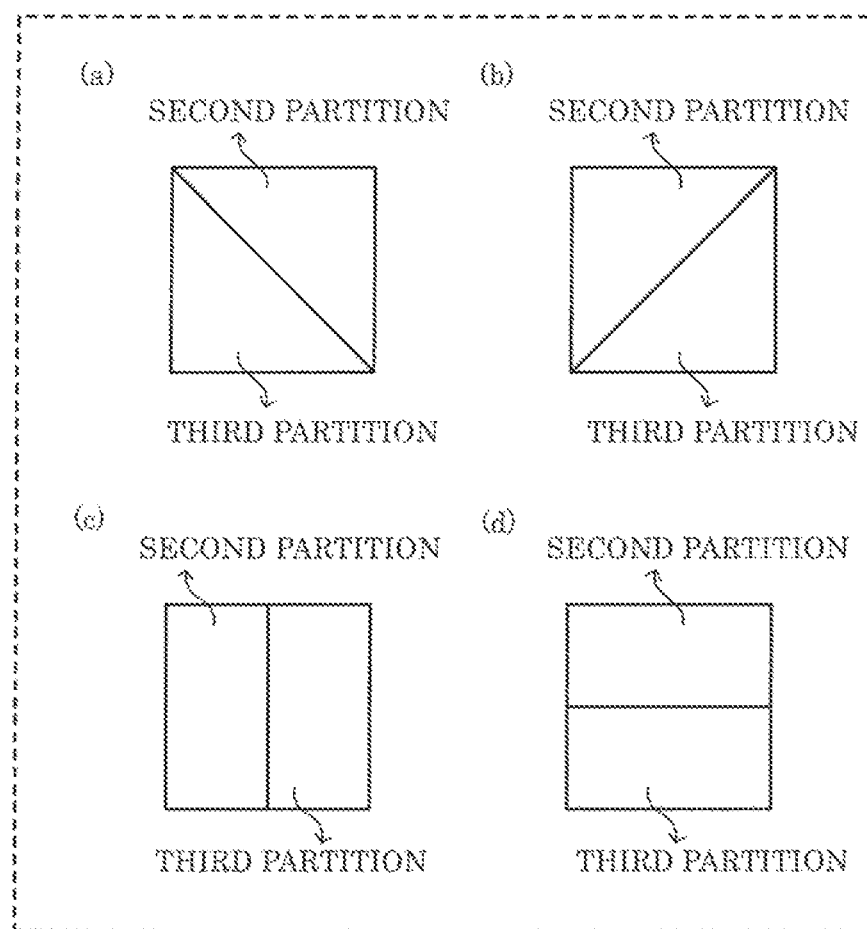
FIG. 12 illustrates examples of a second partition and a third partition in the first aspect.

FIG. 12 illustrates examples of the second partition and the third partition in the first aspect. Here, examples of the second partition and the third partition which are split from the first partition are illustrated. The second partition and the third partition may be triangular partitions as illustrated in (a) and (b) of FIG. 12, and may be rectangular partitions as illustrated in (c) and (d) of FIG. 12. The shape of the second partition and the third partition is not limited to the above shape, and the second partition and the third partition may be non-rectangular partitions. Examples of a non-rectangular shape include a trapezoid, a pentagon, a hexagon, and so on.

Next, in step S1002, at least two costs for a first template and a second template are calculated using the first motion vector and the second motion vector obtained in step S1001. The first template and the second template are derived from a plurality of neighboring samples which neighbor the first partition. At least one of the first template and the second template may be derived from an upper neighboring sample located above the first partition among the plurality of neighboring samples. Further, at least one of the first template and the second template may be derived from a left neighboring sample located on the left of the first partition among the plurality of neighboring samples. Here, the first template is derived from the upper neighboring sample above the first partition. Further, the second template is derived from the left neighboring sample on the left of the first partition. Specifically, as illustrated in (a) of FIG. 13, the first template is a neighboring block having a side that is the upper side of the first partition, and the second template is a neighboring block having a side that is the left side of the first partition.

Figure 13:
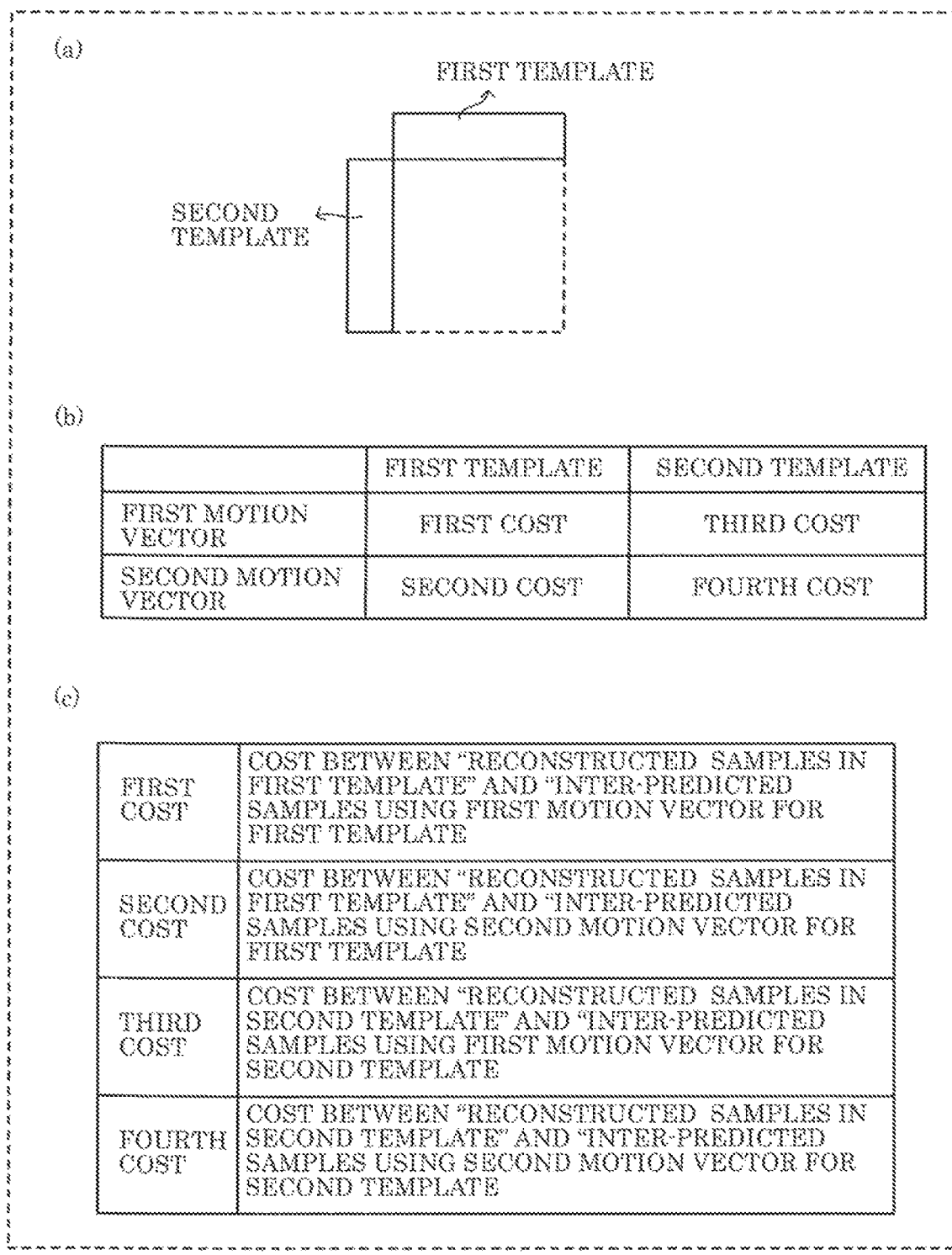
FIG. 13 illustrates examples of cost calculation in the first aspect.

FIG. 13 illustrates an example of calculation of costs in the first aspect. In FIG. 13, (a) illustrates examples of templates. In FIG. 13, (b) illustrates examples of at least two costs calculated using at least one template and at least two items of prediction information. In FIG. 13, (c) is a diagram for describing examples of the calculated costs.

As illustrated in (b) of FIG. 13, at least two costs are calculated for each of the first template and the second template, using the first motion vector and the second motion vector, in step S1002. A first cost is calculated using the first template and the first motion vector, and a second cost is calculated using the first template and the second motion vector. Further, a third cost is calculated using the second template and the first motion vector, and a fourth cost is calculated using the second template and the second motion vector. Calculation of costs may include at least a minus operation. For example, cost calculation which includes a minus operation may be the sum of absolute difference (SAD), sum of square error (SSE), hadamard difference (HAD) or mean-removed SAD.

Costs are obtained by calculation which includes a minus operation for calculating a difference between reconstructed samples in one template and samples inter-predicted using a predetermined motion vector for the one template. Here, as illustrated in (c) of FIG. 13, the first cost is a cost between reconstructed samples in the first template and samples inter-predicted using the first motion vector for the first template. The second cost is a cost between reconstructed samples in the first template and samples inter-predicted using the second motion vector for the first template. The third cost is a cost between reconstructed samples in the second template and samples inter-predicted using the first motion vector for the second template. The fourth cost is a cost between reconstructed samples in the second template and inter-predicted samples using the second motion vector for the second template.

Next, in step S1003, the splitting direction for the first partition is determined using the at least two costs obtained in step S1002. As described with reference to FIG. 12, the second partition and the third partition split from the first partition may be triangular partitions. In this case, the first partition is split in a diagonal direction such as a direction from the top-left corner to the bottom-right corner or a direction from the top-right corner to the bottom-left corner. As described with reference to FIG. 12, the second partition and the third partition may be rectangular partitions. In this case, the first partition is split in the horizontal or vertical direction. Such splitting directions are to be more specifically described, with reference to FIGS. 14 and 15.

FIG. 14 illustrates examples of processing in step S1003 in FIG. 11. FIG. 14 illustrates examples of determining the splitting direction when the first partition is split into two triangular partitions. As illustrated in (a) of FIG. 14, if the sum of the first cost and the third cost is less than or equal to the sum of the second cost and the fourth cost, the splitting direction for the first partition is a direction from the top-right corner to the bottom-left corner. As illustrated in (b) of FIG. 14, if the sum of the first cost and the third cost is greater than the sum of the second cost and the fourth cost, the splitting direction for the first partition is a direction from the top-left corner to the bottom-right corner.

Figure 15:
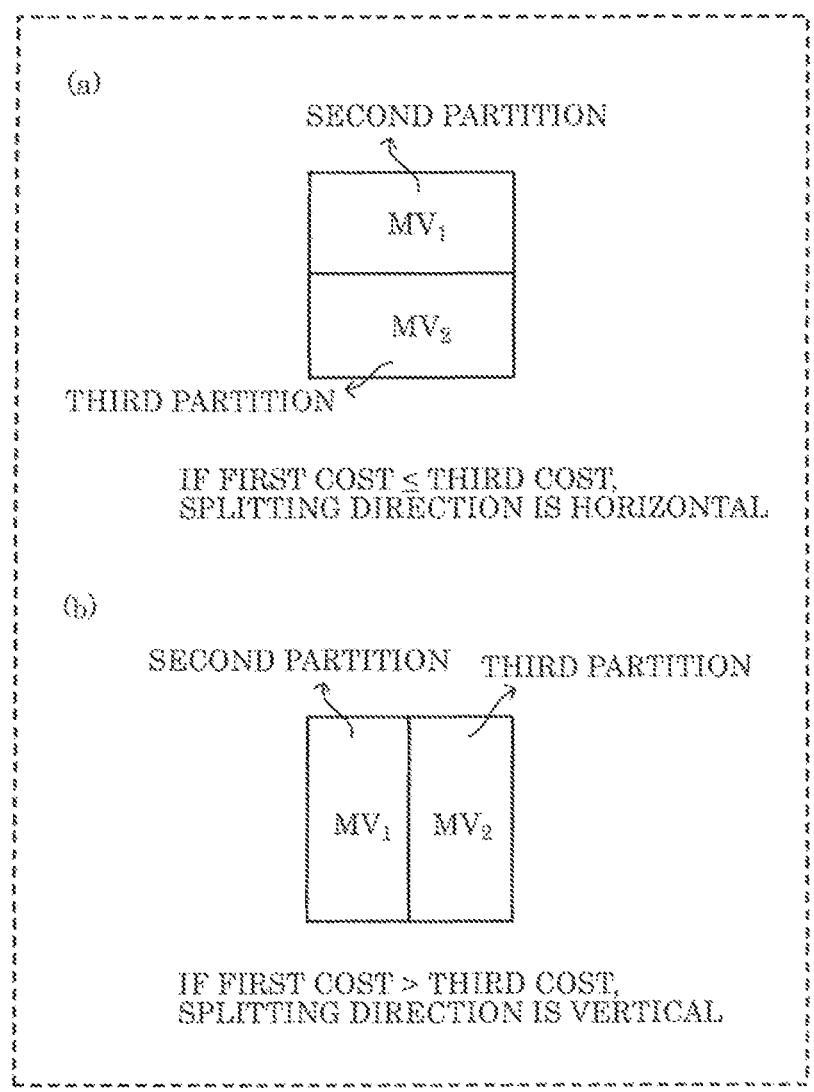
FIG. 15 illustrates other examples of processing in step S1003 in FIG. 11.

FIG. 15 illustrates other examples of processing in step S1003 in FIG. 11. FIG. 15 illustrates examples of determining the splitting direction when the first partition is split into two rectangular partitions. As illustrated in (a) of FIG. 15, if the first cost is less than or equal to the third cost, the splitting direction for the first partition is horizontal. As illustrated in (b) of FIG. 15, if the first cost is greater than the third cost, the splitting direction for the first partition is vertical.

Next, in step S1004, the first partition is encoded or decoded, using the splitting direction determined in step S1003 and the first motion vector and the second motion vector obtained in step S1001. Encoding the first partition may include writing a parameter into a bitstream. Similarly, decoding the first partition may include reading a parameter from a bitstream.

FIG. 16 illustrates examples of parameters in the first aspect.

As illustrated in FIG. 16, the first motion vector and the second motion vector are predicted from a first motion vector candidate list and a second motion vector candidate list, respectively. Parameters (parameter values in FIG. 16) are associated with the first motion vector of the second partition and the second motion vector of the third partition. As illustrated with reference to FIGS. 14 and 15, the splitting direction for the first partition is determined using costs. Accordingly, each parameter may be associated with motion vectors of the second partition and the third partition split from the first partition, but may not be associated with the splitting direction for the first partition. For example, as illustrated in FIG. 16, if parameter values in the first and second rows are compared, the splitting directions for the first partition are different for the parameter values, yet the motion vectors of the first partition and the second partition are the same. Accordingly, it is not necessary to assign, to the parameter value in the second row, a parameter value different from the parameter value in the first row. Accordingly, the encoding amount can be reduced.

The above is a description of an example in which motion vectors are used as at least two items of prediction information when the second partition and the third partition are inter-predicted, but the present disclosure is not limited to this. For example, the at least two items of prediction information may be merge candidates.

Figure 17:
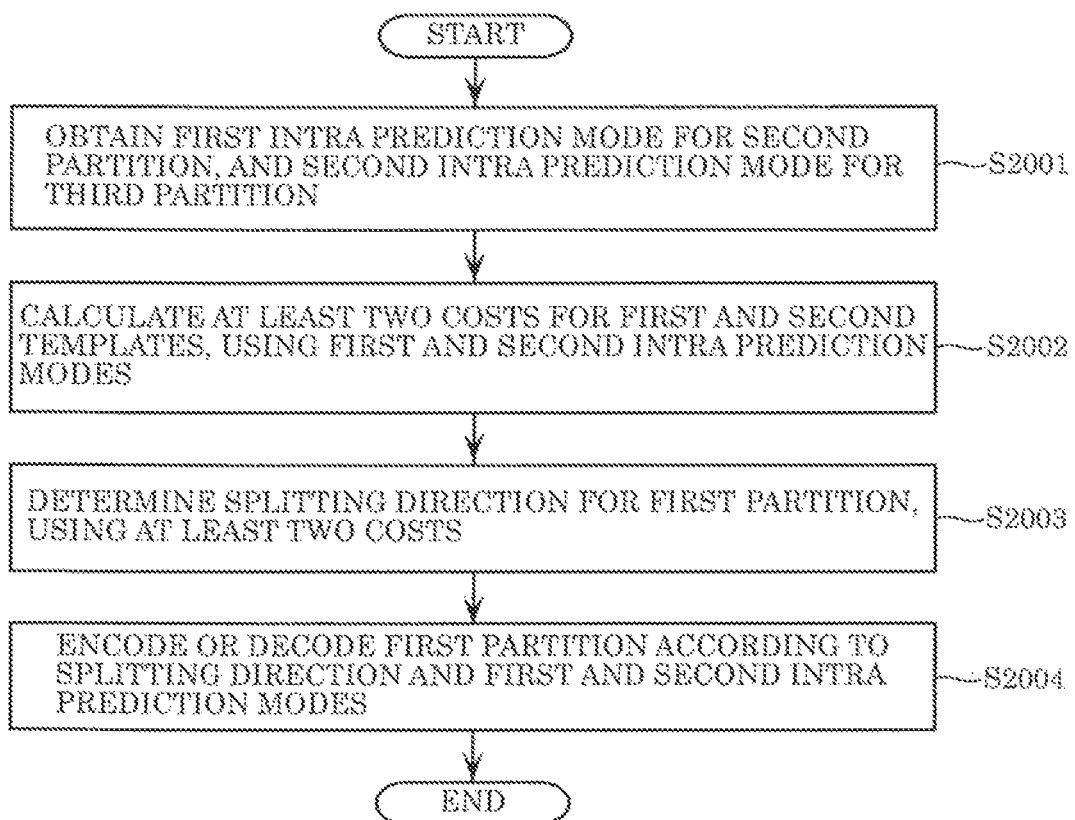
FIG. 17 is a flowchart illustrating an example of intra prediction processing in the first aspect.

For example, when the second partition and the third partition are intra-predicted, the at least two items of prediction information may be merge candidates or may be intra prediction modes. FIG. 17 is a flowchart illustrating an example of intra prediction processing in the first aspect.

As illustrated in FIG. 17, in step S2001, a first intra prediction mode is obtained for the second partition, and a second intra prediction mode is obtained for the third partition. The first intra prediction mode and the second intra prediction mode may be derived from blocks temporally near the first partition.

Next, in step S2002, at least two costs for the first template and the second template are calculated using the first intra prediction mode and the second intra prediction mode obtained in step S2001. Note that calculation of costs is as described in the above example of inter prediction processing. Next, in step S2003, the splitting direction for the first partition is determined using the at least two costs calculated in step S2002.

Next, in step S2004, the first partition is encoded or decoded using the splitting direction determined in step S2003, and the first intra prediction mode and the second intra prediction mode obtained in step S2001. At this time, a parameter may be associated with the first intra prediction mode and the second intra prediction mode, but does not need to be associated with the splitting direction for the first partition.

Note that the term "motion vector" used in the description regarding the inter-predicted second partition and the inter-predicted third partition may be replaced with the term "intra prediction mode".

[Technical Advantages of First Aspect]

According to this aspect, template costs for determining the splitting direction for splitting one partition into two partitions are introduced. This eliminates the necessity of encoding or decoding the splitting direction, and thus improves encoding efficiency.

[Combination with Other Aspects]

At least a portion of the first aspect may be combined with at least a portion of one or more other aspects of the present disclosure described below. A portion of the processing in the flowcharts, a portion of the configuration of a device, syntax, and/or other features may be combined with other aspects. Not all the processing/elements are necessarily needed. The device/method may include a portion of the processing/one or more of the elements. The above processing may be performed by a decoder similarly to an encoder.

[Second Aspect]

In this aspect, template costs (hereafter, simply referred to as costs) are used to determine motion vectors of a second partition and a third partition. In the first aspect, costs are used to determine the splitting direction for the first partition, yet the splitting direction for the first partition may be determined in advance in this aspect. The second partition and the third partition are split from the first partition according to the splitting direction.

Figure 18:
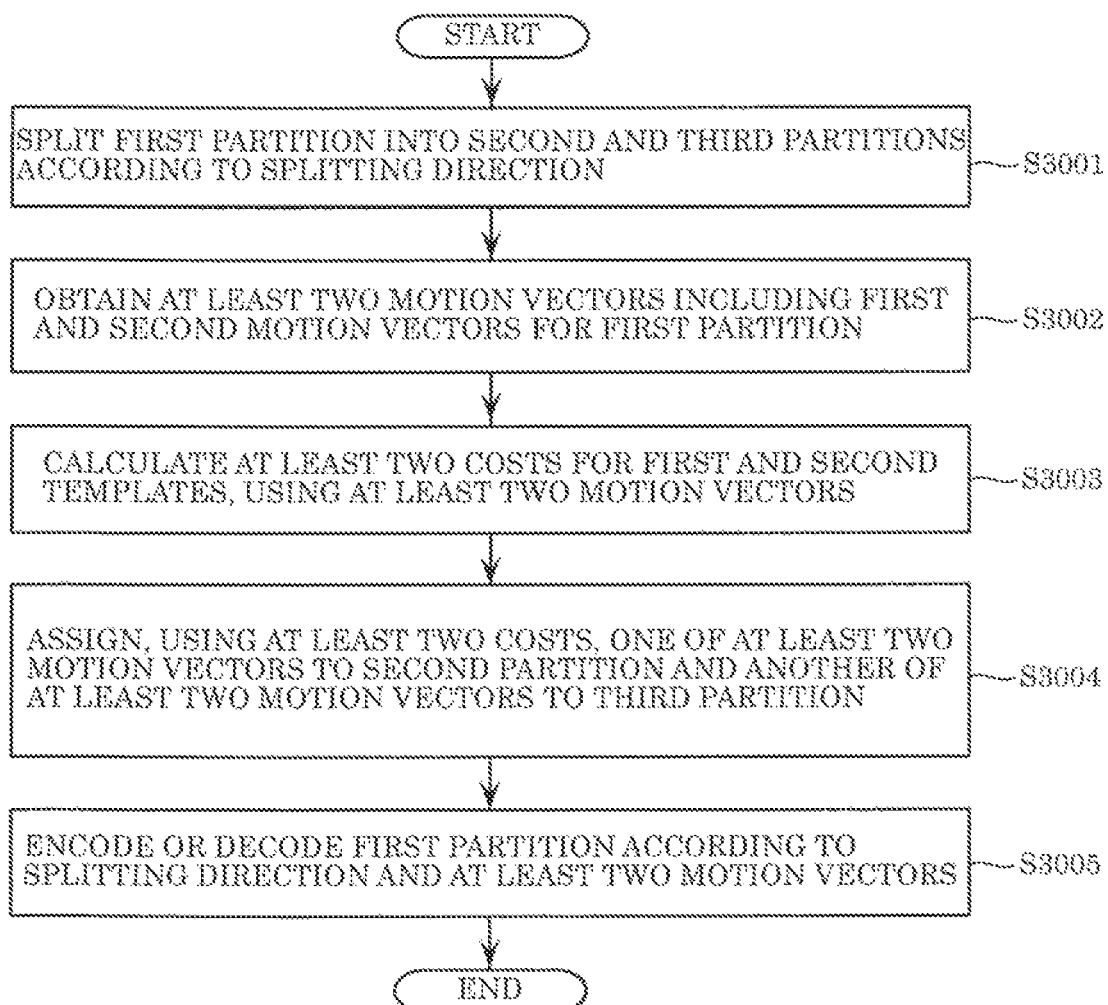
FIG. 18 is a flowchart illustrating an example of inter prediction processing in a second aspect.

FIG. 18 is a flowchart illustrating an example of inter prediction processing in the second aspect.

As illustrated in FIG. 18, in step S3001, the first partition is split into the second partition and the third partition according to the splitting direction. As illustrated in (a) and (b) of FIG. 12, the splitting direction may be a diagonal direction such as a direction from the top-left corner to the bottom-right corner of the first partition or a direction from the top-right corner to the bottom-left corner of the first partition. Furthermore, for example, the splitting direction may be vertical and horizontal, as illustrated in (c) and (d) of FIG. 12.

Next, in step S3002, at least two motion vectors including a first motion vector and a second motion vector of the first partition are obtained.

Next, in step S3003, at least two costs for the first template and the second template are calculated using the at least two motion vectors obtained in step S3002. More specifically, as illustrated in FIG. 13, two costs are calculated for each of the first template and the second template, using the first motion vector and the second motion vector. In this example, for the first template, the first cost is calculated using the first motion vector, and the second cost is calculated using the second motion vector. Similarly, also for the second template, the third cost and the fourth cost are calculated using the first motion vector and the second motion vector, respectively. Since calculation of costs is the same as the calculation described in the first aspect, a description thereof is omitted here.

Figure 19:
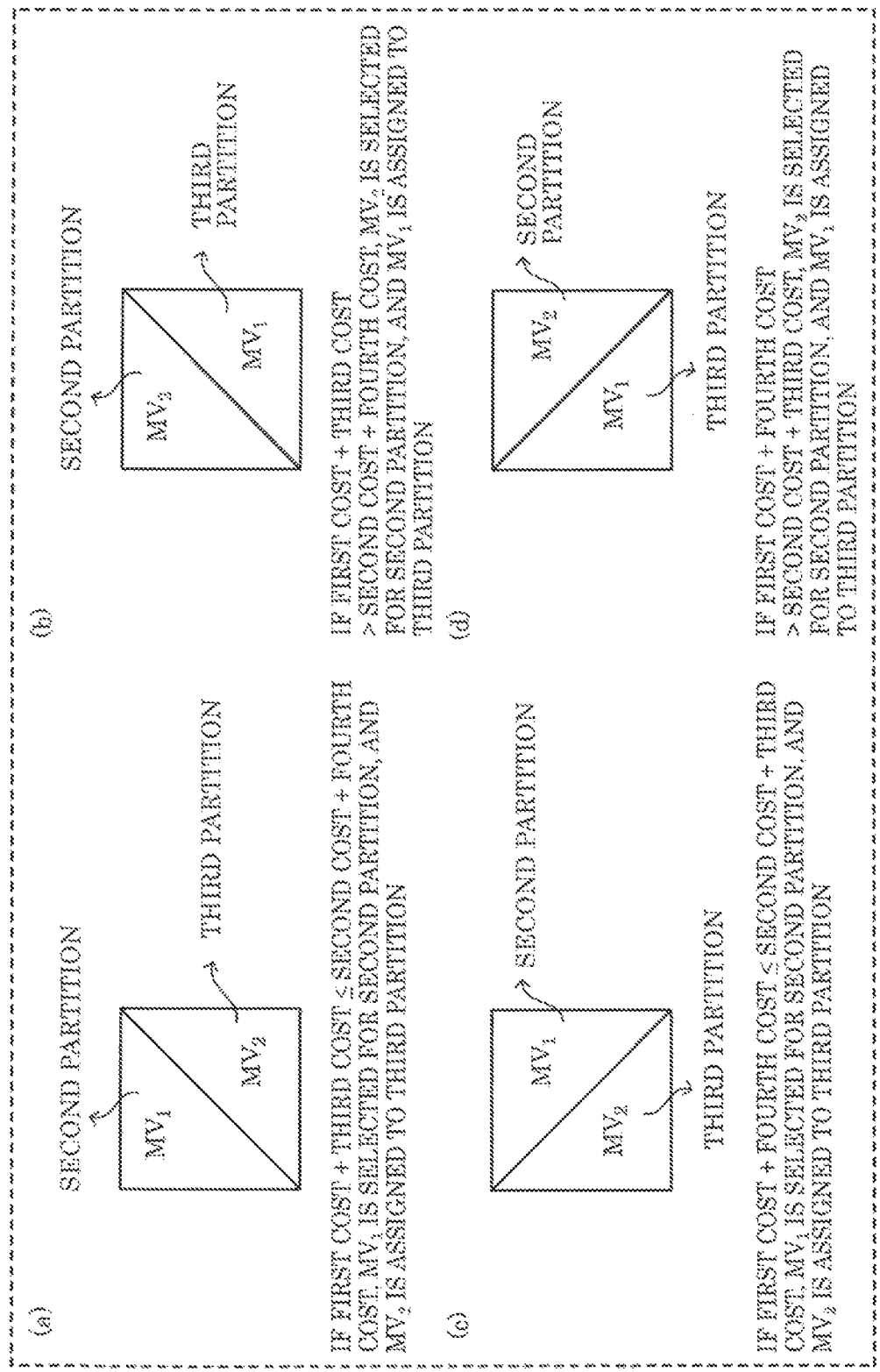
FIG. 19 illustrates examples of processing in step S3004 in FIG. 18.
Figure 20:
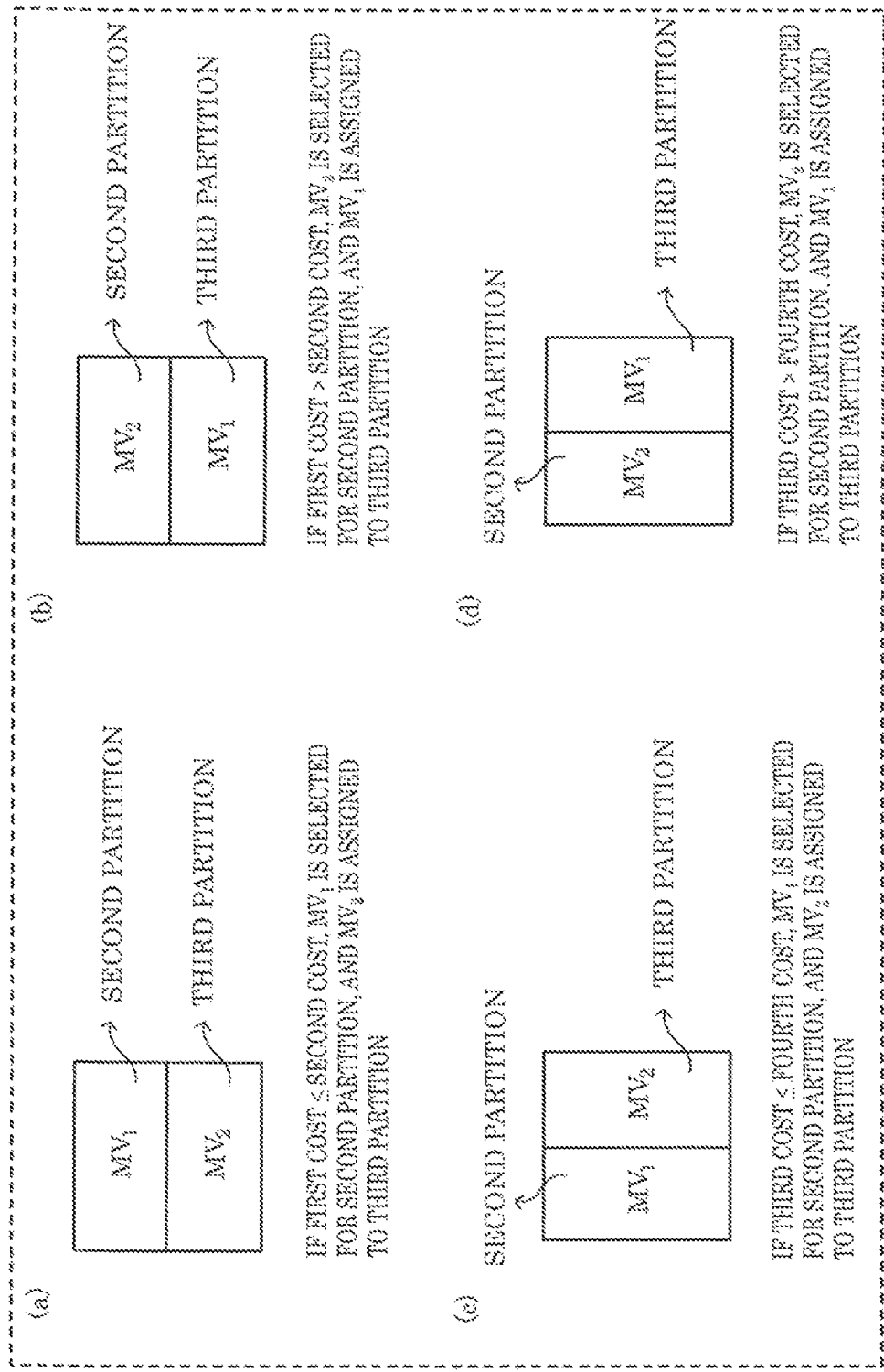
FIG. 20 illustrates other examples of processing in step S3004 in FIG. 18.

Next, in step S3004, using the at least two costs, one of the at least two motion vectors is assigned to the second partition, and another of the at least two motion vectors is assigned to the third partition. For example, as illustrated in FIGS. 19 and 20, when the at least two motion vectors are the first motion vector and the second motion vector, at least two costs for each of the first template and the second template are calculated using the first motion vector and the second motion vector. Then, using the at least two costs, one of the first motion vector and the second motion vector is selected for the second partition, and the other of the first motion vector and the second motion vector is assigned to the third partition.

The following more specifically describes processing in step S3004, with reference to FIGS. 19 and 20. FIG. 19 illustrates an example of processing in step S3004 in FIG. 18. FIG. 20 illustrates another example of the processing in step S3004 in FIG. 18. Specifically, FIG. 19 illustrates examples of selecting motion vectors for the second partition and the third partition when the second partition and the third partition are triangular partitions. FIG. 20 illustrates examples of selecting motion vectors for the second partition and the third partition when the second partition and the third partition are rectangular partitions.

First, examples illustrated in FIG. 19 are to be described. In the examples illustrated in (a) and (b) of FIG. 19, the first partition is split in the direction from the top-right corner to the bottom-left corner. At this time, the second partition is a triangular partition in the upper-left half of the first partition, and the third partition is a triangular partition in the lower right half of the first partition. As illustrated in (a) of FIG. 19, if the sum of the first cost and the third cost is less than or equal to the sum of the second cost and the fourth cost, the first motion vector is selected for the second partition, and the second motion vector is assigned to the third partition. As illustrated in (b) of FIG. 19, if the sum of the first cost and the third cost is greater than the sum of the second cost and the fourth cost, the second motion vector is selected for the second partition, and the first motion vector is assigned to the first partition.

In the examples illustrated in (c) and (d) of FIG. 19, the first partition is split into the direction from the top-left corner to the bottom-right corner. At this time, the second partition is a triangular partition in the upper-right half of the first partition, and the third partition is a triangular partition in the lower-left half of the first partition. As illustrated in (c) of FIG. 19, if the sum of the first cost and the fourth cost is less than or equal to the sum of the second cost and the third cost, the first motion vector is selected for the second partition, and the second motion vector is assigned to the third partition. As illustrated in (d) of FIG. 19, if the sum of the first cost and the fourth cost is greater than the sum of the second cost and the third cost, the second motion vector is selected for the second partition, and the first motion vector is assigned to the third partition.

Next, examples illustrated in FIG. 20 are to be described. In the examples illustrated in (a) and (b) of FIG. 20, the first partition is split horizontally. At this time, the second partition is a rectangular partition in the upper half of the first partition, and the third partition is a rectangular partition in the lower half of the first partition. As illustrated in (a) of FIG. 20, if the first cost is less than or equal to the second cost, the first motion vector is selected for the second partition, and the second motion vector is assigned to the third partition. As illustrated in (b) of FIG. 20, if the first cost is greater than the second cost, the second motion vector is selected for the second partition, and the first motion vector is assigned to the third partition.

In the examples illustrated in (c) and (d) of FIG. 20, the first partition is split vertically. At this time, the second partition is a rectangular partition in the left half of the first partition, and the third partition is a rectangular partition in the right half of the first partition. As illustrated in (c) of FIG. 20, if the third cost is less than or equal to the fourth cost, the first motion vector is selected for the second partition, and the second motion vector is assigned to the third partition. As illustrated in (d) of FIG. 20, if the third cost is greater than the fourth cost, the second motion vector is selected for the second partition, and the first motion vector is assigned to the third partition.

Next, in step S3005, the first partition is encoded or decoded according to the splitting direction and the first motion vector and the second motion vector obtained in step S3002. Encoding the first partition may include writing a parameter into a bitstream. Similarly, decoding the first partition may include reading a parameter from a bitstream.

FIG. 21 illustrates examples of parameters in the second aspect. As illustrated in FIG. 21, the first motion vector and the second motion vector are both predicted from a motion vector candidate list. Thus, a parameter does not need to indicate which of the first motion vector and the second motion vector indicates motion of the second partition and which of the second motion vector and the second motion vector indicates motion of the third partition. Accordingly, the splitting direction for the first partition and at least two motion vectors may be associated with each parameter in the second aspect (each parameter value in FIG. 21). This eliminates the necessity of encoding and decoding assignment information for each of at least two motion vectors, and thus the encoding amount can be reduced. For example, as shown by the parameters in the second row and the third row of the table illustrated in FIG. 21, if the splitting direction for the first partition is the same and if the combinations of two motion vectors are the same, the conditions for the parameters are determined to be the same, and the parameter in the third row is eliminated.

The above has given a description of an example in which motion vectors are used as at least two items of prediction information when the second partition and the third partition are inter-predicted. For example, the at least two items of prediction information may be merge candidates.

Figure 22:
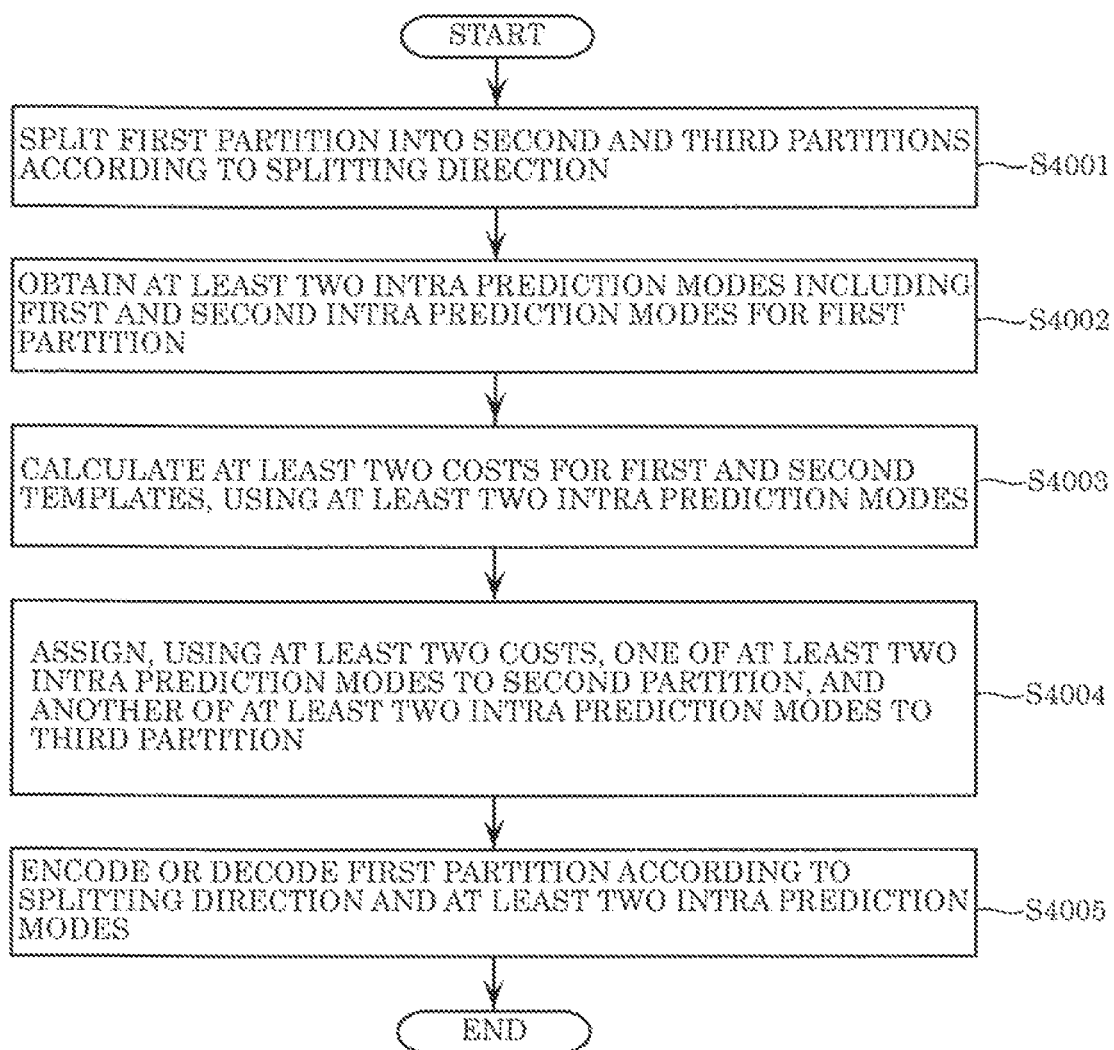
FIG. 22 is a flowchart illustrating an example of intra prediction processing in the second aspect.

For example, when the second partition and the third partition are intra-predicted, at least two items of prediction information may be merge candidates or may be intra prediction modes. FIG. 22 is a flowchart illustrating an example of the intra prediction processing in the second aspect.

As illustrated in FIG. 22, in step S4001, the first partition is split into the second partition and the third partition according to the splitting direction. Next, in step S4002, at least two intra prediction modes including a first intra prediction mode and a second intra prediction mode for the first partition are obtained. Next, in step S4003, at least two costs for the first template and the second template are calculated using the at least two intra prediction modes obtained in step S4002. Note that calculation of costs is as described in the example of inter prediction processing described above.

Next, in step S4004, using the at least two costs calculated in step S4003, one of the at least two intra prediction modes is assigned to the second partition, and another of the at least two intra prediction modes is assigned to the third partition.

Next, in step S4005, the first partition is encoded or decoded using the splitting direction and the intra prediction modes obtained in step S4002. At this time, a parameter may be associated with the splitting direction and the at least two intra prediction modes for the first partition.

Accordingly, the term "motion vector" used in the description of the inter-predicted second and third partitions may be replaced with the term "intra prediction mode" when the second and third partitions are intra-predicted.

[Technical Advantages of Second Aspect]

This aspect introduces motion vectors of the second partition and the third partition which are split from the first partition, and template costs for determining intra prediction modes. According to this aspect, the motion vectors or intra prediction modes for the second partition and the third partition are encoded together without indicating which motion vector or which intra prediction mode is for the second partition and which motion vector is for the third partition. This eliminates the necessity of encoding or decoding information which indicates association between the first and second motion vectors and the first and third partitions, and thus encoding efficiency can be improved according to this aspect.

[Combination With Other Aspects]

At least a portion of the second aspect may be combined with at least a portion of one or more other aspects of the present disclosure. A portion of the processing in the flowcharts, a portion of the configuration of a device, syntax, and/or other features may be combined with other aspects. Not all the processing/elements are necessarily needed. The device/method may include a portion of processing/one or more of the elements. The above processing may be performed by a decoder, similarly to an encoder.

For example, the first aspect and the second aspect may be combined. Specifically, the costs in the first aspect and the costs in the second aspect may be combined. As described above, the costs in the first aspect are used to determine the splitting direction for the first partition. Further, the costs in the second aspect are used to determine the motion vectors of the second partition and the third partition which are split from the first partition according to the splitting direction. Accordingly, costs in an aspect obtained by combining the first aspect and the second aspect (hereafter referred to as a combined aspect) are used to determine a splitting direction for the first partition and motion vectors of the second and third partitions split from the first partition according to the splitting direction, for example. The following more specifically describes an example of a combined aspect, with reference to the drawings. Note that also in this example, the second partition and the third partition are inter-predicted.

Figure 23:
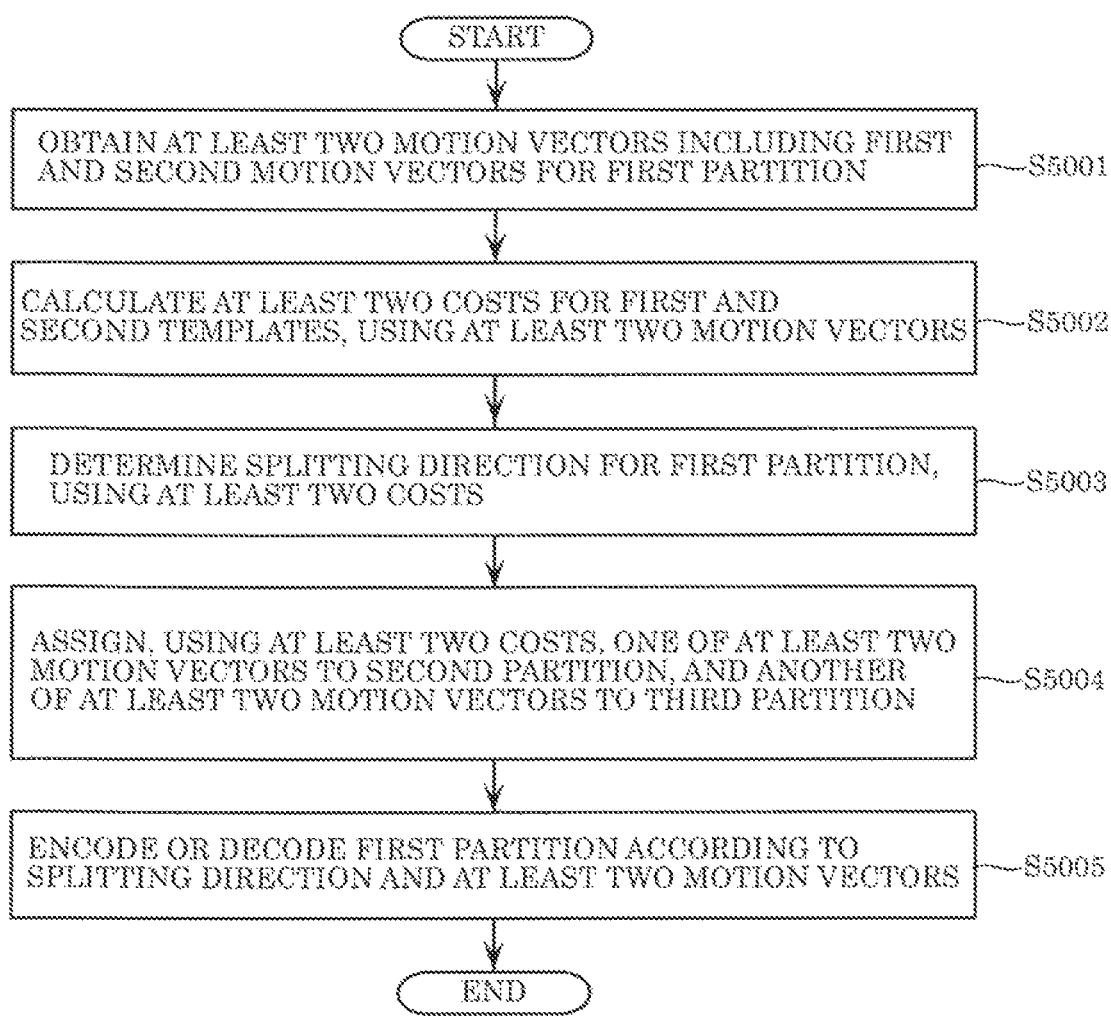
FIG. 23 is a flowchart illustrating an example of inter prediction processing when the first aspect and the second aspect are combined.

FIG. 23 is a flowchart illustrating an example of inter prediction processing in the combined aspect. As illustrated in FIG. 23, in step S5001, at least two motion vectors including the first motion vector and the second motion vector of the first partition are obtained.

Next, in step S5002, at least two costs are calculated for the first template and the second template using the at least two motion vectors. More specifically, similarly to the example illustrated in FIG. 13, two costs are calculated for each of the first template and the second template, using the first motion vector and the second motion vector obtained in step S5001. Specific costs and calculation thereof are described in the first aspect, and thus a description here is omitted.

Next, in step S5003, the splitting direction for the first partition is determined using the at least two costs calculated in step S5002. The splitting direction for the first partition may be a diagonal direction such as a direction from the top-left corner to the bottom-right corner of the first partition or a direction from the top-right corner to the bottom-left corner of the first partition, or may be horizontal or vertical. As described above, when the splitting direction for the first partition is a diagonal direction, the second partition and the third partition are triangular, whereas when the splitting direction for the first partition is horizontal or vertical, the second partition and the third partition are rectangular.

Next, in step S5004, using the at least two costs obtained in step S5002, one of the at least two motion vectors is assigned to the second partition, and another of the at least two motion vectors is assigned to the third partition.

Figure 24:
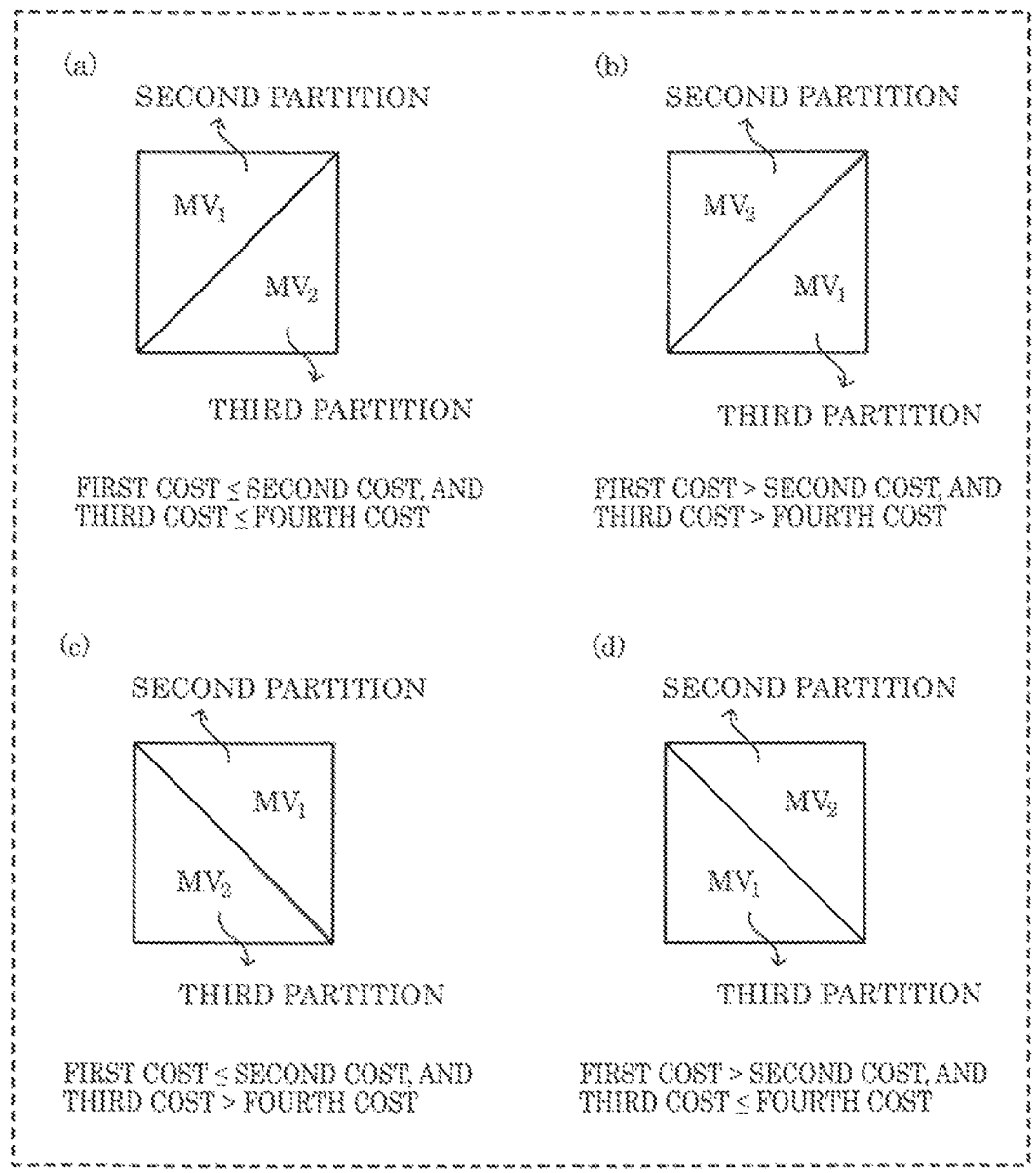
FIG. 24 illustrates examples of processing in steps S5003 and S5004 in FIG. 23.
Figure 25:
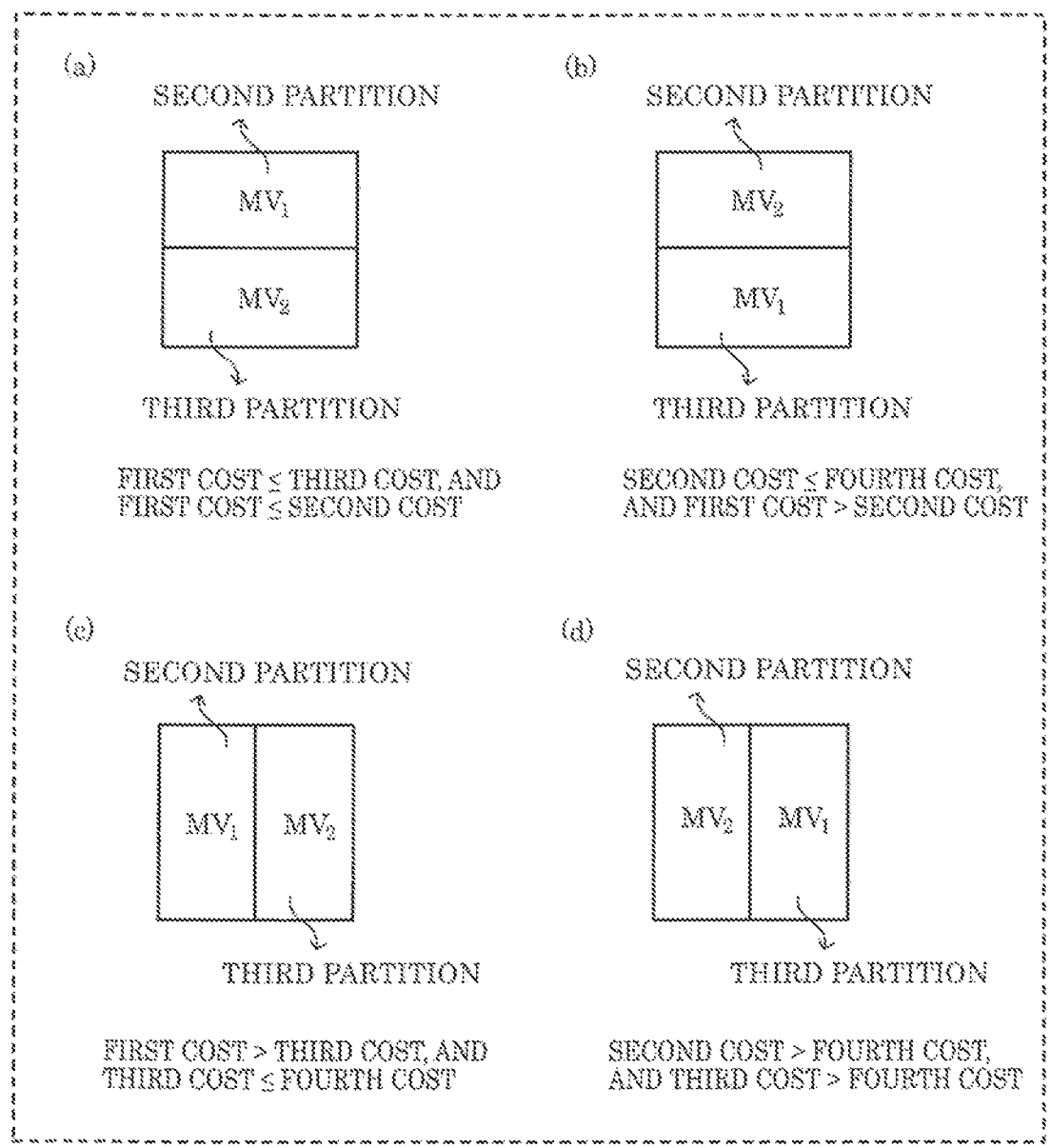
FIG. 25 illustrates other examples of processing in steps S5003 and S5004 in FIG. 23.

The following more specifically describes processing in steps S5003 and S5004, with reference to FIGS. 24 and 25. FIG. 24 illustrates an example of processing in steps S5003 and S5004 in FIG. 23. FIG. 25 illustrates other examples of processing in steps S5003 and S5004 in FIG. 23. Specifically, FIG. 24 illustrates examples in which when the second partition and the third partition are triangular, the splitting direction for the first partition is determined, and motion vectors of the second partition and the third partition are selected. Further, FIG. 25 illustrates examples in which when the second partition and the third partition are rectangular, the splitting direction for the first partition is determined, and motion vectors of the second partition and the third partition are selected.

First, the examples illustrated in FIG. 24 are to be described. The first partitions are split into two triangular partitions in FIG. 24.

In the example illustrated in (a) of FIG. 24, when the first cost is less than or equal to the second cost and the third cost is less than or equal to the fourth cost, the splitting direction for the first partition is determined to be a direction from the top-right corner to the bottom-left corner. At this time, the first motion vector is selected for the second partition, and the second motion vector is assigned to the third partition.

In the example illustrated in (b) of FIG. 24, when the first cost is greater than the second cost and the third cost is greater than the fourth cost, the splitting direction for the first partition is determined to be a direction from the top-right corner to the bottom-left corner. At this time, the second motion vector is selected for the second partition, and the first motion vector is assigned to the third partition.

In the example illustrated in (c) of FIG. 24, when the first cost is less than or equal to the second cost and the third cost is greater than the fourth cost, the splitting direction for the first partition is determined to be a direction from the top-left corner to the bottom-right corner. At this time, the first motion vector is selected for the second partition, and the second motion vector is assigned to the third partition.

In the example illustrated in (d) of FIG. 24, when the first cost is greater than the second cost and the third cost is greater than or equal to the fourth cost, the splitting direction for the first partition is determined to be a direction from the top-right corner to the bottom-left corner. At this time, the first motion vector is selected for the third partition, and the second motion vector is assigned to the second partition.

Next, the examples illustrated in FIG. 25 are to be described. The first partitions are each split into two rectangular partitions in FIG. 25.

In the example illustrated in (a) of FIG. 25, when the first cost is less than or equal to the third cost and the first cost is less than or equal to the second cost, the splitting direction for the first partition is determined to be horizontal. At this time, the first motion vector is selected for the second partition, and the second motion vector is assigned to the third partition.

In the example illustrated in (b) of FIG. 25, when the second cost is less than or equal to the fourth cost and the first cost is greater than the second cost, the splitting direction for the first partition is determined to be horizontal. At this time, the second motion vector is selected for the second partition, and the first motion vector is assigned to the third partition.

In the example illustrated in (c) of FIG. 25, when the first cost is greater than the third cost and the third cost is less than or equal to the fourth cost, the splitting direction for the first partition is determined to be vertical. At this time, the first motion vector is selected for the second partition, and the second motion vector is assigned to the third partition.

In the example illustrated in (d) of FIG. 25, when the second cost is greater than the fourth cost and the third cost is greater than the fourth cost, the splitting direction for the first partition is determined to be vertical. At this time, the first motion vector is selected for the third partition, and the second motion vector is assigned to the second partition.

Next, in step S5005, the first partition is encoded or decoded using the splitting direction determined in step S5003, and the at least two motion vectors obtained in step S5001. Encoding the first partition may include writing a parameter into a bitstream. Similarly, decoding the first partition may include reading a parameter from a bitstream.

FIG. 26 illustrates examples of parameters in the combined aspect. As illustrated in FIG. 26, in the combined aspect, the first motion vector and the second motion vector are predicted from a motion vector candidate list, similarly to the second aspect. Specifically, a parameter may not indicate which of the first motion vector and the second motion vector indicates motion of the second partition and which of the first motion vector and the second motion vector indicates motion of the third partition. As described in the first aspect, the splitting direction for the first partition is calculated using costs, and the costs are each calculated using at least two motion vectors. Accordingly, the parameters (parameter values in FIG. 26) may each be associated with at least two motion vectors of the first partition. This eliminates the necessity of encoding or decoding assignment information for each of at least two motion vectors, and thus the encoding amount can be reduced. For example, the combinations of two motion vectors for the parameters in the second and third rows in FIG. 26 are the same as the combination of two motion vectors for the parameter in the first row (parameter value of 0). Accordingly, conditions for the parameters in the second and third rows are determined to be the same as the condition for the parameter in the first row, irrespective of whether the splitting direction for the first partition is the same as that for the parameter in the first row. Thus, the parameters in the second and third rows are eliminated.

The above has given a description of examples in which motion vectors are used as at least two items of prediction information when the second partition and the third partition are inter-predicted in the combined aspect of the first aspect and the second aspect, yet the present disclosure is not limited to these. For example, the at least two items of prediction information may be merge candidates.

For example, when the second partition and the third partition are intra-predicted, the at least two items of prediction information may be merge candidates or may be intra prediction modes.

Figure 27:
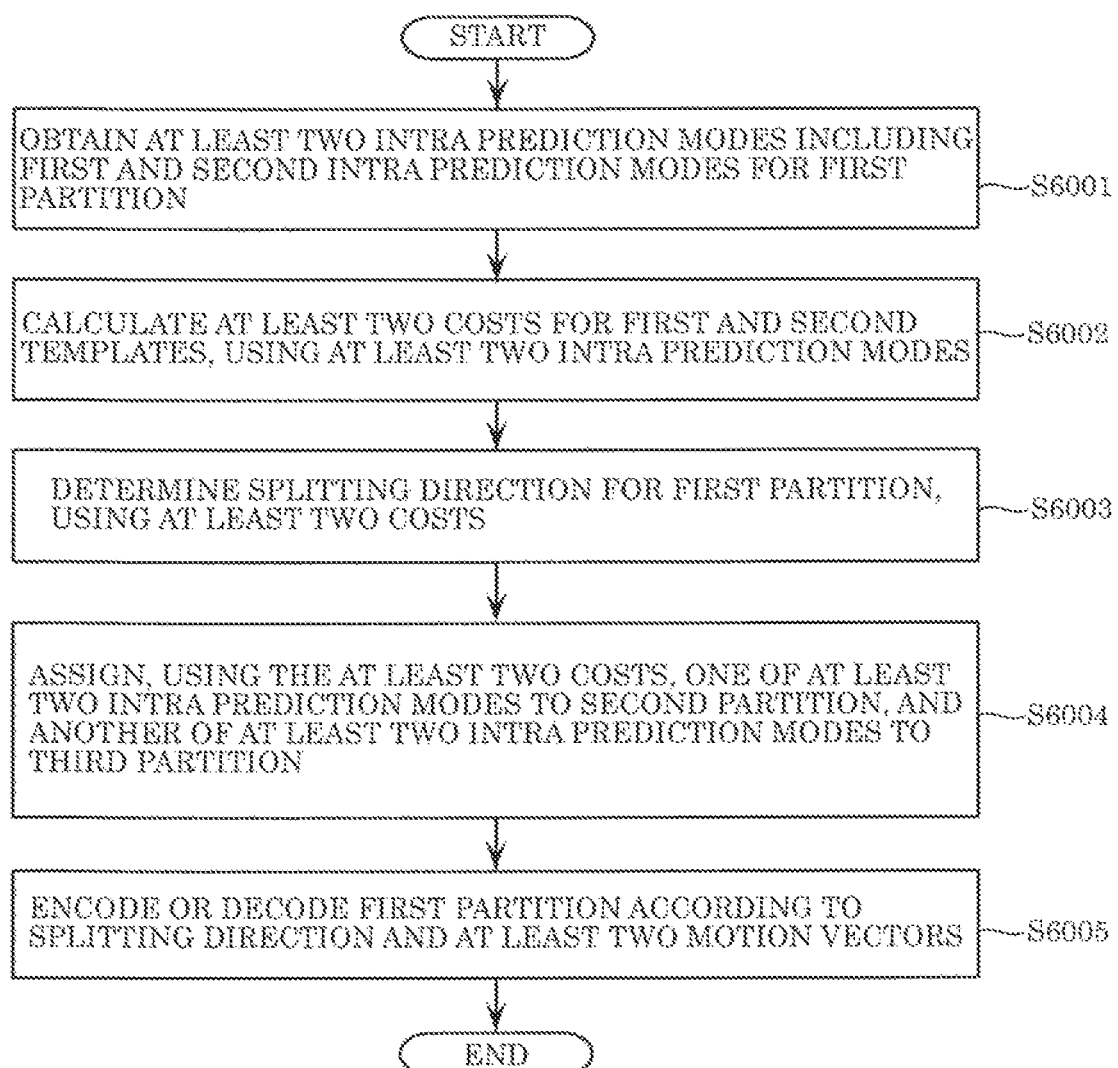
FIG. 27 is a flowchart illustrating examples of intra prediction processing when the first aspect and the second aspect are combined.

FIG. 27 is a flowchart illustrating an example of intra prediction processing when the first aspect and the second aspect are combined. As illustrated in FIG. 27, in step S6001, at least two intra prediction modes including the first intra prediction mode and the second intra prediction mode for the first partition are obtained.

Next, in step S6002, at least two costs for the first template and the second template are calculated using the at least two intra prediction modes obtained in step S6001. Note that calculation of costs is as described in the example of inter prediction processing described above.

Next, in step S6003, the splitting direction for the first partition is determined using the at least two costs calculated in step S6002.

Next, using the at least two costs calculated in step S6002, one of the at least two intra prediction modes is assigned to the second partition, and another of the at least two intra prediction modes is assigned to the third partition.

Next, in step S6005, the first partition is encoded or decoded using the splitting direction calculated in step S6003 and the intra prediction mode obtained in step S6001. At this time, the parameter may be associated with the splitting direction for the first partition and the at least two intra prediction modes.

As described above, costs are used to determine a splitting direction for the first partition and motion vectors of the second partition and the third partition which are split from the first partition according to the splitting direction.

Thus, the term "motion vector" used in the description of the second partition and the third partition which are inter-predicted can be replaced with the term "intra prediction mode" when the second partition and the third partition are intra-predicted.

[Third Aspect]

This aspect introduces hardware implementation for using template costs in order to determine a splitting direction for the first partition or select motion vectors for the third and fourth partitions. Note that the third and fourth partitions in this aspect correspond to the second partition and the third partition in the first aspect and the second aspect, respectively.

Figure 28:
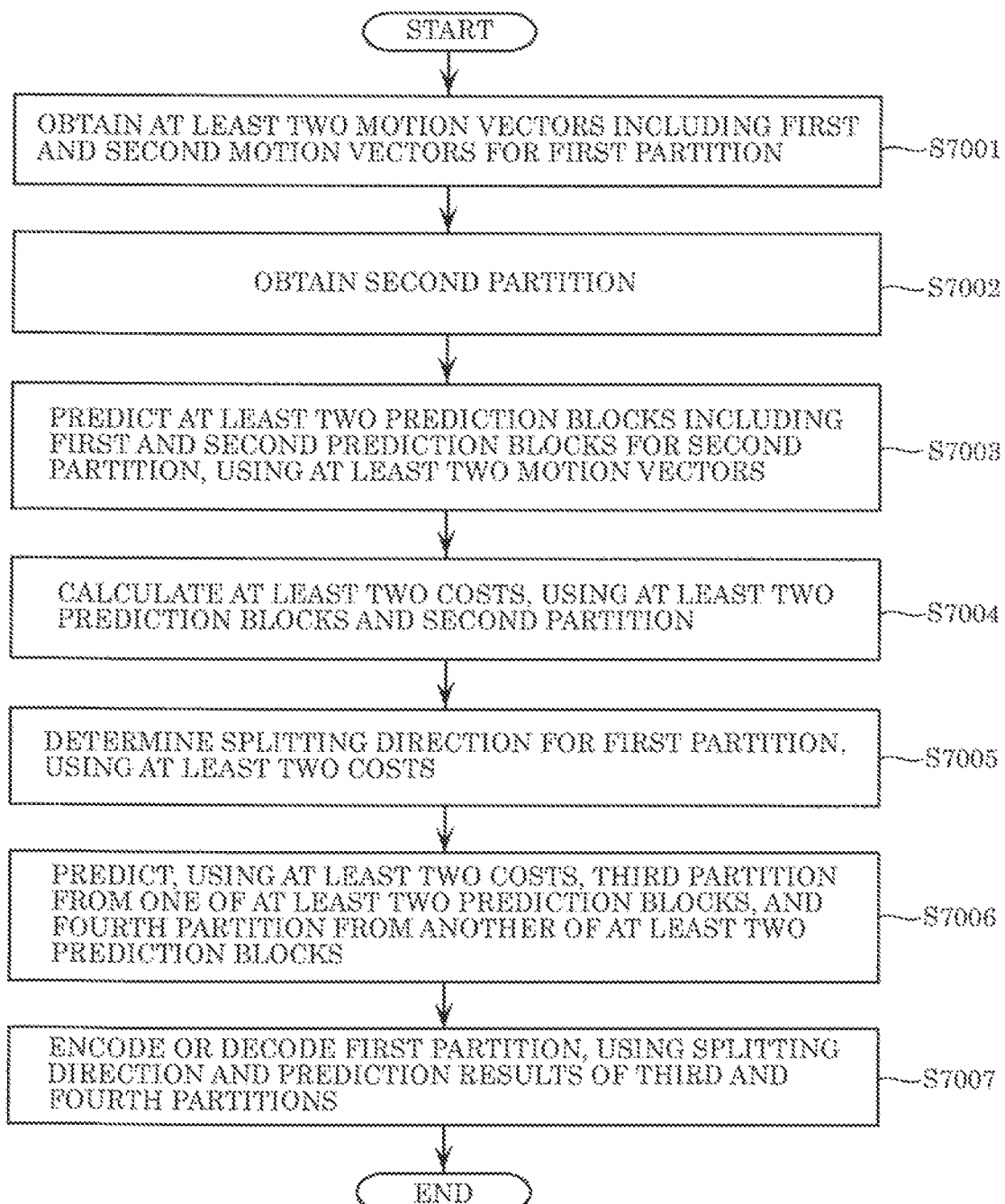
FIG. 28 is a flowchart illustrating an example of inter prediction processing in a third aspect.

FIG. 28 is a flowchart illustrating an example of inter prediction processing in the third aspect. As illustrated in FIG. 28, in step S7001, at least two motion vectors including the first motion vector and the second motion vector of the first partition are obtained.

Next, the second partition is obtained in step S7002. Note that the second partition in this aspect is different from the second partitions in the first aspect and the second aspect. The second partitions in the first aspect and the second aspect are each split and derived from the first partition. Accordingly, the second partition is smaller than the first partition. On the other hand, the second partition in this aspect is not a partition split from the first partition.

Figure 29:
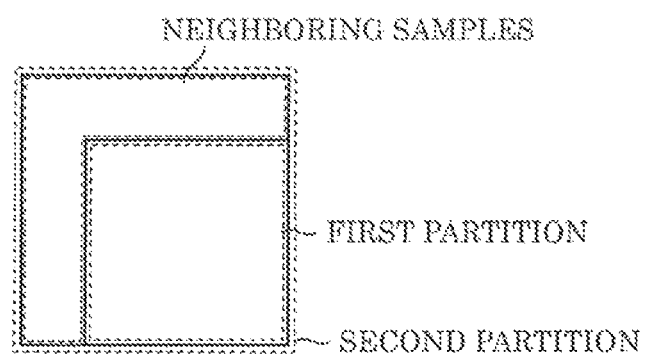
FIG. 29 illustrates an example of a second partition in the third aspect.

FIG. 29 illustrates an example of the second partition in the third aspect. As illustrated in FIG. 29, the second partition in this aspect is derived from the first partition and a plurality of neighboring samples which neighbor the first partition. Accordingly, the second partition is larger than the first partition.

Next, in step S7003, at least two prediction blocks including a first prediction block and a second prediction block of the second partition are predicted using the at least two motion vectors obtained in step S7001. For example, the first prediction block is predicted using the first motion vector for the second partition. For example, the second prediction block is predicted using the second motion vector for the second partition.

Next, in step S7004, at least two costs are calculated using the at least two prediction blocks of the second partition predicted in step S7003 and the second partition. The following specifically describes calculation of costs, with reference to FIG. 30.

Figure 30:
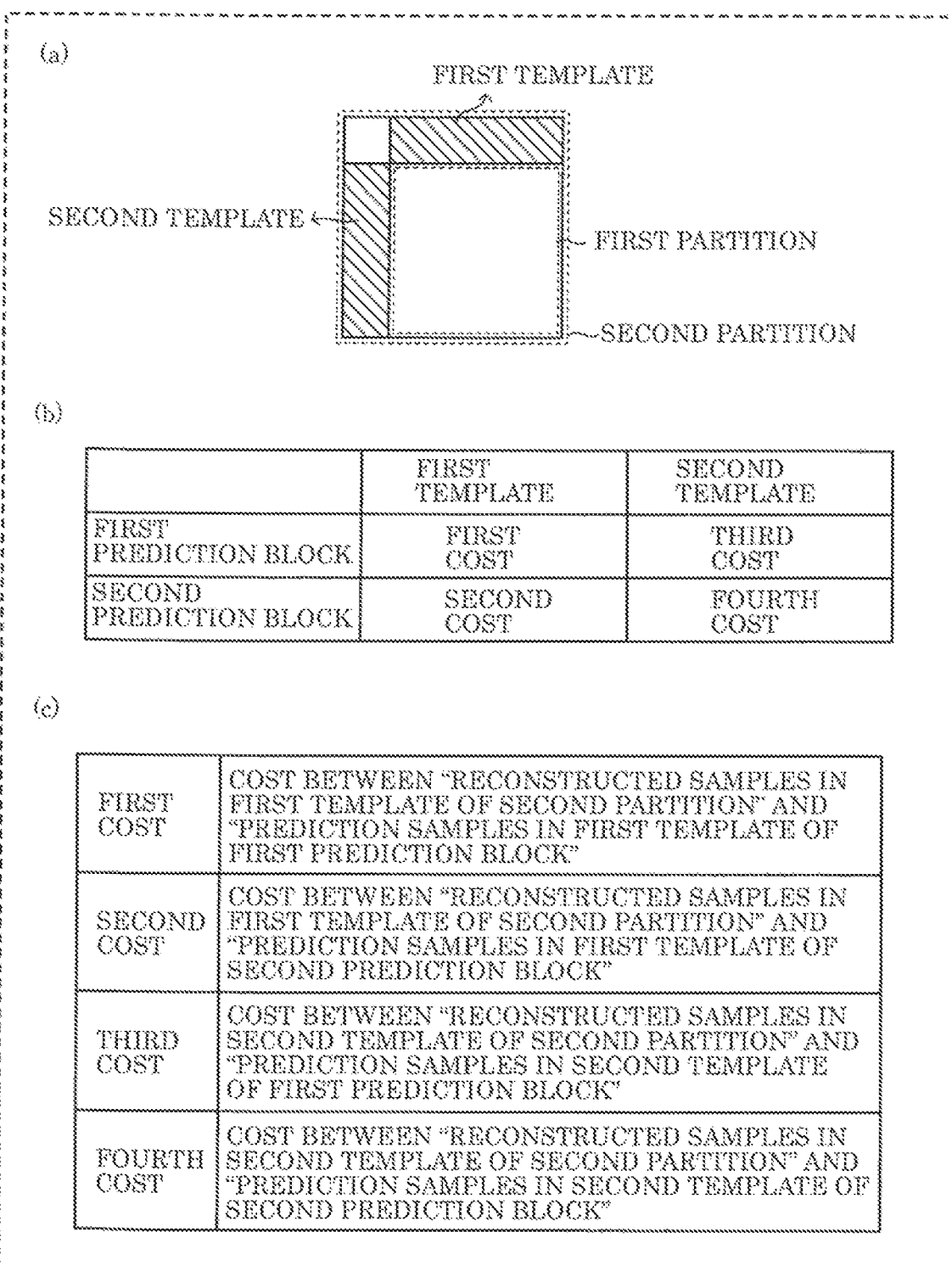
FIG. 30 illustrates examples of cost calculation in the third aspect.

FIG. 30 illustrates an example of calculation of costs in the third aspect. In FIG. 30, (a) illustrates a relation between the second partition and the first and second templates which neighbor the first partition. In this example, the first template and the second template are included in the second partition. The first template and the second template are derived from a plurality of neighboring samples which neighbor the first partition.

In FIG. 30, (b) illustrates an example of calculation of costs. In this example, four costs are calculated using the first and second templates and first and second prediction blocks of the second partition. Specifically, a first cost is calculated using the first template and the first prediction block, and a second cost is calculated using the first template and the second prediction block. A third cost is calculated using the second template and the first prediction block, and a fourth cost is calculated using the second template and the second prediction block.

As illustrated in (c) of FIG. 30, the first cost is a cost between a plurality of reconstructed samples in the first template of the second partition and a plurality of prediction samples in the first template of the first prediction block. The second cost is a cost between a plurality of reconstructed samples in the first template of the second partition and a plurality of prediction samples in the first template of the second prediction block. The third cost is a cost between a plurality of reconstructed samples in the second template of the second partition and a plurality of prediction samples in the second template of the first prediction block. The fourth cost is a cost between a plurality of reconstructed samples in the second template of the second partition and a plurality of prediction samples in the second template of the second prediction block.

Next, in step S7005, the splitting direction for the first partition is determined using the at least two costs calculated in step S7004.

Next, in step S7006, the third partition is predicted from one of the at least two prediction blocks predicted in step S7003, and the fourth partition is predicted from another of the at least two prediction blocks. At this time, at least two costs are used to select prediction blocks for the third partition and the fourth partition which are split from the first partition. Specifically, in processing in steps S7005 and S7006, the splitting direction for the first partition is determined using the at least two costs, and furthermore, prediction blocks for the third partition and the fourth partition are selected using the at least two costs.

Figure 31:
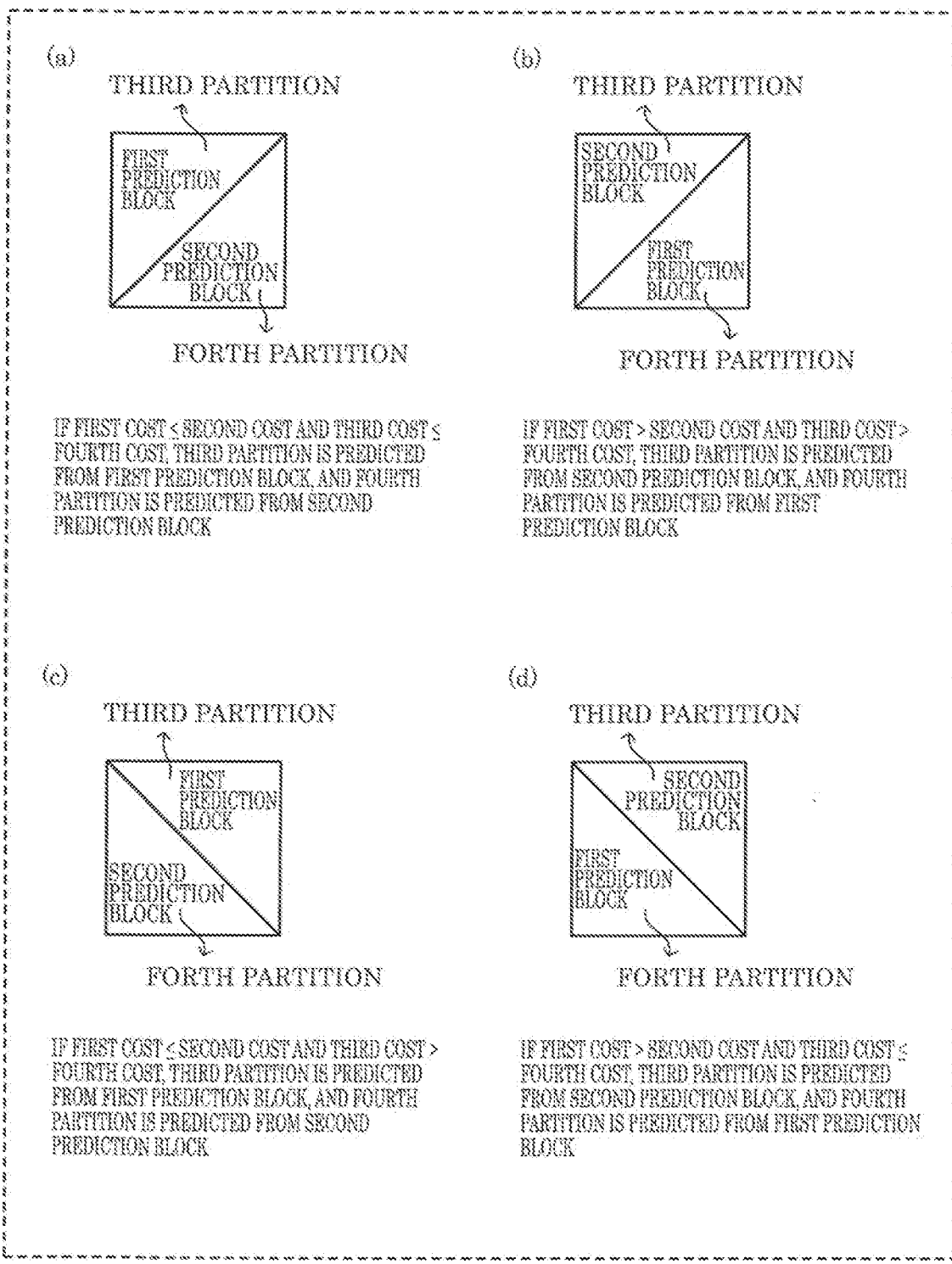
FIG. 31 illustrates examples of processing in steps S7005 and S7006 in FIG. 28.
Figure 32:
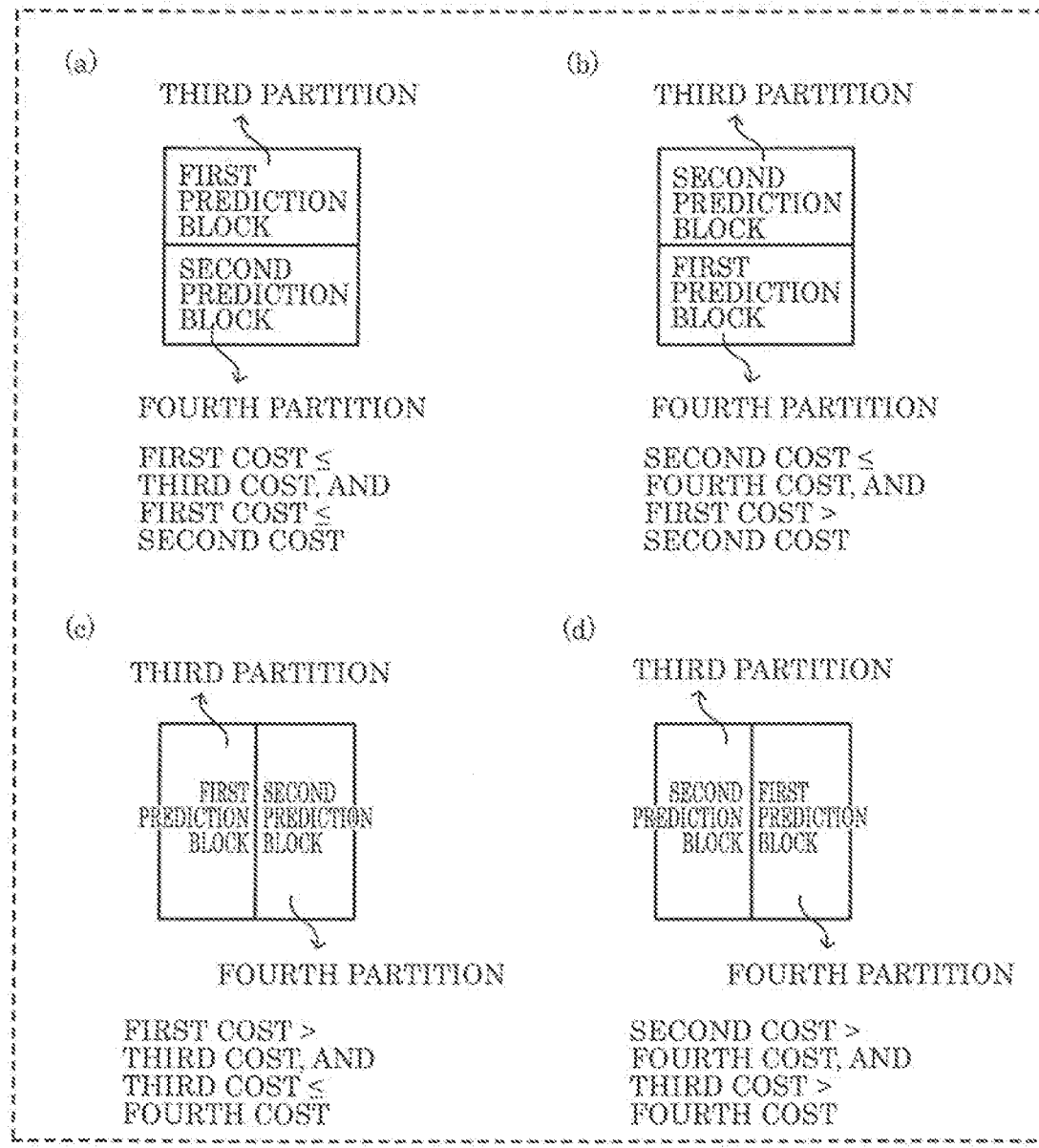
FIG. 32 illustrates other examples of processing in steps S7005 and S7006 in FIG. 28.

The following more specifically describes the processing in steps S7005 and S7006, with reference to FIGS. 31 and 32. FIG. 31 illustrates an example of processing in steps S7005 and S7006 in FIG. 28. FIG. 32 illustrates other examples of processing in steps S7005 and S7006 in FIG. 28.

First, the examples illustrated in FIG. 31 are to be described. The first partition is split into two triangular partitions in FIG. 31.

In the example illustrated in (a) of FIG. 31, when the first cost is less than or equal to the second cost and the third cost is less than or equal to the fourth cost, the splitting direction for the first partition is determined to be a direction from the top-right corner to the bottom-left corner. At this time, the third partition is predicted from the first prediction block, and the fourth partition is predicted from the second prediction block.

In the example illustrated in (b) of FIG. 31, when the first cost is greater than the second cost and the third cost is greater than the fourth cost, the splitting direction for the first partition is determined to be a direction from the top-right corner to the bottom-left corner. At this time, the third partition is predicted from the second prediction block, and the fourth partition is predicted from the first prediction block.

In the example illustrated in (c) of FIG. 31, when the first cost is less than or equal to the second cost and the third cost is greater than the fourth cost, the third partition is predicted from the first prediction block, and the fourth partition is predicted from the second prediction block.

In the example illustrated in (d) of FIG. 31, when the first cost is greater than the second cost and the third cost is less than or equal to the fourth cost, the third partition is predicted from the second prediction block, and the fourth partition is predicted from the first prediction block.

Next, the examples illustrated in FIG. 32 are to be described. The first partition is split into two rectangular partitions in FIG. 32.

In the example illustrated in (a) of FIG. 32, when the first cost is less than or equal to the third cost and the first cost is less than or equal to the second cost, the splitting direction for the first partition is determined to be horizontal. At this time, the third partition is predicted from the first prediction block, and the fourth partition is predicted from the second prediction block.

In the example illustrated in (b) of FIG. 32, when the second cost is less than or equal to the fourth cost and the first cost is greater than the second cost, the splitting direction for the first partition is determined to be horizontal. At this time, the third partition is predicted from the second prediction block, and the fourth partition is predicted from the first prediction block.

In the example illustrated in (c) of FIG. 32, when the first cost is greater than the third cost and the third cost is less than or equal to the fourth cost, the splitting direction for the first partition is determined to be vertical. At this time, the third partition is predicted from the first prediction block, and the fourth partition is predicted from the second prediction block.

In the example illustrated in (d) of FIG. 32, when the second cost is greater than the fourth cost and the third cost is greater than the fourth cost, the splitting direction for the first partition is determined to be vertical. At this time, the third partition is predicted from the second prediction block, and the fourth partition is predicted from the first prediction block.

Next, in step S7007, the first partition is encoded or decoded using the splitting direction for the first partition determined in step S7005, and the results of prediction of the third partition and the fourth partition in step S7006. Encoding the first partition may include writing a parameter into a bitstream. Similarly, decoding the first partition may include reading a parameter from a bitstream.

The following describes an example of the case where inter prediction processing is performed on the first partition without applying this aspect, and an example of the case where inter prediction processing is performed on the first partition with the application of this aspect.

Figure 33:
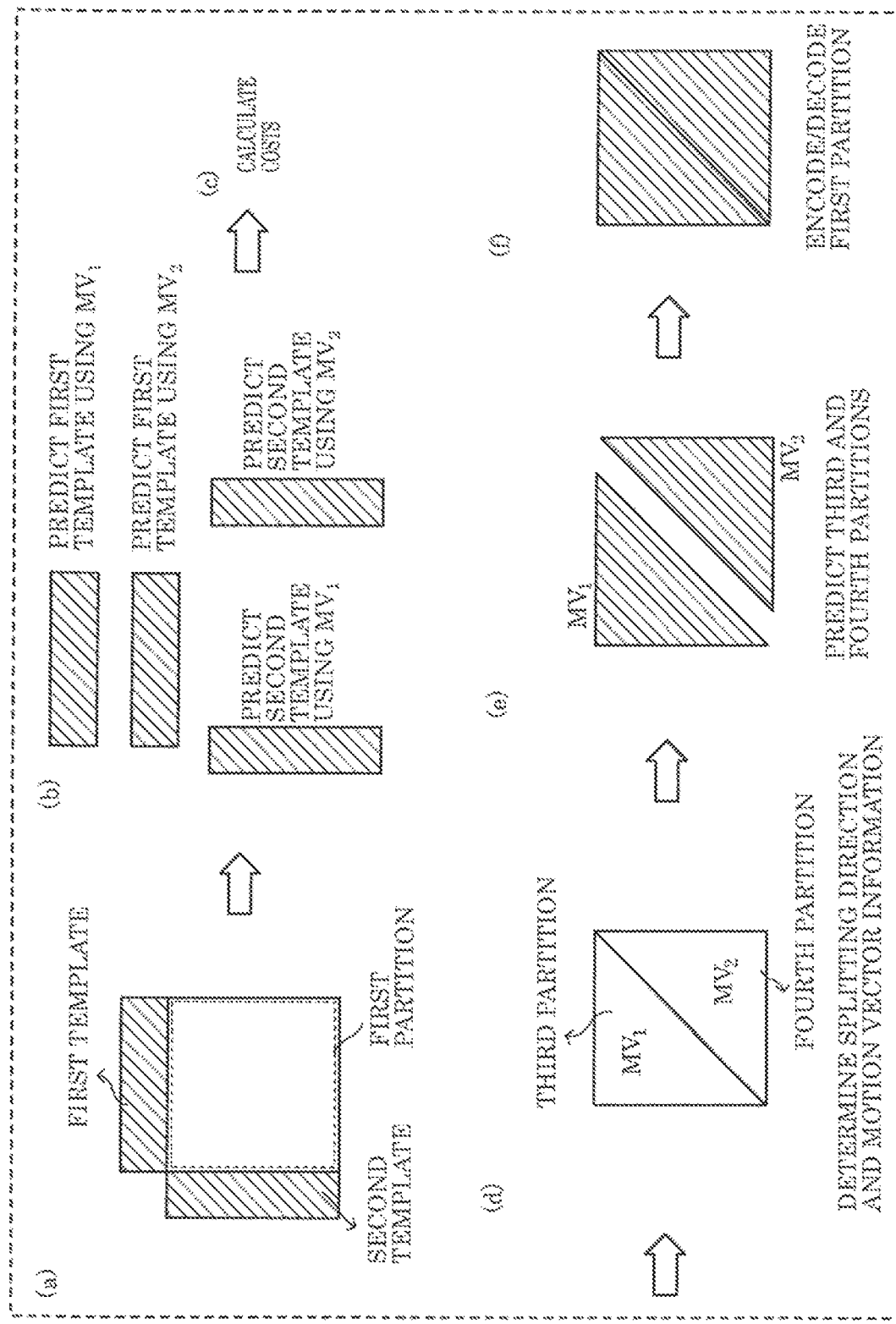
FIG. 33 illustrates an example of inter prediction processing to which the third aspect is not applied.

FIG. 33 illustrates an example of processing when the first partition is inter-predicted without applying the third aspect. In FIG. 33, (a) illustrates the first partition, a first template derived from a plurality of upper neighboring samples located above the first partition, and a second template derived from a plurality of left neighboring samples located on the left of the first partition.

As illustrated in (b) of FIG. 33, the first template is predicted using the first motion vector. Further, the first template is predicted using the second motion vector. Similarly, the second template is predicted using the first motion vector. Further, the second template is predicted using the second motion vector.

In (c) of FIG. 33, eight costs are calculated, using the first motion vector and the second motion vector of the first partition for each of the four templates derived in (b) of FIG. 33.

As illustrated in (d) of FIG. 33, using the costs calculated in (c) of FIG. 33, the splitting direction for the first partition and motion vector information for the third partition and the fourth partition split from the first partition according to the splitting direction are determined.

As illustrated in (e) of FIG. 33, the third partition and the fourth partition are predicted based on the splitting direction and the motion vector information determined in (d) of FIG. 33.

The first partition is encoded or decoded as illustrated in (0 of FIG. 33.

Figure 34:
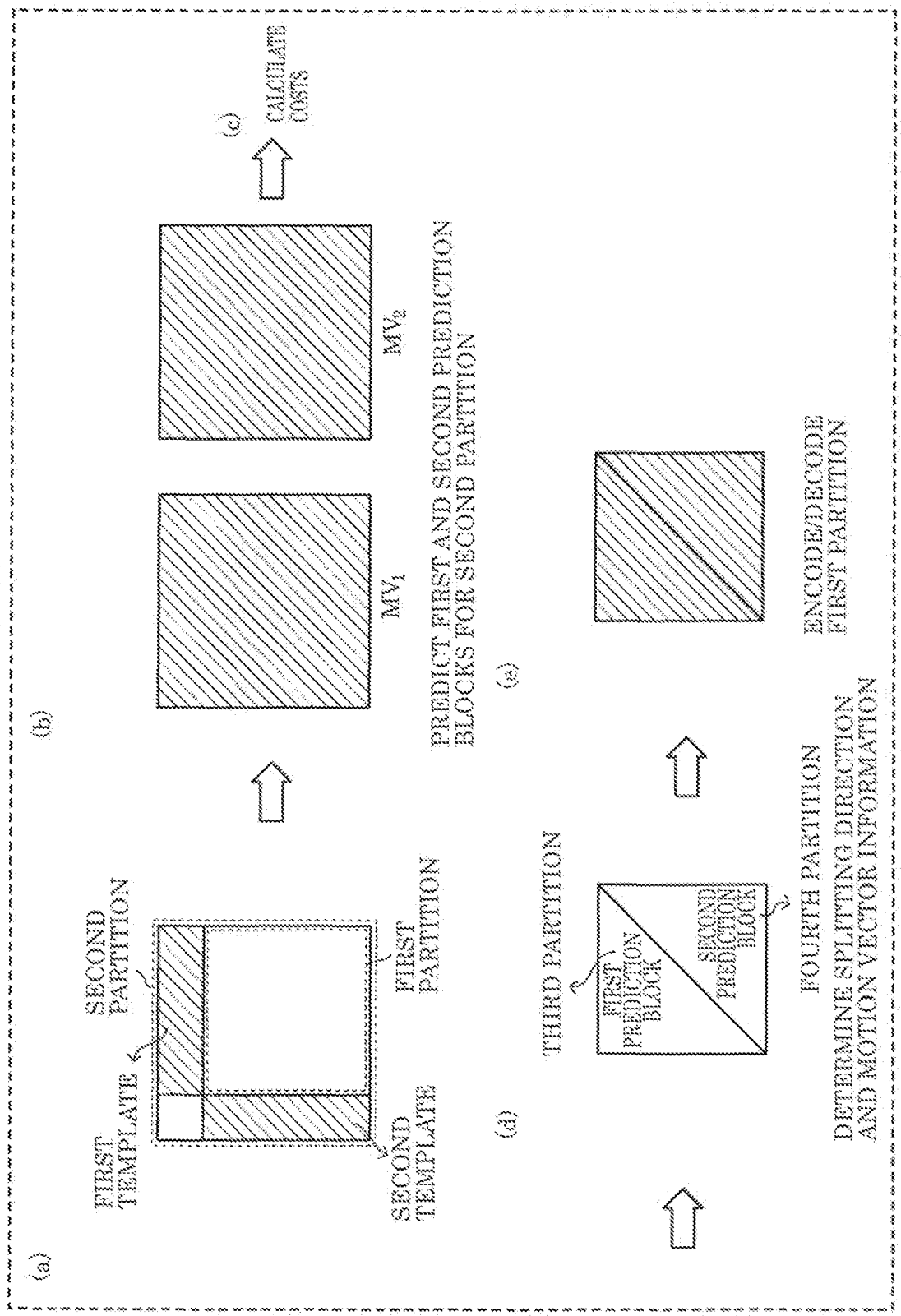
FIG. 34 illustrates an example of inter prediction processing to which the third aspect is applied.

FIG. 34 illustrates examples of processing when the first partition is inter-predicted with the application of the third aspect. In FIG. 34, (a) illustrates a first partition, a first template derived from a plurality of upper neighboring samples located above the first partition, a second template derived from a plurality of left neighboring samples located on the left of the first partition, and a second partition derived from the first partition and a plurality of neighboring samples which neighbor the first partition.

As illustrated in (b) of FIG. 34, a first prediction block and a second prediction block for the second partition are predicted using the first motion vector and the second motion vector.

In (c) of FIG. 34, four costs are calculated, using the first prediction block and the second prediction block of the second partition for each of the first template and the second template.

As illustrated in (d) of FIG. 34, a splitting direction for the first partition, and motion vector information for the third partition and the fourth partition which are split from the first partition according to the splitting direction are determined, using the costs calculated in (c) of FIG. 34.

The first partition is encoded or decoded as illustrated in (e) of FIG. 34.

As described above, if inter prediction processing is performed on the first partition without applying this aspect, the number of templates to be derived, the number of costs to be calculated, the number of processes to be performed, and the encoding amount increase.

In contrast, if the first partition is inter-predicted with the application of this aspect, the number of templates to be derived, the number of costs to be calculated, the number of processes to be performed, and the encoding amount are reduced.

[Technical Advantages of Third Aspect]

This aspect introduces a hardware implementation method for using template costs to determine the splitting direction and motion vector information for a partition. According to this aspect, it needs to access memory only once to predict the partition, using a larger partition for each motion vector. Accordingly, the processing time to predict the partition can be shortened.

[Combination with Other Aspects]

At least a portion of the third aspect may be combined with at least a portion of one or more other aspects of the present disclosure. A portion of processing in the flowcharts, a configuration of a portion of a device, syntax, and/or other features may be combined with other aspects. Not all the above processing/elements are necessarily needed. The device/method may include a portion of the processing/one or more of the elements. The processing described above may be performed by a decoder, similarly to the encoder.

[Fourth Aspect]

In this aspect, at least two costs are used to determine a splitting direction for the first partition, and motion vectors of the second partition and the third partition which are split from the first partition according to the splitting direction. At least two costs are calculated using two prediction partitions predicted from at least two reference frames of the first partition.

Figure 35:
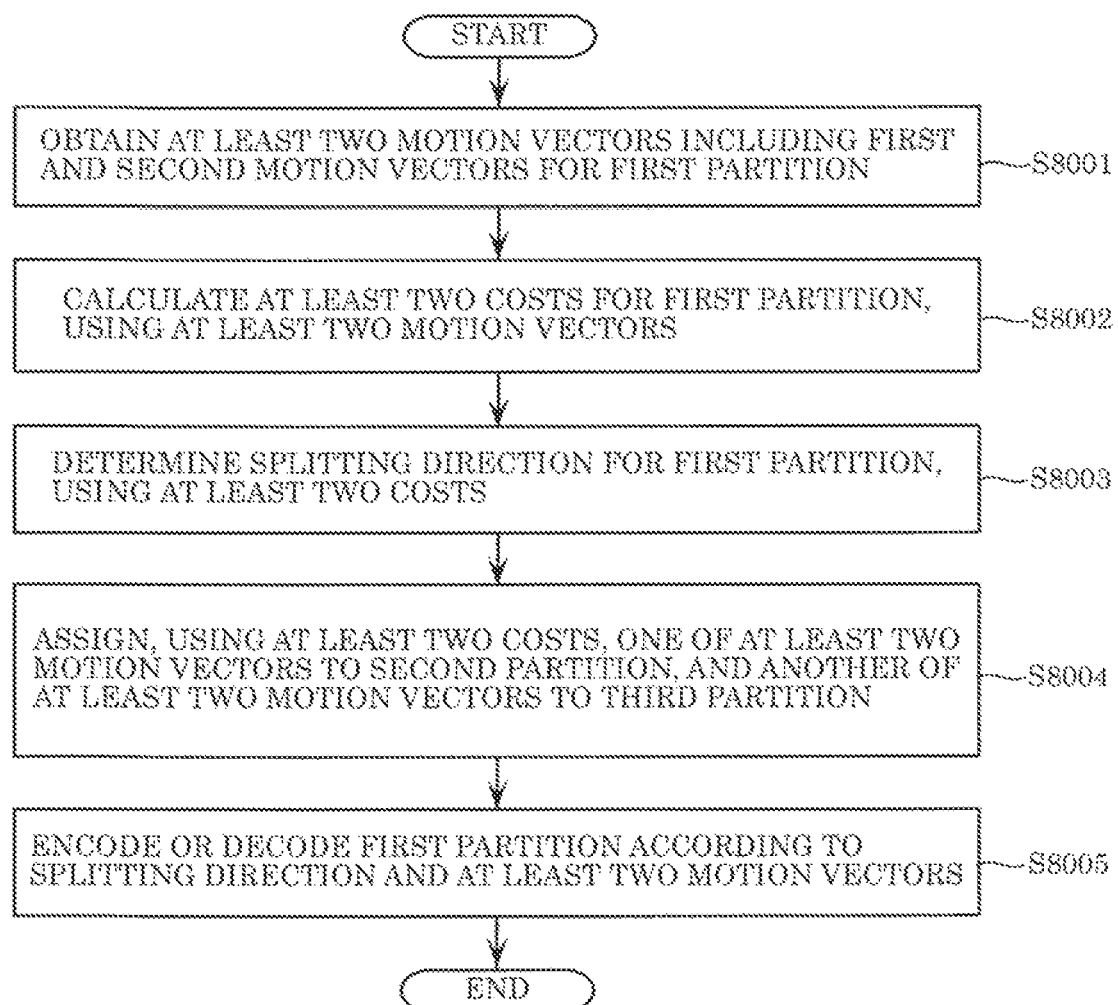
FIG. 35 is a flowchart illustrating an example of inter prediction processing in a fourth aspect.

FIG. 35 is a flowchart illustrating an example of inter prediction processing in the fourth aspect.

As illustrated in FIG. 35, in step S8001, at least two motion vectors including the first motion vector and the second motion vector of the first partition are obtained. The first motion vector may be a unidirectional motion vector predictor or a bidirectional motion vector predictor. Similarly, the second motion vector may be a unidirectional motion vector predictor or a bidirectional motion vector predictor.

Next, in step S8002, at least two costs are calculated for the first partition using the at least two motion vectors. In this example, the at least two costs are calculated using at least two prediction partitions predicted from at least two reference frames of the first partition.

Figure 36:
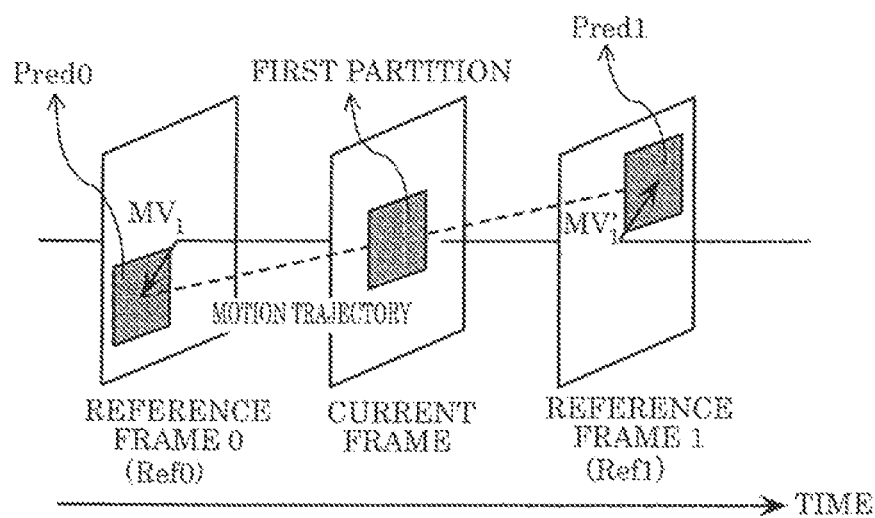
FIG. 36 illustrates an example of obtaining prediction partitions for a first partition using a first motion vector.

FIG. 36 illustrates an example of obtaining at least two prediction partitions (Pred0, Pred1) for the first partition, using the first motion vector.

The first partition is located in a current frame as illustrated in FIG. 36. The at least two prediction partitions (Pred0, Pred1) are predicted from two reference frames (Ref0, Ref1). For example, if a first motion vector (MV1) is a unidirectional motion vector predictor and points to reference frame 0 (Ref0), a mirrored motion vector (MV1') is derived from MV1 along the motion trajectory, pointing to reference frame 1 (Ref1). On the other hand, when the first motion vector is a bidirectional motion vector predictor, the two first motion vectors (MV1 and MV1') point to reference frame 0 (Ref0) and reference frame 1 (Ref1), respectively.

Figure 37:
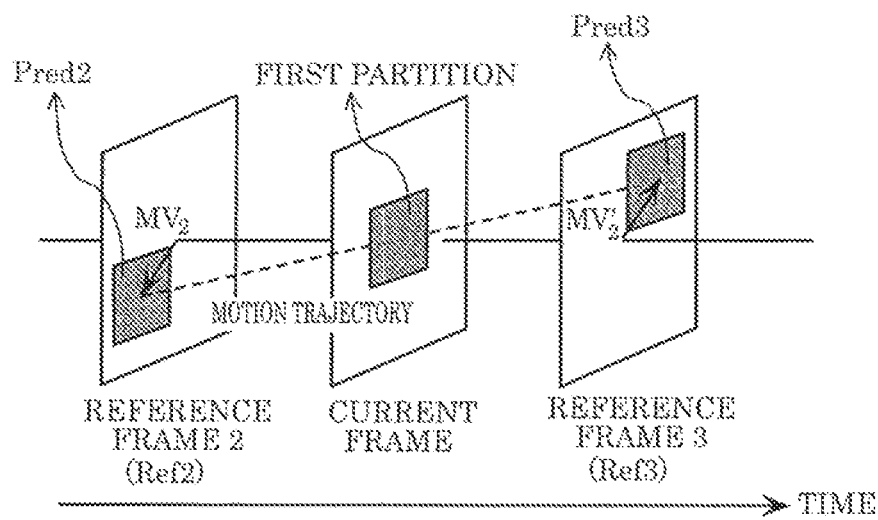
FIG. 37 illustrates an example of obtaining prediction partitions for the first partition using a second motion vector.

FIG. 37 illustrates an example in which at least two prediction partitions (Pred2, Pred3) are obtained for the first partition, using the second motion vector. Also for the second motion vector, the first partition is located in a current frame, similarly. At least two prediction partitions (Pred2, Pred3) are predicted from two reference frames (Ref2, Ref3). For example, when the second motion vector (MV2) is a unidirectional motion vector predictor and points to reference frame 2 (Ref2), a mirrored motion vector (MV2') is derived from MV2 along the motion trajectory, pointing to reference frame 3 (Ref3). On the other hand, when the second motion vector is a bidirectional motion vector predictor, the two second motion vector predictors (MV1, MV2') point to reference frame 2 (Ref2) and reference frame 3 (Ref3), respectively.

Figure 38A:
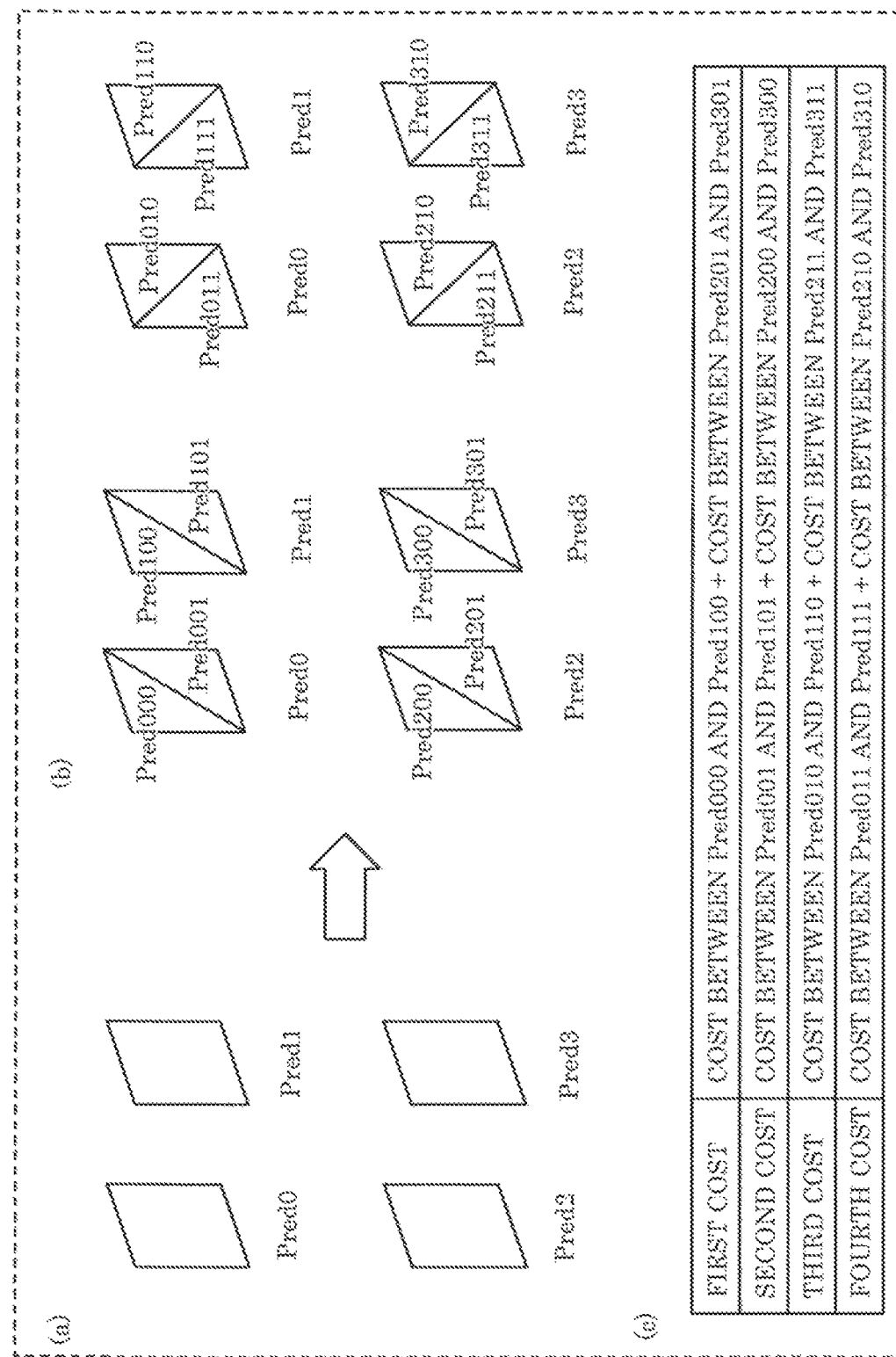
FIG. 38A illustrates examples of cost calculation in the fourth aspect.

Next, an example of calculation of costs in this aspect is to be described. FIG. 38A illustrates examples of calculation of costs in the fourth aspect. FIG. 38B illustrates other examples of calculation of costs in the fourth aspect.

First, examples illustrated in FIG. 38A are to be described. As illustrated in (a) of FIG. 38A, four prediction partitions (Pred0, Pred1, Pred2, Pred3) are predicted for the first partition, using the first motion vector and the second motion vector. Next, as illustrated in (b) of FIG. 38A, 16 prediction partitions are derived from the four prediction partitions. The 16 prediction partitions are triangular partitions. Next, as illustrated in (c) of FIG. 38A, costs are calculated using the derived 16 prediction partitions. A first cost is a sum of a cost between Pred000 and Pred100 and a cost between Pred201 and Pred301. A second cost is a sum of a cost between Pred001 and Pred101 and a cost between Pred200 and Pred300. A third cost is a sum of a cost between Pred010 and Pred110 and a cost between Pred211 and Pred311. A fourth cost is a sum of a cost between Pred011 and Pred111 and a cost between Pred210 and Pred310.

Next, the examples illustrated in FIG. 38B are to be described. As illustrated in (a) of FIG. 38B, four prediction partitions (Pred0, Pred1, Pred2, Pred3) are predicted for the first partition, using the first motion vector and the second motion vector. Next, as illustrated in (b) of FIG. 38B, 16 prediction partitions are derived from the four prediction partitions. 16 prediction partitions are rectangular partitions. Next, as illustrated in (c) of FIG. 38B, costs are calculated using the derived 16 prediction partitions. A first cost is a sum of a cost between Pred000 and Pred100 and a cost between Pred201 and Pred301. A second cost is a sum of a cost between Pred001 and Pred101 and a cost between Pred200 and Pred300. A third cost is a sum of a cost between Pred010 and Pred110 and a cost between Pred211 and Pred311. A fourth cost is a sum of a cost between Pred011 and Pred111 and a cost between Pred210 and Pred310.

Next, in step S8003, a splitting direction for the first partition is determined using the at least two costs calculated in step S8002. The first partition is split into the second partition and the third partition along the splitting direction.

Next, in step S8004, one of at least two motion vectors is assigned to the second partition and another of the at least two motion vectors is assigned to the third partition, using the at least two costs calculated in step S8002. Note that the motion vector assigned to the second partition is different from the motion vector assigned to the third partition.

Figure 39A:
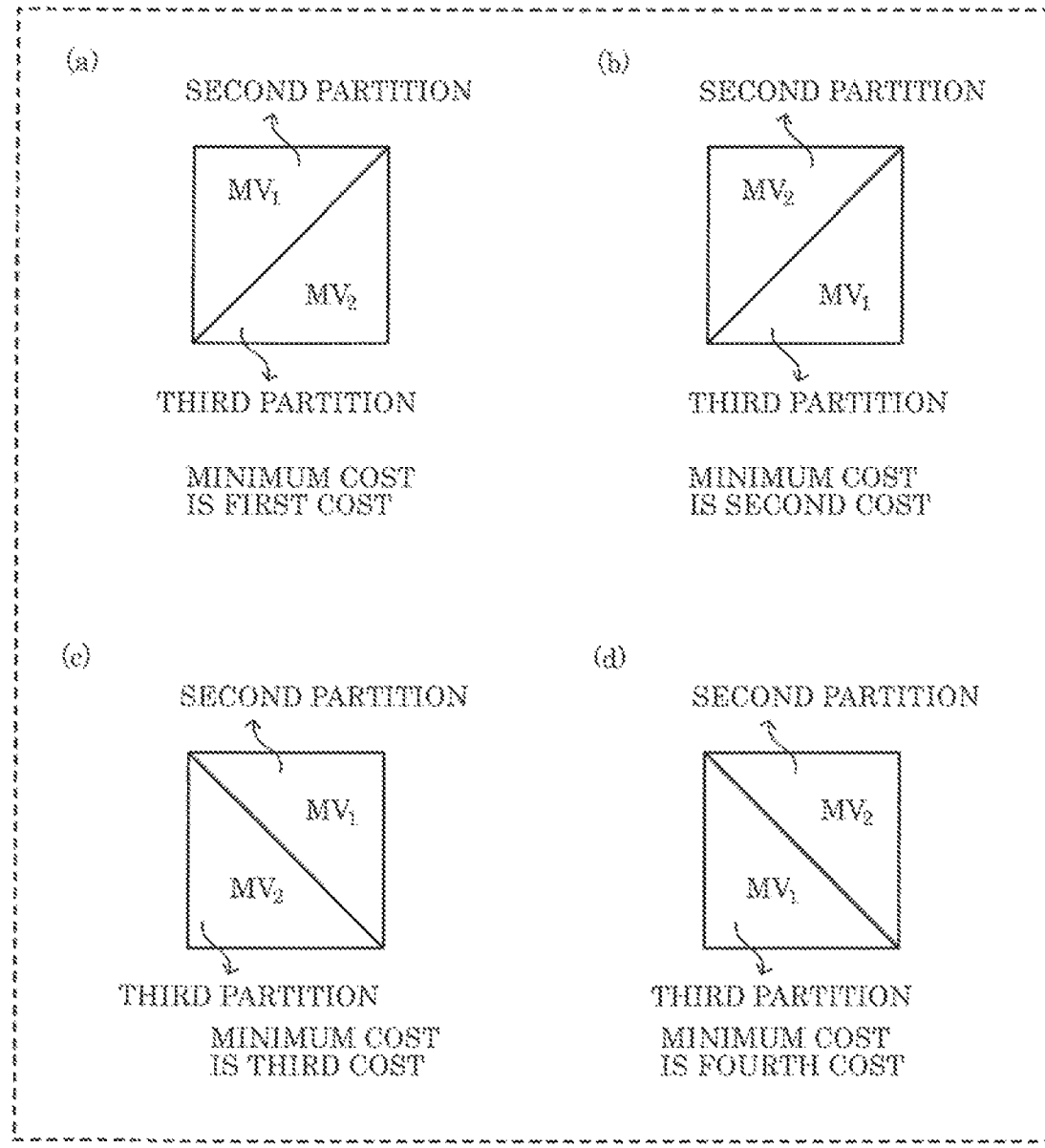
FIG. 39A illustrates examples of processing in steps S8003 and S8004 in FIG. 35.
Figure 39B:
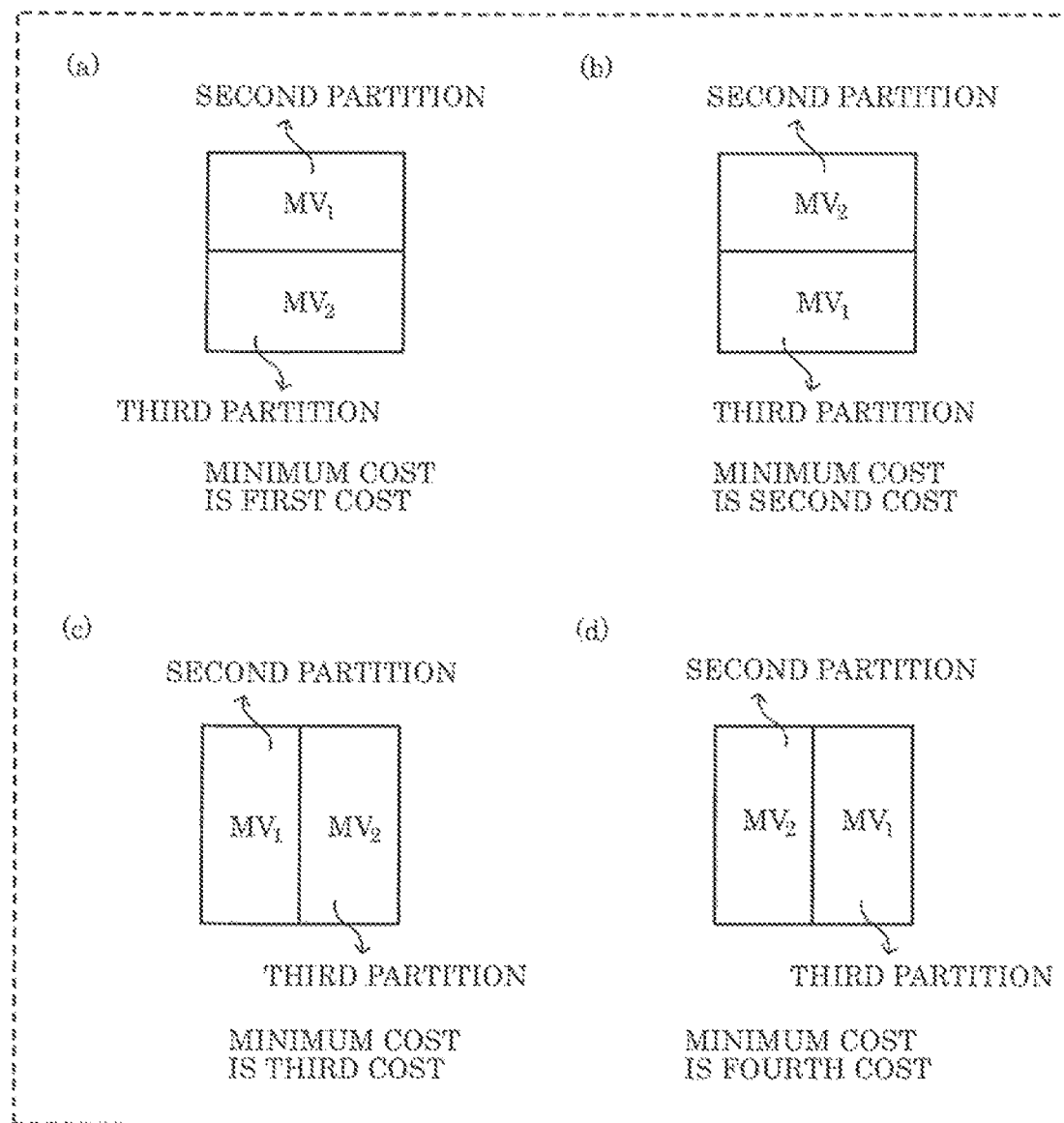
FIG. 39B illustrates other examples of processing in steps S8003 and S8004 in FIG. 35.

The following more specifically describes the processing in steps S8003 and S8004 with reference to FIGS. 39A and 39B. FIG. 39A illustrates examples of processing in steps S8003 and S8004 in FIG. 35. FIG. 39B illustrates other examples of processing in steps S8003 and S8004 in FIG. 35.

First, the examples illustrated in FIG. 39A are to be described. The first partition is split into two triangular partitions in FIG. 39A.

In the example illustrated in (a) of FIG. 39A, when the minimum cost is the first cost, the splitting direction for the first partition is determined to be a direction from the top-right corner to the bottom-left corner. At this time, the first motion vector is assigned to the second partition and the second motion vector is assigned to the third partition.

In the example illustrated in (b) of FIG. 39A, when the minimum cost is the second cost, the splitting direction for the first partition is determined to be a direction from the top-right corner to the bottom-left corner. At this time, the second motion vector is assigned to the second partition, and the first motion vector is assigned to the third partition.

In the example illustrated in (c) of FIG. 39A, when the minimum cost is the third cost, the splitting direction for the first partition is determined to be a direction from the top-left corner to the bottom-right corner. At this time, the first motion vector is assigned to the second partition, and the second motion vector is assigned to the third partition.

In the example illustrated in (d) of FIG. 39A, when the minimum cost is the fourth cost, the splitting direction for the first partition is determined to be a direction from the top-left corner to the bottom-right corner. At this time, the second motion vector is assigned to the second partition, and the first motion vector is assigned to the third partition.

Next, the example illustrated in FIG. 39B is to be described. The first partition is split into two rectangular partitions in FIG. 39B.

In the example illustrated in (a) of FIG. 39B, when the minimum cost is the first cost, the splitting direction for the first partition is determined to be horizontal. At this time, the first motion vector is assigned to the second partition, and the second motion vector is assigned to the third partition.

In the example illustrated in (b) of FIG. 39B, when the minimum cost is the second cost, the splitting direction for the first partition is determined to be horizontal. At this time, the second motion vector is assigned to the second partition, and the first motion vector is assigned to the third partition.

In the example illustrated in (c) of FIG. 39B, when the minimum cost is the third cost, the splitting direction for the first partition is vertical. At this time, the first motion vector is assigned to the second partition, and the second motion vector is assigned to the third partition.

In the example illustrated in (d) of FIG. 39B, when the minimum cost is the fourth cost, the splitting direction for the first partition is determined to be vertical. At this time, the second motion vector is assigned to the second partition, and the first motion vector is assigned to the third partition.

Next, in step S8005, the first partition is encoded or decoded using the splitting direction determined in step S8003 and the at least two motion vectors obtained in step S8001.

[Technical Advantage of Fourth Aspect]

This aspect introduces costs in order to determine the splitting direction for the first partition and the motion vectors of the second partition and the third partition which are split from the first partition. Costs are calculated using at least two prediction partitions predicted from at least two reference frames of the first partition. According to this aspect, the splitting direction of the first partition is not transmitted. Further, the motion vectors for the second partition and the third partition are jointly encoded without indicating which motion vector is for the second partition and which motion vector is for the third partition. According to this aspect, encoding efficiency can be improved.

[Combination with Other Aspects]

At least of a portion of the fourth aspect may be combined with at least a portion of one or more other aspects of the present disclosure. A portion of processing in the flowcharts, a configuration of a portion of a device, syntax and/or other features may be combined with other aspects. Not all the above processing/elements are necessarily needed. The device/method may include a portion of the processing/one or more of the elements. The processing described above may be performed by a decoder, similarly to the encoder. In an example, step S1002 in FIG. 11 may be replaced with step S8002 in FIG. 35. In another example, step S3003 in FIG. 18 may be replaced with step S8002 in FIG. 35.

[Variation]

The first partition split into the second partition and the third partition may be a rectangular partition, a triangular partition, or a non-rectangular partition. The first partition may be split into a plurality of partitions which at least include the second partition and the third partition. The term "partition" described in each aspect may be replaced with the term "coding unit". The term "partition" described in each aspect may be replaced with the term "prediction unit". The term "partition" described in each aspect may be replaced with the term "sub prediction unit".

[Example of Implementation of Encoder]

Figure 40:
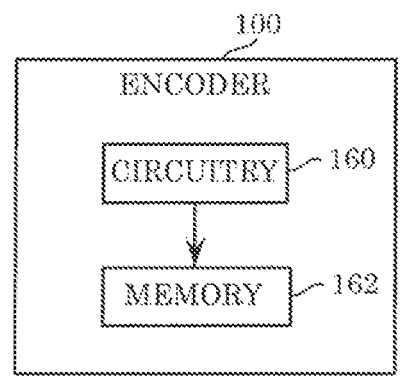
FIG. 40 is a block diagram illustrating an example of implementation of an encoder according to Embodiment 1.

FIG. 40 is a block diagram illustrating an example of implementation of encoder 100 according to Embodiment 1. Encoder 100 includes circuitry 160 and memory 162. For example, the plurality of elements of encoder 100 illustrated in FIG. 1 are implemented by circuitry 160 and memory 162 which are illustrated in FIG. 40.

Circuitry 160 is an electronic circuit accessible to memory 162, and processes information. For example, circuitry 160 is a dedicated or general-purpose circuitry which encodes videos using memory 162. Circuitry 160 may be a central processing unit (CPU).

Circuitry 160 may be constituted by a plurality of electronic circuits or by a plurality of sub circuits. Among the plurality of elements of encoder 100 illustrated in FIG. 1, circuitry 160 may serve as a plurality of elements, other than the elements for storing information.

Memory 162 is a dedicated or general-purpose memory which stores information for circuitry 160 to encode videos. Memory 162 may be an electronic circuit, may be connected to circuitry 160, or may be included in circuitry 160.

Memory 162 may be constituted by a plurality of electronic circuits or by a plurality of sub circuits. Memory 162 may be a magnetic disk or an optical disc, for instance, and may be expressed as storage or a recording medium. Memory 162 may be nonvolatile memory or volatile memory.

For example, memory 162 may serve as elements for storing information, among the plurality of elements of encoder 100 illustrated in FIG. 1. Specifically, memory 162 may serve as block memory 118 and frame memory 122 illustrated in FIG. 1.

Further, memory 162 may store videos to be encoded, and bit strings corresponding to the encoded videos. Further, memory 162 may store a program for circuitry 160 to encode videos.

Encoder 100 may not be provided with all the plurality of elements illustrated in FIG. 1, and may not perform all the processes described above. One or more of the plurality of elements illustrated in FIG. 1 may be included in another device, or one or more of the plurality of processes described above may be performed by the other device. Encoder 100 is provided with one or more of the plurality of elements illustrated in FIG. 1 and performs one or more of the plurality of processes described above, thus inhibiting an increase in the amount of processing and adaptively determining information related to splitting based on the characteristics of neighboring samples.

As described above, circuitry 160 of encoder 100 illustrated in FIG. 40 encodes videos using memory 162 of encoder 100.

For example, circuitry 160 obtains at least two items of prediction information for a first partition included in an image which a video includes. Circuitry 160 derives at least one template from a plurality of neighboring samples which neighbor the first partition. Circuitry 160 calculates at least two costs using at least one template and the at least two items of prediction information. Using the at least two costs, circuitry 160 (i) determines at least one splitting direction for the first partition, or (ii) assigns one of the at least two items of prediction information to a second partition split from the first partition according to the at least one splitting direction, and another of the at least two items of prediction information to a third partition split from the first partition according to the at least one splitting direction. Then, circuitry 160 encodes the first partition according to the at least one splitting direction and the at least two items of prediction information.

For example, the plurality of neighboring samples which neighbor the first partition may be a plurality of neighboring samples which temporally or spatially neighbor the first partition.

For example, the at least two items of prediction information may be motion vectors, merge candidates, or intra prediction modes.

For example, the at least one template may include, among the plurality of neighboring samples, a template derived from an upper neighboring sample located above the first partition, a template derived from a left neighboring sample located on the left of the first partition, or a template derived from the upper neighboring sample and a template derived from the left neighboring sample.

For example, calculation of the at least two costs may include at least a minus operation.

For example, the second partition and the third partition may be triangular partitions or rectangular partitions.

For example, the at least one splitting direction may be a direction from the top-left corner to the bottom-right corner of the first partition, a direction from the top-right corner to the bottom-left corner of the first partition, horizontal, or vertical.

For example, the at least two items of prediction information includes first prediction information, and second prediction information different from the first prediction information, and the first prediction information and the second prediction information may be obtained for the second partition and the third partition in the first partition.

For example, using at least two costs, circuitry 160 may (i) determine at least one splitting direction for the first partition, and (ii) assign one of the at least two items of prediction information to the second partition and another of the at least two items of prediction information to the third partition.

For example, the at least two costs may be calculated, using at least two prediction partitions predicted from at least two reference frames of the first partition using the at least two items of prediction information.

Note that encoder 100 is not limited to the above example of implementation, and may include subtractor 104, transformer 106, quantizer 108, and entropy encoder 110. These elements may perform the above operation.

[Example of Implementation of Decoder]

Figure 41:
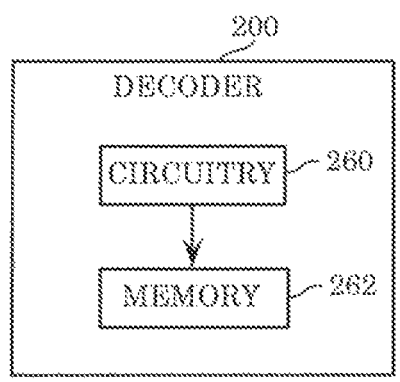
FIG. 41 is a block diagram illustrating an example of implementation of a decoder according to Embodiment 1.

FIG. 41 is a block diagram illustrating an example of implementation of decoder 200 according to Embodiment 1. Decoder 200 includes circuitry 260 and memory 262. For example, the plurality of elements of decoder 200 illustrated in FIG. 10 are implemented by circuitry 260 and memory 262 which are illustrated in FIG. 41.

Circuitry 260 is an electronic circuit accessible to memory 262, and processes information. For example, circuitry 260 is a dedicated or general-purpose circuitry which decodes videos using memory 262. Circuitry 260 may be a CPU.

Circuitry 260 may be constituted by a plurality of electronic circuits, or may be constituted by a plurality of sub circuits. Among the plurality of elements of decoder 200 illustrated in FIG. 10, circuitry 260 may serve as a plurality of elements, other than the elements for storing information.

Memory 262 is a dedicated or general-purpose memory which stores information for circuitry 260 to decode videos. Memory 262 may be an electronic circuit, may be connected to circuitry 260, or may be included in circuitry 260.

Memory 262 may be constituted by a plurality of electronic circuits or may be constituted by a plurality of sub circuits. Memory 262 may be a magnetic disk or an optical disc or may be expressed as storage or a recording medium. Memory 262 may be nonvolatile memory or volatile memory.

For example, memory 262 may serve as elements for storing information, among the plurality of elements of decoder 200 illustrated in FIG. 10. Specifically, memory 262 may serve as block memory 210 and frame memory 214 illustrated in FIG. 10.

Memory 262 may store bit strings corresponding to encoded videos, and videos corresponding to decoded bit strings. Further, memory 262 may store a program for circuitry 260 to decode videos.

Decoder 200 may not be provided with all the plurality of elements illustrated in FIG. 10, or may not perform all the plurality of processes described above. One or more of the plurality of elements illustrated in FIG. 10 may be included in another device, and one or more of the plurality of processes described above may be performed by the other device. Decoder 200 is provided with one or more of the plurality of elements illustrated in FIG. 10 and performs one or more of the plurality of processes described above, thus inhibiting an increase in the amount of processing and adaptively determining information related to splitting, based on characteristics of neighboring samples.

As described above, circuitry 260 of decoder 200 illustrated in FIG. 41 decodes videos using memory 262 of decoder 200.

For example, circuitry 260 obtains at least two items of prediction information for a first partition included in an image which a video includes. Circuitry 260 derives at least one template from a plurality of neighboring samples which neighbor the first partition. Circuitry 260 calculates at least two costs using the at least one template and the at least two items of prediction information. Using the at least two costs, circuitry 260 (i) determines at least one splitting direction for the first partition, or (ii) assigns one of the at least two items of prediction information to a second partition split from the first partition according to the at least one splitting direction, and another of the at least two items of prediction information to a third partition split from the first partition according to the at least one splitting direction. Then, circuitry 260 decodes the first partition according to the at least one splitting direction and the at least two items of prediction information.

For example, the plurality of neighboring samples which neighbor the first partition may be a plurality of neighboring samples which temporally or spatially neighbor the first partition.

For example, the at least two items of prediction information may be motion vectors, merge candidates, or intra prediction modes.

For example, the at least one template may include, among the plurality of neighboring samples, a template derived from an upper neighboring sample located above the first partition, may include a template derived from a left neighboring sample located on the left of the first partition, or may include a template derived from the upper neighboring sample and a template derived from the left neighboring sample.

For example, calculation of the at least two costs may include at least a minus operation.

For example, the second partition and the third partition may be triangular partitions or rectangular partitions.

For example, the at least one splitting direction may be a direction from a top-left corner to a bottom-right corner of the first partition, a direction from a top-right corner to a bottom-left corner of the first partition, horizontal, or vertical.

For example, the at least two items of prediction information may include first prediction information and second prediction information different from the first prediction information, and the first prediction information and the second prediction information may be obtained for the second partition and the third partition in the first partition.

For example, using the at least two costs, circuitry 260 may (i) determine at least one splitting direction for the first partition, and (ii) assign one of the at least two items of prediction information to the second partition, and another of the at least two items of prediction information to the third partition.

For example, the at least two costs may be calculated, using at least two prediction partitions predicted from at least two reference frames of the first partition using at least two items of prediction information.

Note that decoder 200 is not limited to the above example of implementation, and may include entropy decoder 202, inverse quantizer 204, inverse transformer 206, and adder 208. These elements may perform the above operation.

[Supplement]

Encoder 100 and decoder 200 according to the present embodiment may be used as an image encoder and an image decoder, respectively, or may be used as a video encoder and a video decoder, respectively. Alternatively, encoder 100 and decoder 200 may be each used as a transformer.

Accordingly, encoder 100 and decoder 200 may correspond only to transformer 106 and inverse transformer 206, respectively. Then, other elements such as inter predictor 126 or 218 may be included in another device.

At least a portion of the present embodiment may be used as an encoding method, may be used as a decoding method, may be used as a transforming method, or may be used as another method.

In the present embodiment, each of the elements may be configured of dedicated hardware, or may be implemented by executing a software program suitable for the element. Each element may be implemented by a program executor such as a CPU or a processor reading and executing a software program recorded on a recording medium such as a hard disk or semiconductor memory.

Specifically, each of encoder 100 and decoder 200 may include processing circuitry, and storage electrically coupled to the processing circuitry and accessible from the processing circuitry. For example, the processing circuitry corresponds to circuitry 160 or 260, and the storage corresponds to memory 162 or 262.

The processing circuitry includes at least one of dedicated hardware and a program executor, and performs a process using the storage. When the processing circuitry includes a program executor, the storage stores a software program executed by the program executor.

Here, software which implements, for instance, encoder 100 or decoder 200 according to the present embodiment is a program as follows.

Thus, this program causes a computer to perform an encoding method for encoding a video, the encoding method including: obtaining at least two items of prediction information for a first partition included in the video; deriving at least one template from a plurality of neighboring samples which neighbor the first partition; calculating at least two costs, using the at least one template and the at least two items of prediction information; (i) determining at least one splitting direction for the first partition, using the at least two costs or (ii) assigning, using the at least two costs, one of the at least two items of prediction information to a second partition split from the first partition according to the at least one splitting direction, and another of the at least two items of prediction information to a third partition split from the first partition according to the at least one splitting direction; and encoding the first partition according to the at least one splitting direction and the at least two items of prediction information.

Alternatively, this program causes a computer to perform a decoding method for decoding a video, the decoding method including: obtaining at least two items of prediction information for a first partition included in the video; deriving at least one template from a plurality of neighboring samples which neighbor the first partition; calculating at least two costs, using the at least one template and the at least two items of prediction information; (i) determining at least one splitting direction for the first partition, using the at least two costs or (ii) assigning, using the at least two costs, one of the at least two items of prediction information to a second partition split from the first partition according to the at least one splitting direction, and another of the at least two items of prediction information to a third partition split from the first partition according to the at least one splitting direction; and decoding the first partition according to the at least one splitting direction and the at least two items of prediction information.

The elements may be circuits as above-mentioned. These circuits may constitute one circuitry as a whole, or may be separate circuitries. Each element may be implemented by a general-purpose processor or a dedicated processor.

A process performed by a specific element may be performed by a different element. In addition, the order of performing processes may be changed or the plurality of processes may be performed in parallel. The encoder/decoder may include encoder 100 and decoder 200.

The ordinal numbers such as first and second used for the description may be changed properly. An ordinal number may be newly given to an element or may be removed therefrom.

The above has given a description of aspects of encoder 100 and decoder 200 based on the embodiments, but the aspects are not limited to the embodiments. The aspects of encoder 100 and decoder 200 may also encompass various modifications that may be conceived by those skilled in the art to the embodiments, and embodiments achieved by combining elements in different embodiments, without departing from the scope of the present disclosure.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

[Usage Examples]

Figure 42:
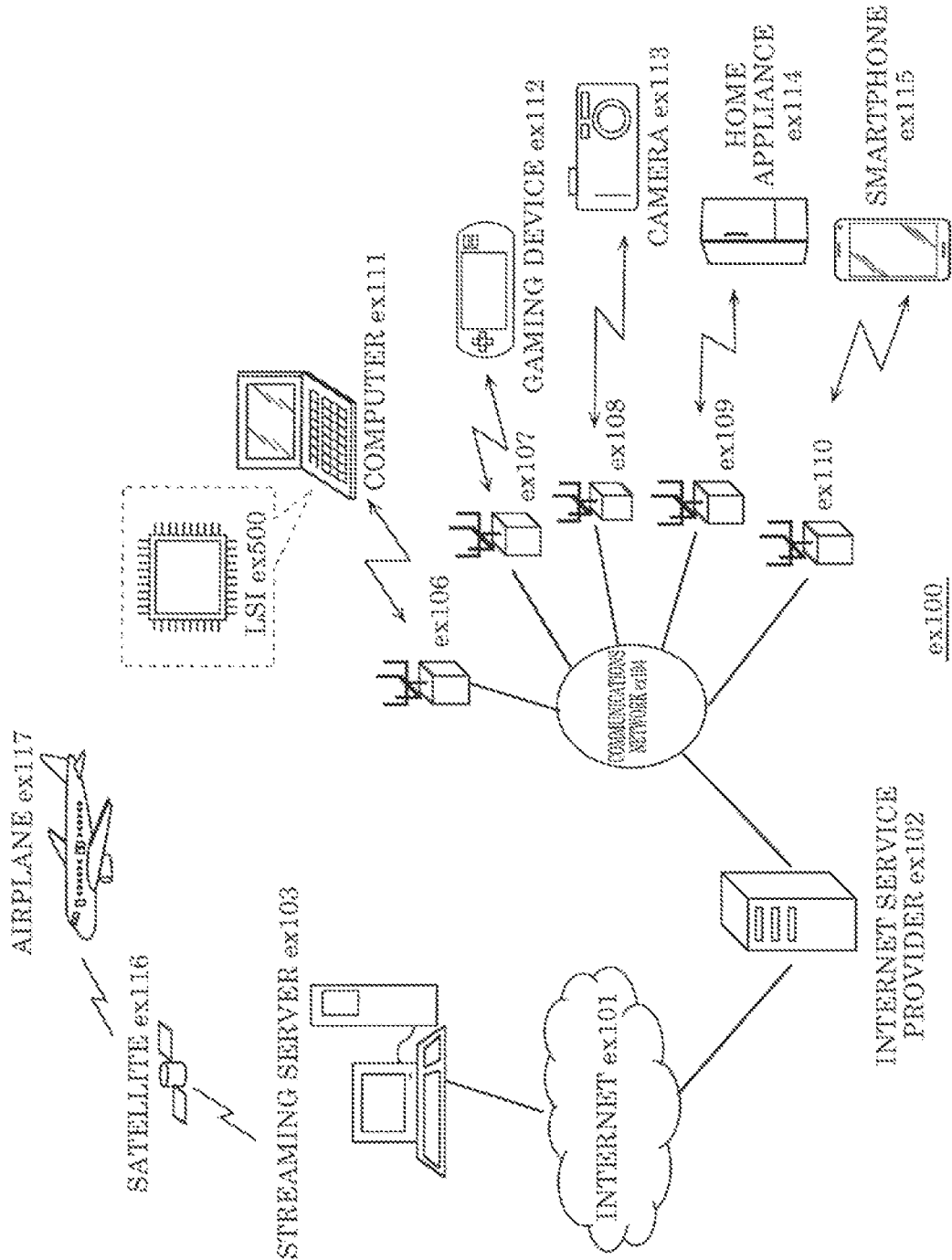
FIG. 42 illustrates an overall configuration of a content providing system for implementing a content distribution service.

FIG. 42 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an α value indicating transparency, and the server sets the α value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 43:
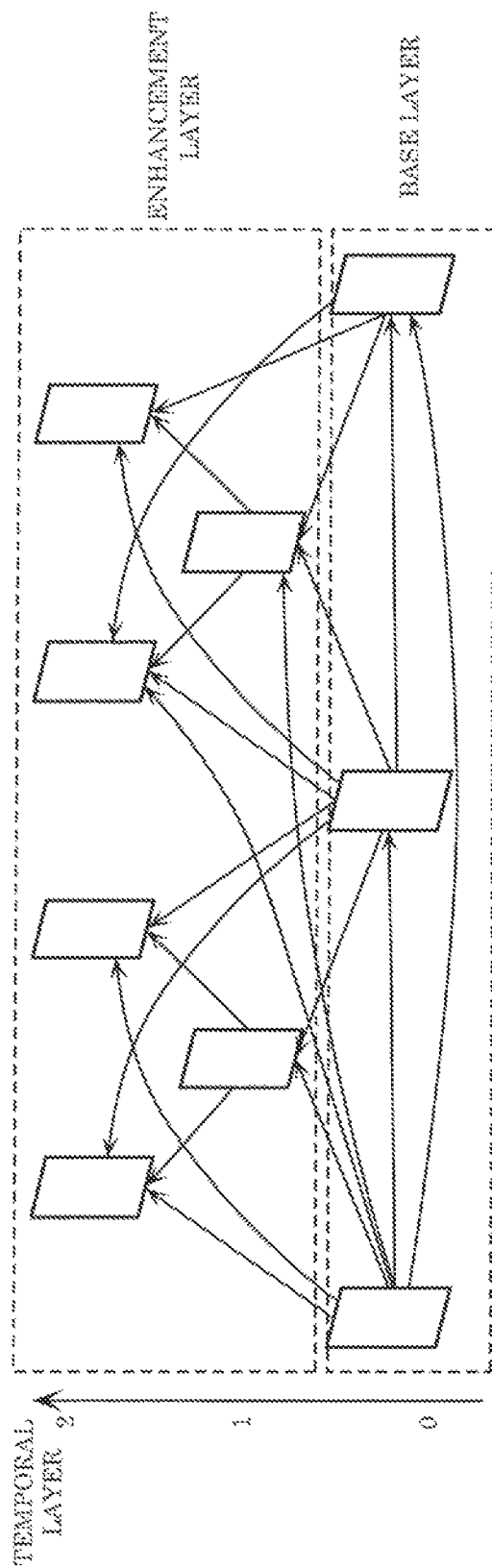
FIG. 43 illustrates one example of an encoding structure in scalable encoding.

The switching of content will be described with reference to a scalable stream, illustrated in FIG. 43, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 43. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 44:
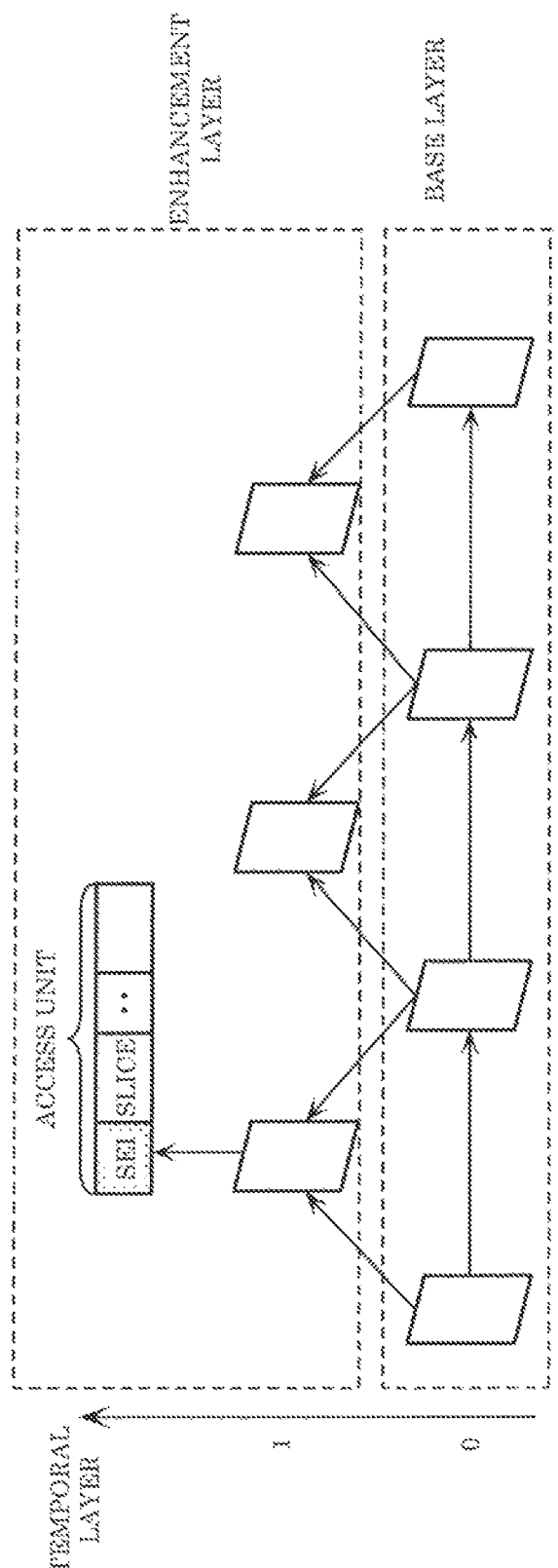
FIG. 44 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 44, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 45:
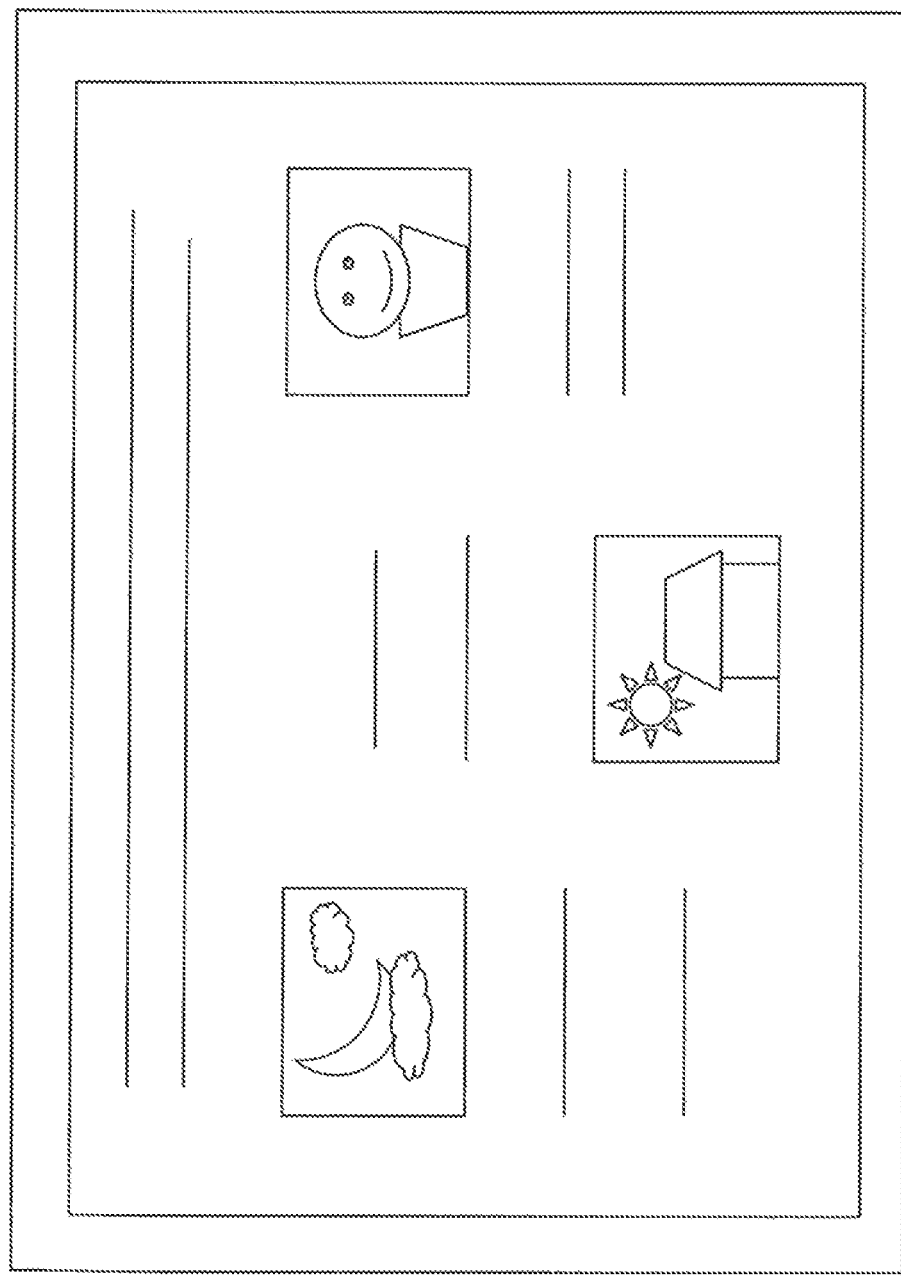
FIG. 45 illustrates an example of a display screen of a web page.
Figure 46:
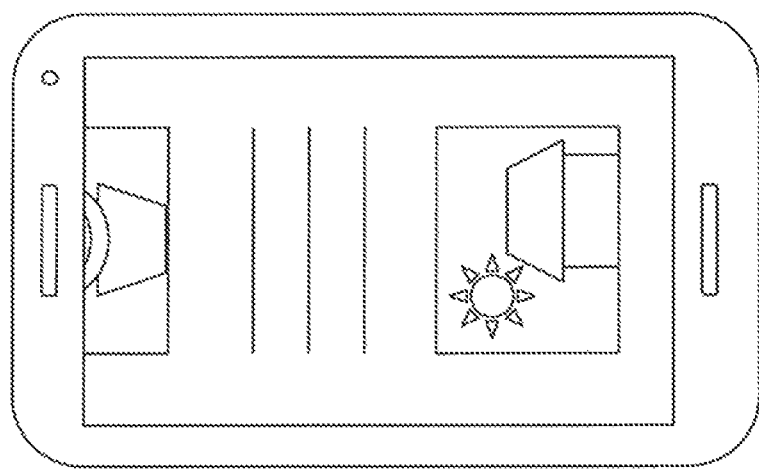
FIG. 46 illustrates an example of a display screen of a web page.

FIG. 45 illustrates an example of a display screen of a web page on, for example, computer ex111. FIG. 46 illustrates an example of a display screen of a web page on, for example, smartphone ex115. As illustrated in FIG. 45 and FIG. 46, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Usage Examples]

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 47:
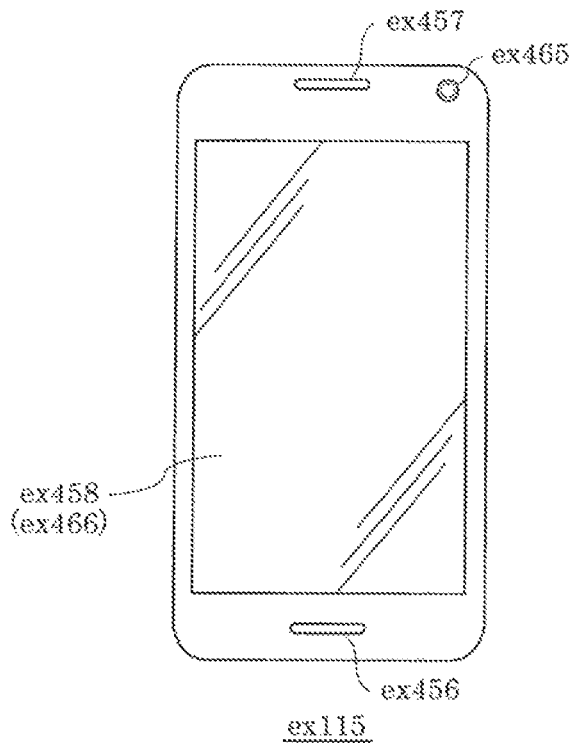
FIG. 47 illustrates one example of a smartphone.
Figure 48:
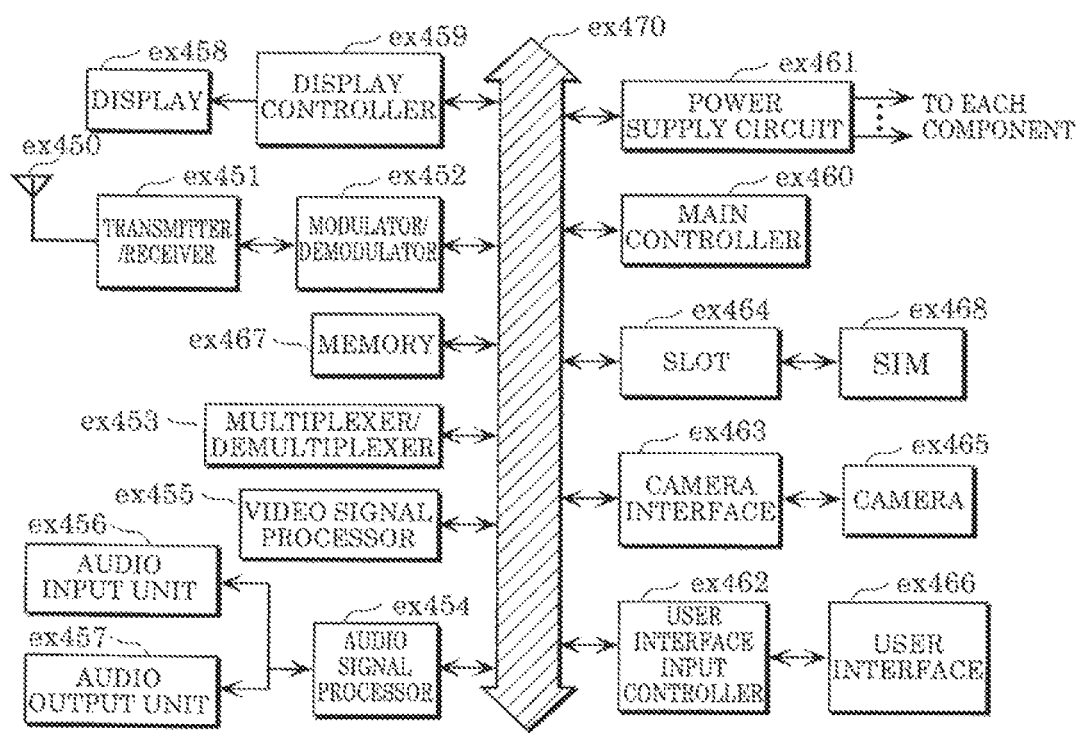
FIG. 48 is a block diagram illustrating a configuration example of a smartphone.

FIG. 47 illustrates smartphone ex115. FIG. 48 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

INDUSTRIAL APPLICABILITY

The present disclosure is applicable to, for example, television receivers, digital video recorders, car navigation systems, mobile phones, digital cameras, digital video cameras, video conference systems, and electron mirrors.

The invention claimed is:

1. An encoder which encodes a video, the encoder comprising:
   circuitry; and
   memory coupled to the circuitry, wherein
   using the memory, the circuitry:
       obtains at least two items of prediction information for a first partition included in the video;
       derives at least one template from a plurality of neighboring samples which neighbor the first partition;
       calculates at least two costs, using the at least one template and the at least two items of prediction information;
       using the at least two costs, (i) determines a first direction which is substantially perpendicular to a second direction in which a second partition is opposed to a third partition in the first partition and (ii) assigns one of the at least two items of prediction information to the second partition, and another of the at least two items of prediction information to the third partition split; and
       encodes the first partition according to the at least one splitting direction and the at least two items of prediction information.

\* \* \* \* \*